US012580893B2

(12) United States Patent
Ahn et al.

(10) Patent No.: US 12,580,893 B2
(45) Date of Patent: Mar. 17, 2026

(54) CYBER THREAT DETECTION BASED ON THREAT CONTEXT, THREAT CHANGES AND/OR IMPACT STATUS

(71) Applicant: Centripetal Networks, LLC, Portsmouth, NH (US)

(72) Inventors: David K. Ahn, Winston-Salem, NC (US); Jess P. Parnell, Grayson, GA (US); Tyler J. Wendell, Holly Springs, NC (US); Hansaka A. Kodituwakku, Falls Church, VA (US); Jared Holmberg, Lake Dallas, TX (US); Daniel Rogers, Ashburn, VA (US); Cody Michael Baker, Round Hill, VA (US); Pierre Mallett, III, Herndon, VA (US)

(73) Assignee: Centripetal Networks, LLC, Portsmouth, NH (US)

( * ) Notice: Subject to any disclaimer, the term of this patent is extended or adjusted under 35 U.S.C. 154(b) by 98 days.

(21) Appl. No.: 18/741,624

(22) Filed: Jun. 12, 2024

(65) Prior Publication Data
US 2024/0414128 A1 Dec. 12, 2024

Related U.S. Application Data

(60) Provisional application No. 63/472,519, filed on Jun. 12, 2023.

(51) Int. Cl.
*H04L 9/40* (2022.01)
(52) U.S. Cl.
CPC ...... *H04L 63/0263* (2013.01); *H04L 63/1416* (2013.01); *H04L 63/1425* (2013.01)
(58) Field of Classification Search
CPC ............. H04L 63/0263; H04L 63/1416; H04L 63/1425

(Continued)

(56) References Cited

U.S. PATENT DOCUMENTS 10,984,113 B1 * 4/2021 Dhaliwal ................ H04L 63/14
11,647,029 B2 * 5/2023 Palumbo ............. H04L 63/1416
726/1

(Continued)

FOREIGN PATENT DOCUMENTS

WO 2024136924 A2 6/2024

OTHER PUBLICATIONS

Sep. 30, 2024—(WO) International Search Report and Written Opinion—App PCT/US2024/033634.

(Continued)

*Primary Examiner* — Badri Narayanan Champakesan
(74) *Attorney, Agent, or Firm* — Banner & Witcoff, Ltd.

(57) ABSTRACT

Aspects described herein may relate to cyber threat detection based on threat context and/or threat changes. Cyber threat intelligence (CTI) data may be received from a CTI provider. Endpoint data that indicates evidence that endpoints are cyber threats may be determined based on the CTI data. The endpoint data may be analyzed and/or compared to stored data associated with the endpoint. The analysis and/or comparison may be performed to determine whether evidence that the endpoint is a cyber threat has changed. Based on any changes, dispositions for the endpoint may be determined and sent. The dispositions may change how devices filter network traffic associated with the endpoint. Alternatives to default dispositions may be determined based on a impact of blocking potentially legitimate network traffic to and/or from the endpoints. Machine-learning models may assist in processing and analyzing CTI data, performing threat monitoring, and/or determining feeds that include the dispositions.

27 Claims, 26 Drawing Sheets

(58) Field of Classification Search
USPC .......................................................... 726/11
See application file for complete search history.

(56) References Cited

U.S. PATENT DOCUMENTS

| | | | | |
|---|---|---|---|---|
| 11,863,577 | B1* | 1/2024 | Miseiko .............. | G06F 9/45558 |
| 2004/0044912 | A1* | 3/2004 | Connary .............. | H04L 43/045 |
| | | | | 709/224 |
| 2015/0373043 | A1* | 12/2015 | Wang ................. | G06F 21/6254 |
| | | | | 706/12 |
| 2020/0076835 | A1* | 3/2020 | Ladnai ..................... | H04L 63/20 |
| 2020/0175161 | A1* | 6/2020 | Giaconi ................. | G06N 3/084 |
| 2022/0114257 | A1* | 4/2022 | McKerchar ......... | G06F 9/45558 |
| 2022/0166755 | A1* | 5/2022 | Moore ............... | H04L 63/0263 |
| 2023/0012220 | A1* | 1/2023 | Humphrey ............. | G06F 21/53 |
| 2023/0095415 | A1* | 3/2023 | Boyer .................. | G06F 21/556 |
| | | | | 726/23 |
| 2023/0315850 | A1* | 10/2023 | Strogov ............... | G06F 21/561 |
| | | | | 726/24 |
| 2024/0259416 | A1* | 8/2024 | Miyake .............. | H04L 63/1433 |
| 2024/0403413 | A1* | 12/2024 | Cohen ................ | H04L 63/1425 |
| 2024/0414178 | A1* | 12/2024 | Neuvirth-Telem .......................... |
| | | | | H04L 63/1433 |

OTHER PUBLICATIONS

"Intrusion Detection using Network Traffic Profiling and Machine Learning for IoT" 2021 IEEE 7th International Conference on Network Softwarization (NetSoft) 2021.
"Security Analysis of Network Anomalies Mitigation Schemes in IoT Networks" IEEE Access. Feb. 2020.
"Flags" AlphaSOC. [https://docs.alphasoc.com/ae/flags/]. Accessed Feb. 12, 2024.
"Use Cases" AlphaSOC. [https://docs.alphasoc.com/ae/use-cases/]. Accessed Feb. 12, 2024.
"Moving Beyond Indicator Lists" AlphaSOC. Jun. 17, 2021.
"Runtime Defense for Containers" Prisma Cloud TechDocs. Feb. 1, 2024.
"Security in a Converging IT/OT World" SANS Institute. Nov. 2016.
"Symantec Security Analytics: A Cornerstone of Effective Security Incident Response" Symantec. 2019.
"The Problem with Indicator Lists" AlphaSOC. May 11, 2019.
"Threat Intelligence is Dead" AlphaSOC. Apr. 27, 2018.

* cited by examiner

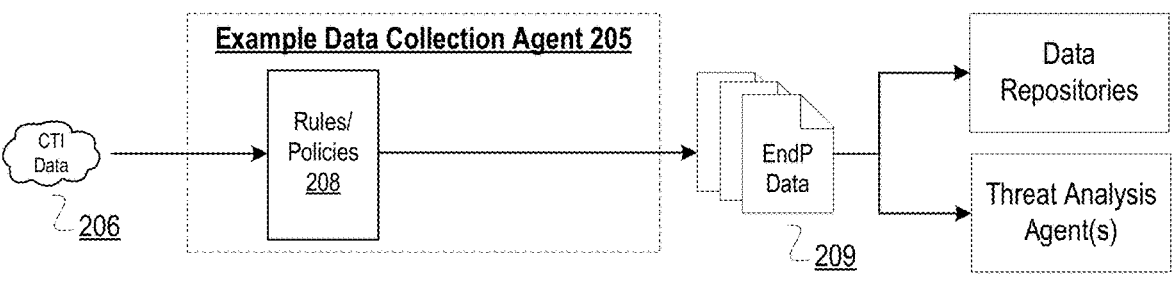
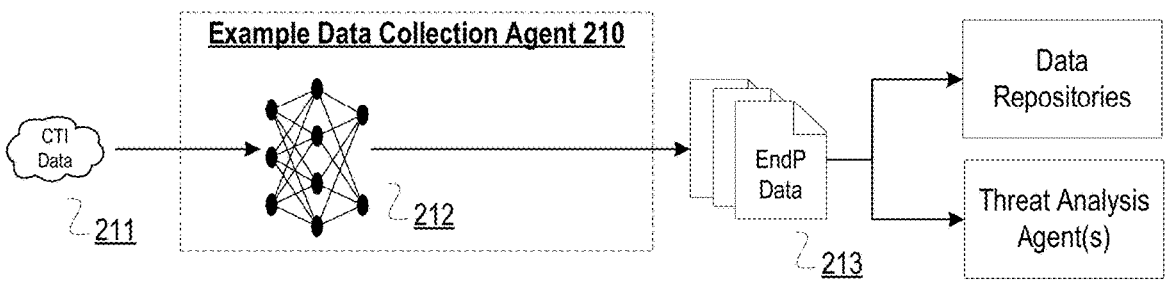
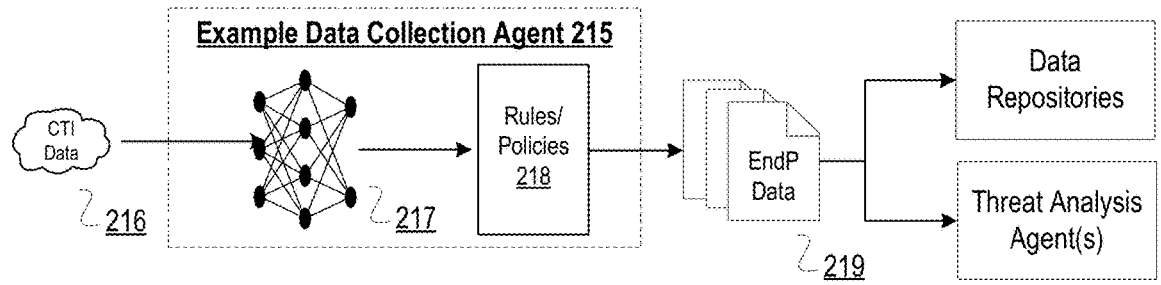
FIG. 2

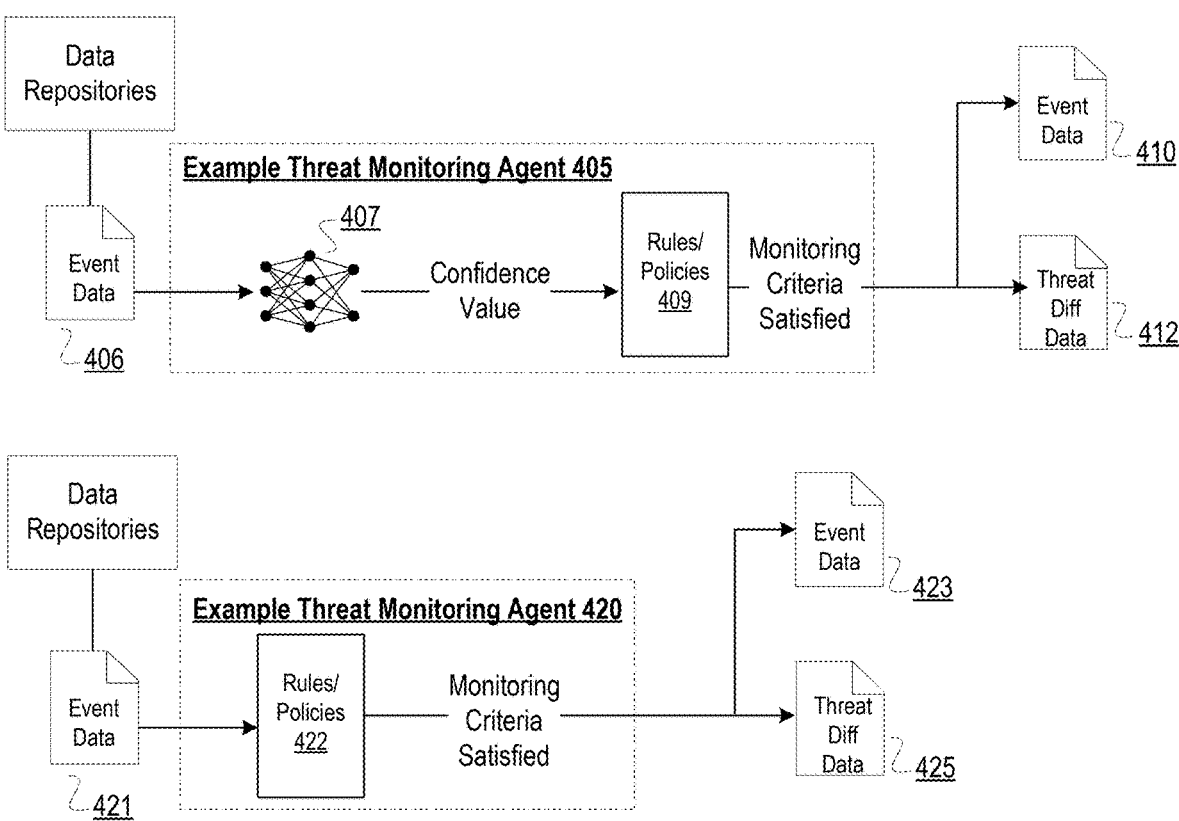
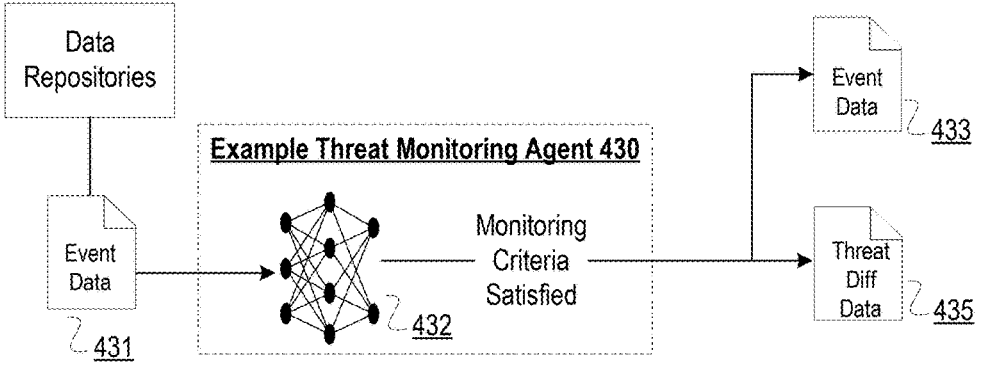
FIG. 4

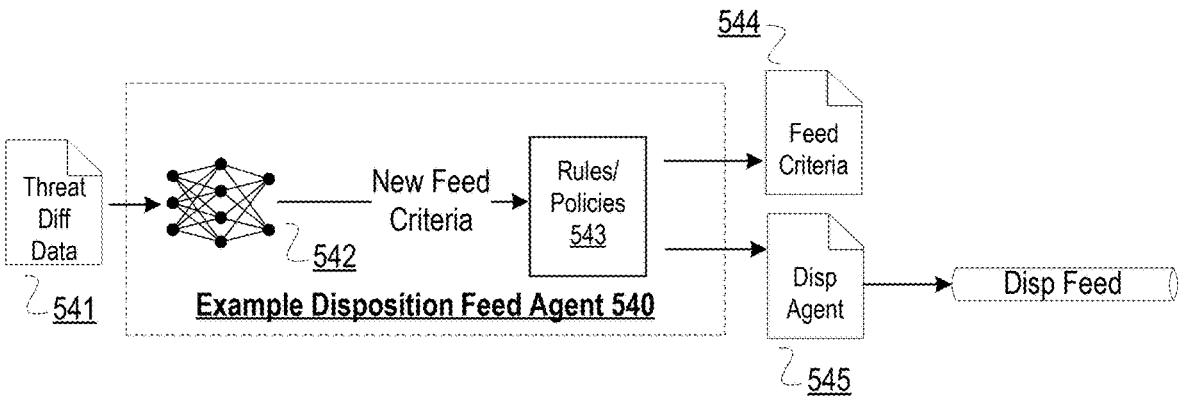
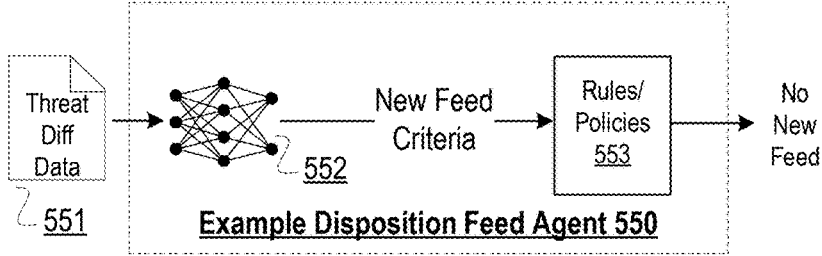
FIG. 5B

Figure 13:
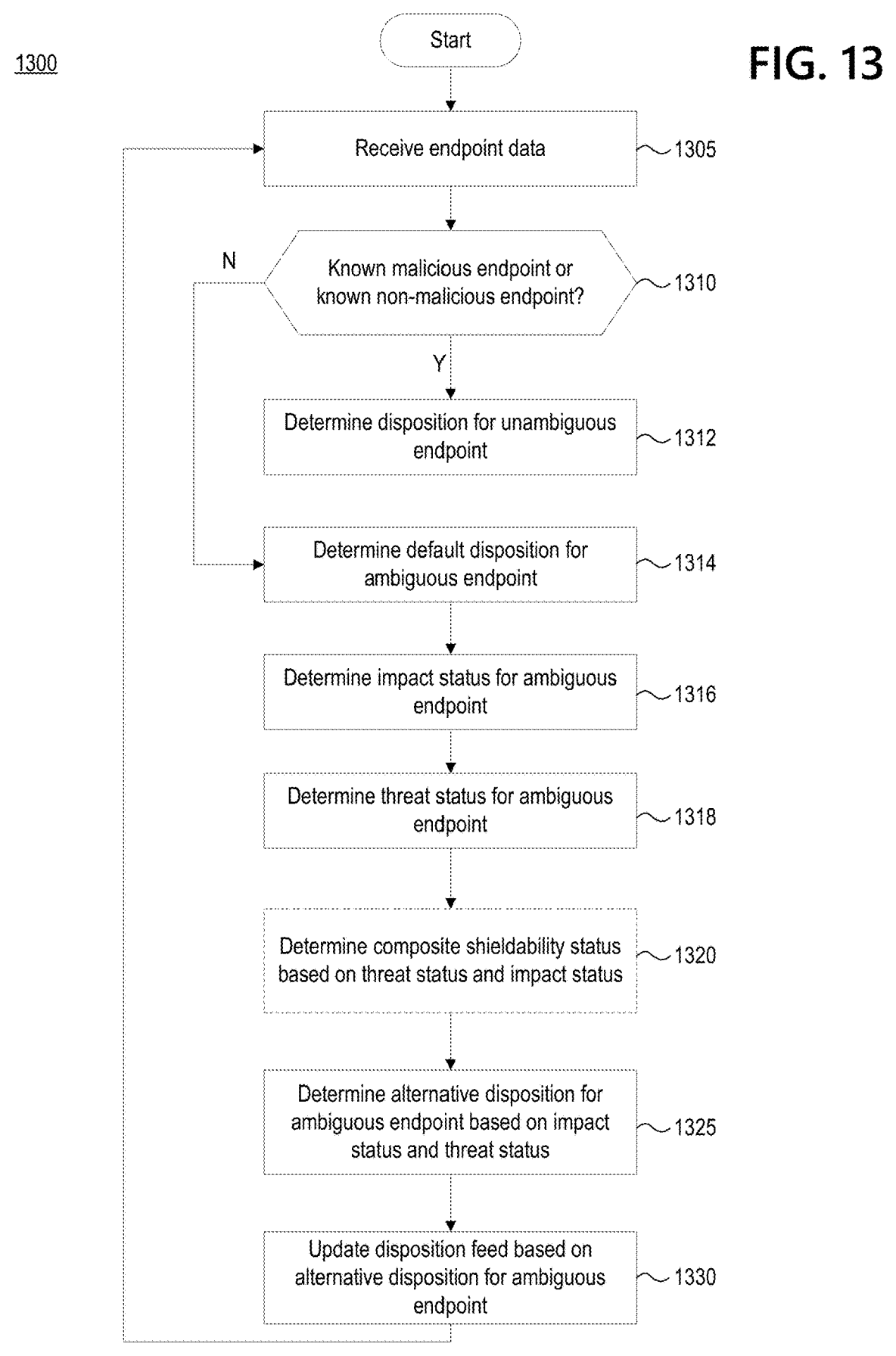

Start

Receive endpoint data — 1305

Known malicious endpoint or known non-malicious endpoint? — 1310

N

Y

Determine disposition for unambiguous endpoint — 1312

Determine default disposition for ambiguous endpoint — 1314

Determine impact status for ambiguous endpoint — 1316

Determine threat status for ambiguous endpoint — 1318

Determine composite shieldability status based on threat status and impact status — 1320

Determine alternative disposition for ambiguous endpoint based on impact status and threat status — 1325

Update disposition feed based on alternative disposition for ambiguous endpoint — 1330

CYBER THREAT DETECTION BASED ON THREAT CONTEXT, THREAT CHANGES AND/OR IMPACT STATUS

RELATED APPLICATION

This application claims the benefit of U.S. Provisional Patent Application No. 63/472,519, filed on Jun. 12, 2023, and titled "Cyber Threat Detection Based on Threat Context and/or Threat Changes," which is incorporated by reference herein in its entirety.

BACKGROUND

Threats to security of a computer network, and other cyber threats, may take a variety of forms (e.g., attempts to cause unauthorized data transfers, hacking attempts, viruses, bots, other types of malware, etc.). The scope of such threats continues to expand, as do the efforts of malicious actors to exploit weaknesses in computer network security. Thus, in view of the expansion and the ongoing efforts of malicious actors, there are evolving problems that need to be addressed when attempting to detect network security threats and other cyber threats. Some systems address the problem of cyber threat detection by receiving cyber threat intelligence (CTI) data from a variety of CTI providers, assembling a feed based on the CTI provider, and determining a disposition as to how to treat network traffic based on the overall CTI data received from the CTI provider. The disposition may be to block the network traffic, monitor the network traffic, and the like. These processes of receiving CTI data, assembling a feed, and determining a disposition may be performed with aims of blocking as much malicious network traffic as possible without affecting non-malicious network traffic. However, because cyber threats may be dynamic and may change over time, achieving both aims may prove difficult. New, emerging threats may have little information known about them. Therefore, if a cyber threat detection system waits until a CTI provider sends additional CTI data about an emerging threat before blocking, malicious network traffic may be allowed. Further, if cyber threat detection system does not wait for the CTI provider to send additional CTI data and blocks emerging threats quickly, non-malicious network traffic may be blocked as a result. Allowing malicious network traffic and blocking non-malicious network traffic are both undesirable outcomes.

SUMMARY

The following presents a simplified summary of various aspects described herein. This summary is not an extensive overview, and is not intended to identify key or critical elements or to delineate the scope of any claim. The following summary merely presents some concepts in a simplified form as an introductory prelude to the more detailed description provided below.

Aspects described herein may address one or more problems of cyber threat detection and/or may generally improve systems that perform cyber threat detection. For example, some aspects described herein allow for cyber threats to be detected based on threat changes. More particularly, CTI data may be received from a provider and the CTI data may include evidence, or otherwise indicate, that the endpoint is a cyber threat. This evidence may be compared to other, previously-received, evidence that the endpoint is a cyber threat. Based on the comparison, a determination may be made as to whether any of the evidence has changed and, if there are any changes, dispositions may be determined and sent for the endpoint.

As another example, some aspects described herein allow for cyber threats to be detected based on threat context. More particularly, as a new, emerging cyber threat is identified from one provider, the system may wait until one or more other providers also identify the emerging cyber threat before determining a disposition that indicates network traffic associated with the emerging cyber threat should be blocked.

As another example, some aspects described herein may allow for dispositions to be determined based on an end-point-by-endpoint basis. In this way, network traffic can be blocked, allowed, etc. based on its association with a particular endpoint that one or more providers have indicated as a cyber threat.

As yet another example, some aspects described herein may use machine-learning models to assist in processing CTI data, analyzing the CTI data, performing additional analyses, performing threat monitoring, determining feeds that include dispositions, and/or determining an alternative disposition for an endpoint based on an impact status indicating a potential impact of blocking legitimate network traffic to and/or from (to/from) that endpoint. As one example, providers may send CTI data in many different formats and may provide evidence that an endpoint is a cyber threat in many different ways. Machine learning models may be trained to assist in processing the many different formats of CTI data. Once trained, machine learning models may be used as part of a process that extracts the evidence indicating that an endpoint is a cyber threat and provides that evidence in a common format and/or common notation. As another example, machine learning models may be trained to assist in determining whether blocking potentially legitimate network traffic to and/or from an endpoint would impact an entity's operations (e.g., business operations). Once trained, machine learning models may be used as part of a process that determines an alternative disposition for an endpoint that is not known to be a malicious endpoint and that is not known to be a non-malicious endpoint.

These features, along with many others, are discussed in greater detail below. Corresponding apparatus, systems, and computer-readable media are also within the scope of the disclosure.

BRIEF DESCRIPTION OF THE DRAWINGS

The present disclosure is illustrated by way of example and not limited in the accompanying figures in which like reference numerals indicate similar elements and in which:

FIG. 2 depicts block diagrams that provide examples related to data collection according to various aspects described herein.

FIG. 4 depicts block diagrams that provide examples related to threat monitoring according to various aspects described herein.

FIGS. 5A-5B depict block diagrams that provide examples related to disposition feeds according to various aspects described herein.

FIG. 13 depicts an example method for determining disposition feeds based on impact status according to various aspects described herein.

DETAILED DESCRIPTION

Figure 1:
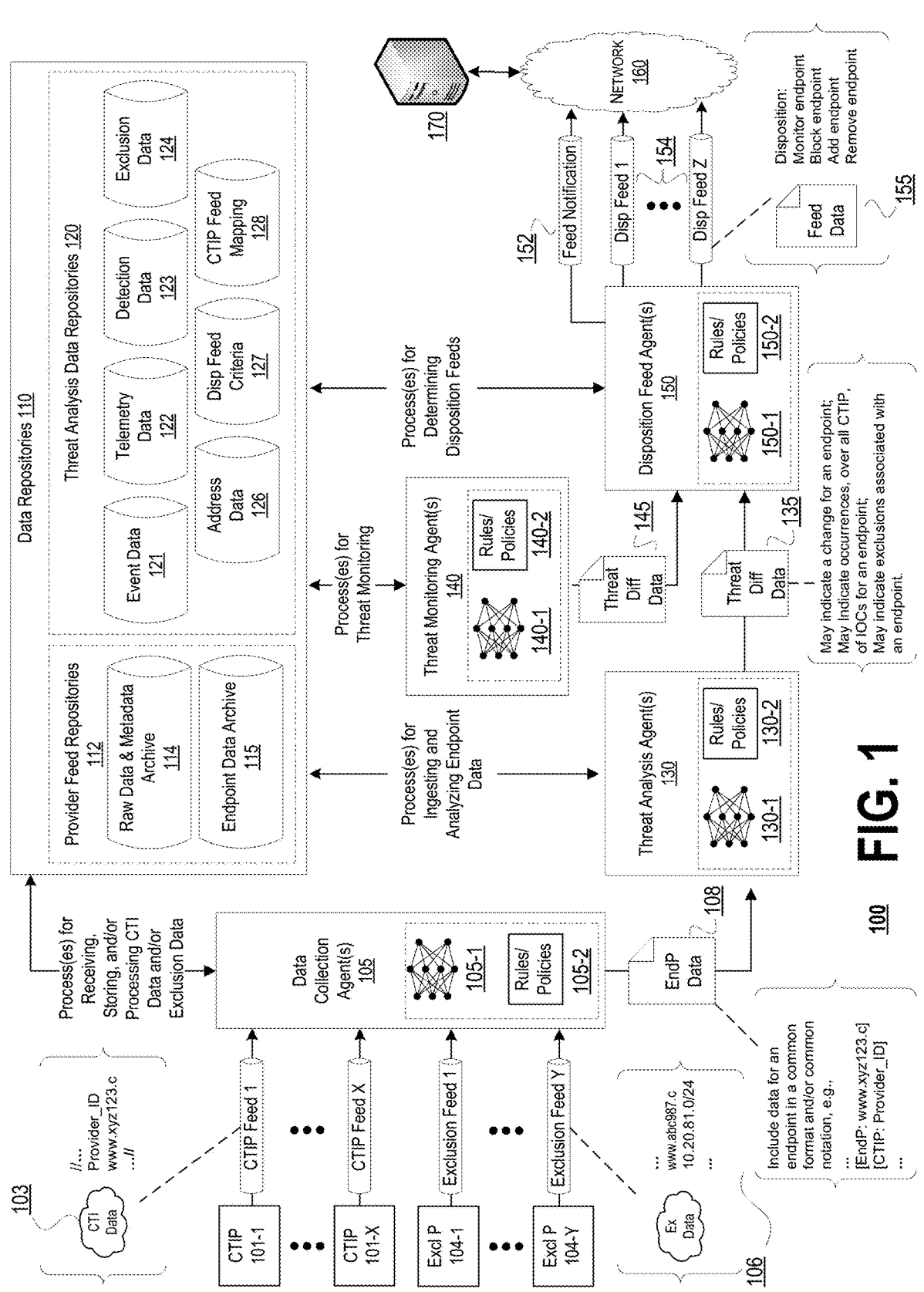
FIG. 1 depicts a block diagram of an example computing environment that may be configured to detect cyber threats based on threat context and/or threat changes.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for detecting cyber threats based on threat context and/or threat changes. A cyber threat may comprise an effort, or a suspected effort, by one or more threat actors to take some type of unauthorized action affecting computing devices and/or a network of a targeted entity. Threat actors may comprise criminals, criminal organizations, nation states, or other persons or groups. Unauthorized action may comprise damaging and/or disabling equipment (e.g., ransomware, hacking of networked control systems to disable and/or damage industrial equipment), accessing and/or stealing data (e.g., exfiltration), causing a computing device and/or network to perform operations to benefit a threat actor (e.g., bots to generate spam, mine cryptocurrency, perform denial of service attacks, etc.), and/or any other type of action that is unauthorized by the targeted entity. Without in any way limiting the generality of the foregoing, cyber threats may comprise viruses and other malware, phishing attacks, attempts to hack web servers, etc.

Based on the methods and techniques described herein, one or more problems of cyber threat detection may be addressed and/or systems that perform cyber threat detection may be improved. As one example, cyber threats may be detected based on threat context and/or threat changes. Threat context may include, for example, evidence, or other indications, that an endpoint is a cyber threat. Such evidence and other indications may be included in CTI data sent from providers over time. Further, the evidence may be used to determine if the evidence has changed over time. In these ways, cyber threat detection may be based on threat context determined from CTI data received from providers over time and/or whether the threat context indicates a changing cyber threat. This may improve cyber threat detection by allowing for more accurate responses to emerging cyber threats (e.g., block increased amounts of malicious network traffic, block the malicious network traffic more quickly, and/or allow increased amounts of non-malicious network traffic while a new cyber threat emerges).

In general, a cyber threat may evolve and/or otherwise change over time. As more information is learned about a particular cyber threat, CTI data regarding that threat may become more accurate and/or reliable. Conversely, older CTI data may become (or have become) less reliable. For example, the older CTI data may have indicated that the cyber threat was less severe and/or less of a concern, but later CTI data may indicate that the cyber threat is more of a problem than was originally believed. As another example, the older CTI may have provided certain information (e.g., one or more indicators of comprise) for detecting the cyber threat, but some of that information may later be determined to be inapplicable and/or not relevant, and the later CTI data may include more focused and/or more accurate information. As a further example, threat actors may change methods used to attack networks (e.g., to camouflage their later attempts or otherwise avoiding repeating behaviors that network security systems are likely to identify), and later CTI may indicate new and/or changed IOCs and/or other information relating to changed attack methods. As a yet further example, the older CTI data may indicate a cyber threat, but the CTI data may have been received from a single provider. Based on this, there may not be sufficient confidence to block network traffic associated with the cyber threat. The later CTI data may indicate the same cyber threat, but may have been received from plural providers. As more and more CTI data is received from more and more providers, there may be sufficient confidence to block network traffic associated with the cyber threat.

As another example, dispositions may be determined on an endpoint-by-endpoint basis. In this way, malicious network traffic can be blocked, allowed, etc. based on its association with a particular endpoint that one or more providers have indicated as a cyber threat. This may improve cyber threat detection by allowing for more accurate responses to emerging cyber threats (e.g., block increased amounts of malicious network traffic, block the malicious network traffic more quickly, and/or allow increased amounts of non-malicious network traffic while a new cyber threat emerges).

An endpoint may be one or more network-connected devices, such as laptops, mobile devices, servers, internet-of-things (IoT) devices, and the like. An endpoint may be identified by a domain name, a universal resource identifier (URI), an Internet Protocol (IP) address, a classless inter-domain routing (CIDR) address, a multi-dimensional (MD) indicator (e.g., an indicator that includes an address and a range of ports), a range of addresses (e.g., a range of IP addresses), or some other information that identifies an endpoint in CTI data. In this way, cyber threats may be detected and/or dispositions may be determined for particular domain names, URIs, IP addresses, CIDR addresses, MD indicators, ranges of addresses, and the like.

A provider may indicate that an endpoint is a cyber threat by including at least one indicator of compromise (IOC) for the endpoint. An IOC may provide evidence that an endpoint is a cyber threat (e.g., evidence that network security of the endpoint has been breached). The form and manner in which an IOC provides the evidence that an endpoint is a cyber threat may depend on the provider and, therefore, an IOC may take many different forms and be expressed in many different manners by providers. As some examples, an IOC may comprise 5-tuple values (host/resource identifiers specifying L3 host IP addresses, L4 ports, and/or associated L3 protocol types) or a portion thereof, one or more other L3 header field values or a portion thereof, one or more other L4 header field values or a portion thereof, one or more L2 header field values or a portion thereof, a protocol version, a host name or a portion thereof, a domain name (e.g., a fully qualified domain name (FQDN)), a portion of a domain name (e.g., a top-level domain and/or subdomain), a URI or a portion thereof, a universal resource locator (URL) or a portion thereof, a certificate or portion thereof, a certificate identifier or a portion thereof, a certificate authority identifier or a portion thereof, a size of a packet or of a portion of a packet, an indicator associated with a data payload portion of a packet, an HTTP request method type (e.g., GET, PUT, PUSH, CONNECT, etc.), etc. An IOC may comprise metadata relating to one or more packets. For example, an IOC may comprise one or more types of information relating to one or more parameters or characteristics that are observable based on behavior of (or action resulting from) a packet and/or a collection of packets. For example, an IOC may comprise a time associated with communicating a packet, whether the packet has a specified temporal or other relation to one or more other packets, directionality (e.g., incoming or outgoing), etc. In some variations, an IOC may take the form of a network threat indicator (NTI), which may provide additional network information than other, more general, forms of IOCs.

Aspects discussed herein also may relate to methods and techniques for addressing challenges associated with CTI-based and/or IOC cyber threat detection. For some endpoints, such as newly identified endpoints or never-before-seen endpoints, the CTI data may not be sufficient to determine a particular disposition for those endpoints. For example, CTI data may not exist yet for an endpoint or the CTI data that does exist may be low-confidence CTI data that does not satisfy a confidence threshold necessary to determine a disposition. For such endpoints, a default disposition may apply that depends on the risk tolerance of the entity managing the network. For example, a default block disposition may apply to network traffic to and/or from such endpoints for entities with relatively lower risk tolerance, and a default allow disposition may apply to network traffic to and/or from such endpoints for entities with relatively higher risk tolerances. A default block disposition, however, may block legitimate network traffic thus negatively impacting the network activities of an entity. On the other hand, a default allow disposition may allow illegitimate (e.g., malicious) network traffic into an entity's network thus exposing the network to cyber threats. To improve on the use of default dispositions, the impact of blocking potentially legitimate network traffic may be considered to determine an alternative disposition, different from the default disposition, applied to endpoints having little (or no) CTI data or having low-confidence CTI data. This may improve the risk profile for an entity. For example, blocking network traffic that does not meaningfully impact an entity's network activities may improve the risk profile for that entity in the event such traffic constitutes a threat to the network.

Figure 11A:
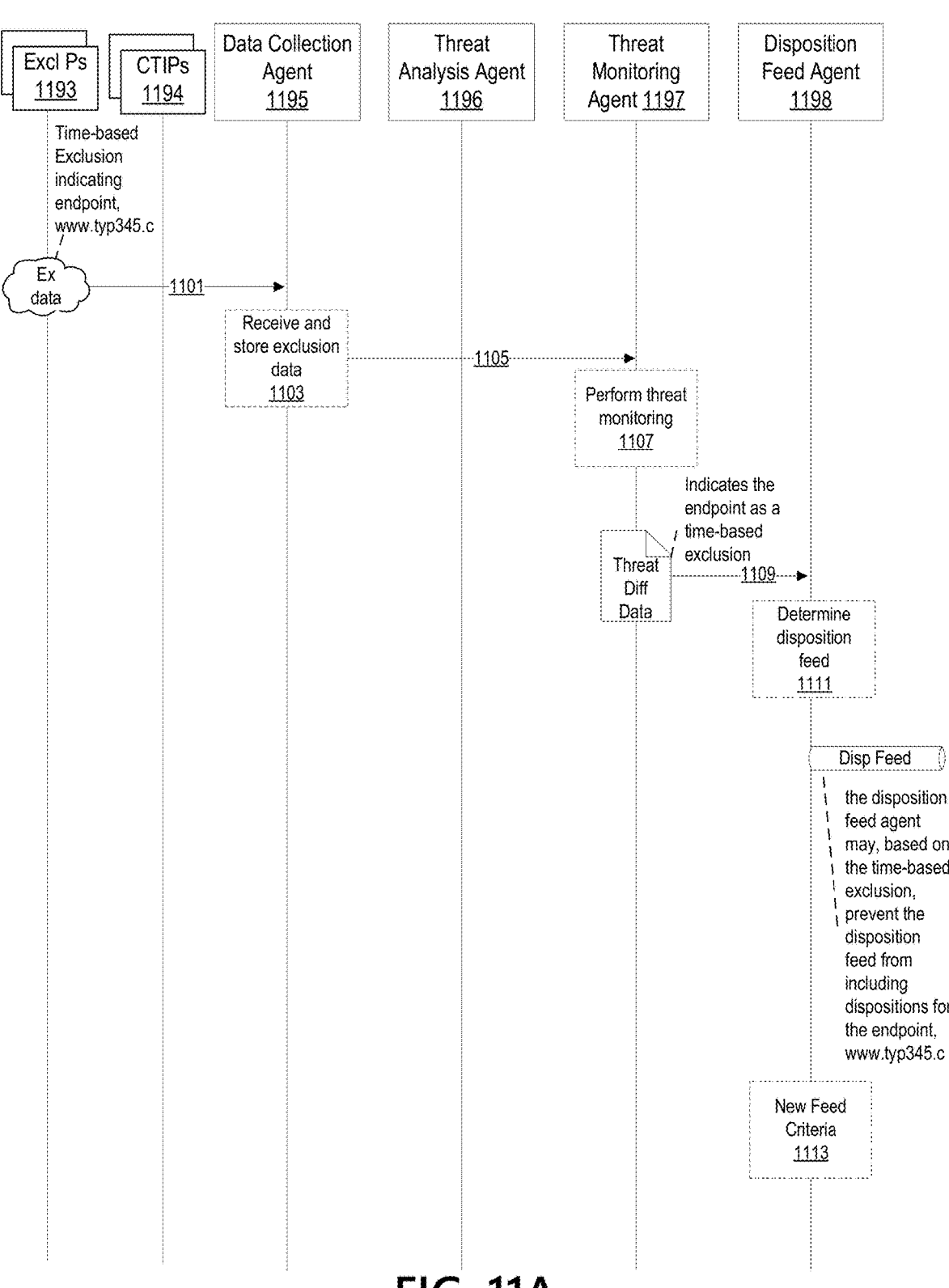
FIGS. 11A-11B depict example flows for a time-based exclusion according to various aspects described herein.
Figure 11B:
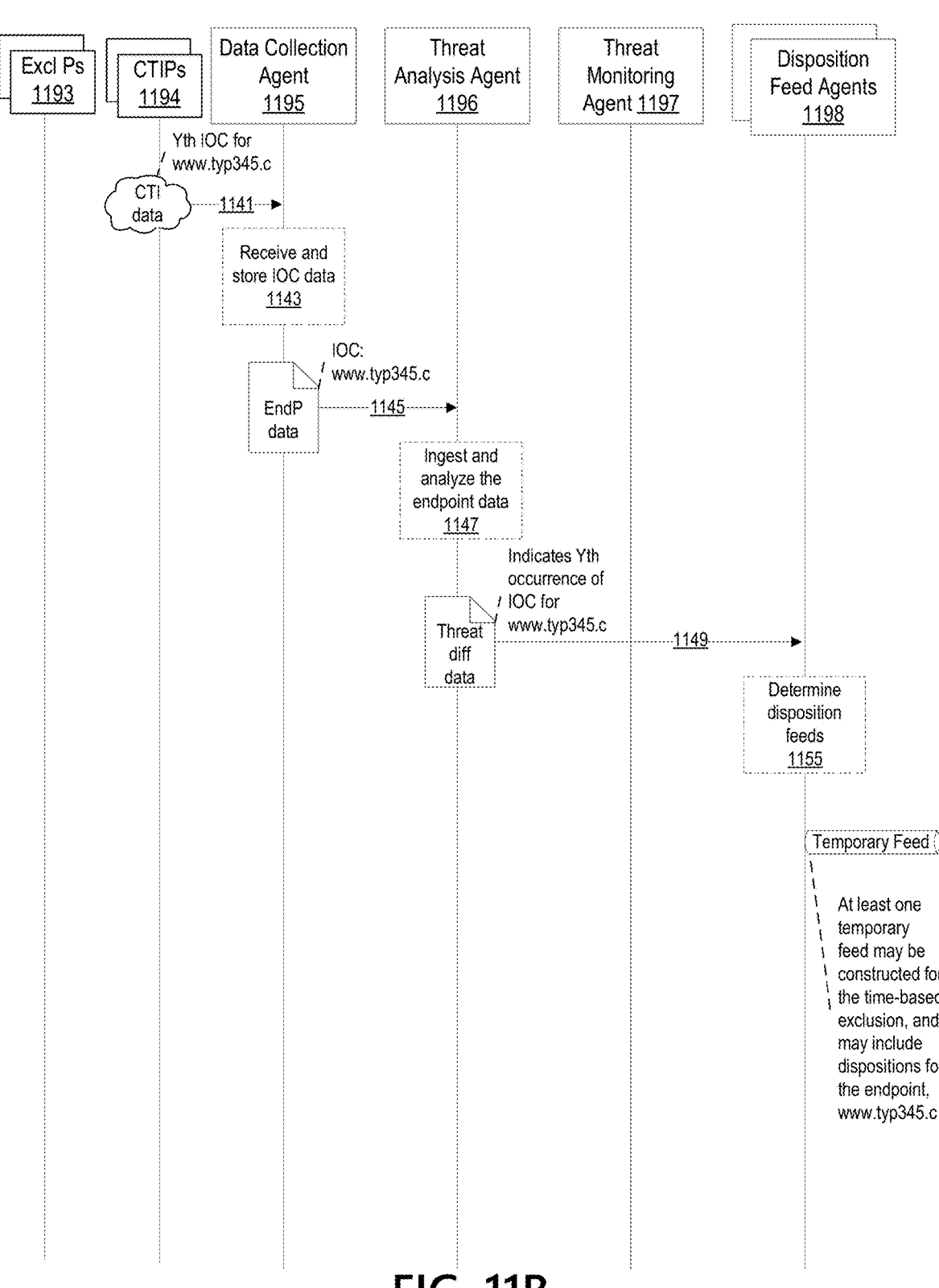
Figure 12:
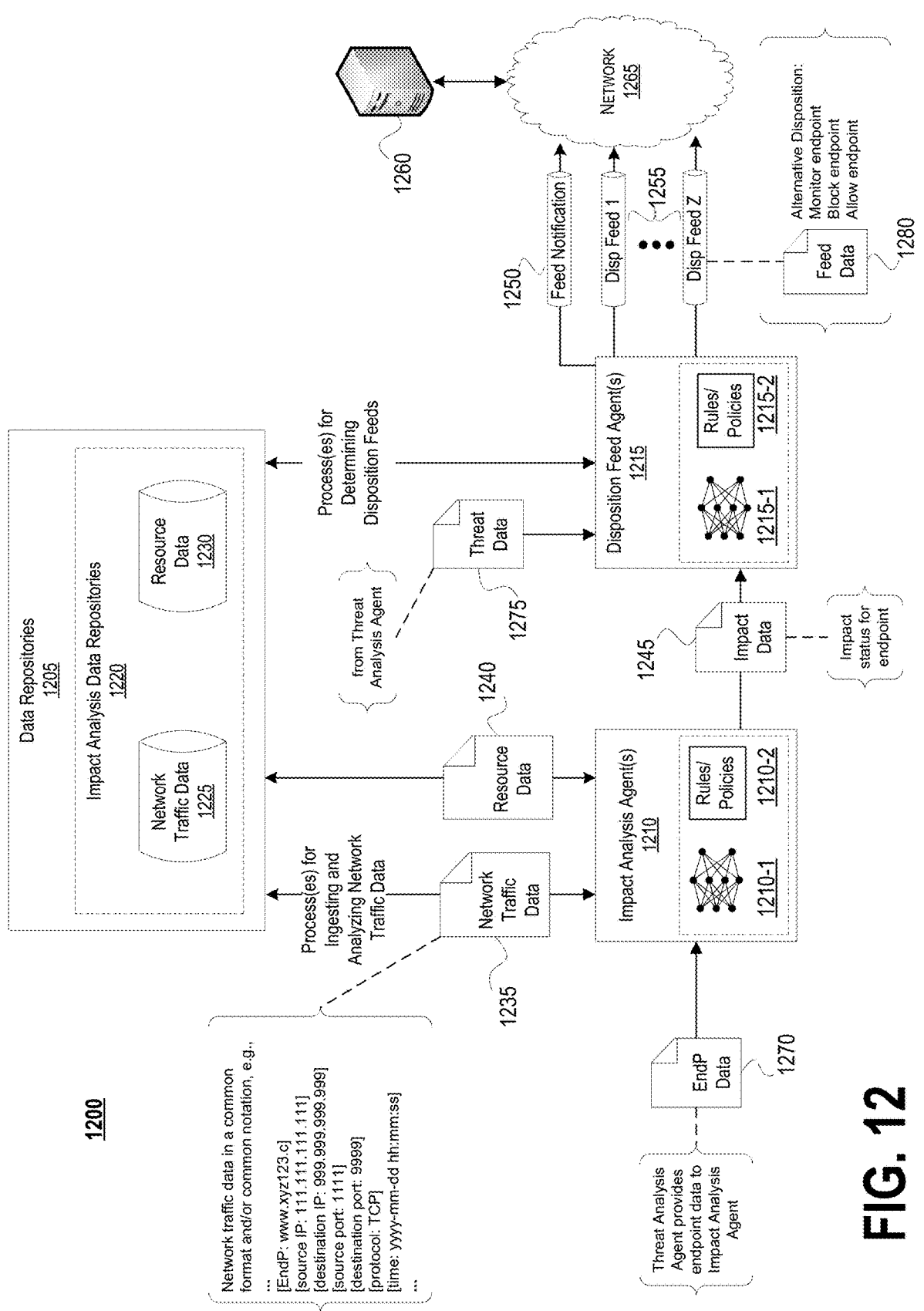
FIG. 12 depicts a block diagram of an example computing environment that may be configured to address cyber threats based on impact status according to various aspects described herein.
Figure 14:
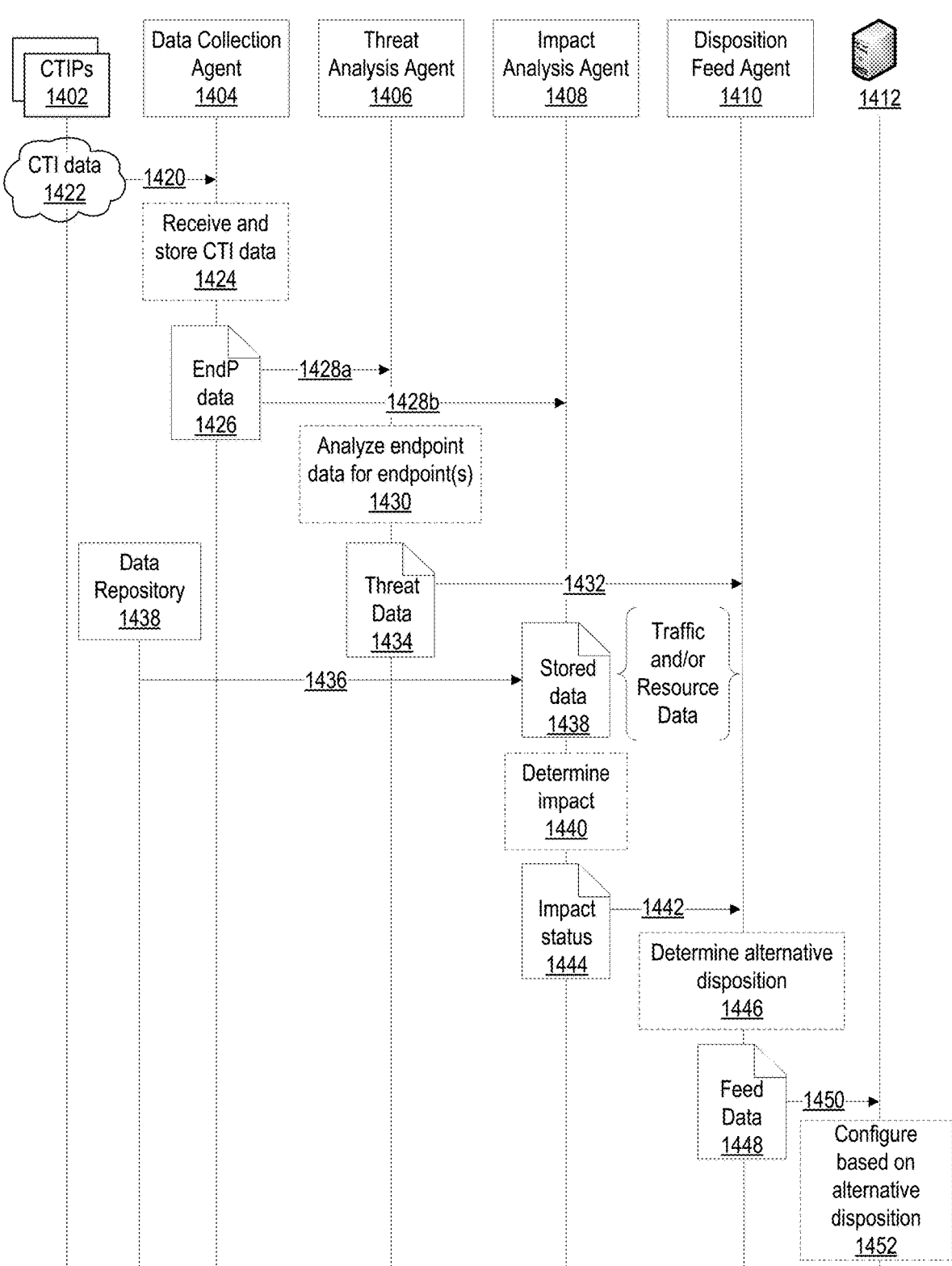
FIG. 14 depicts an example flow for determining disposition feeds based on impact status according to various aspects described herein.
Figure 15:
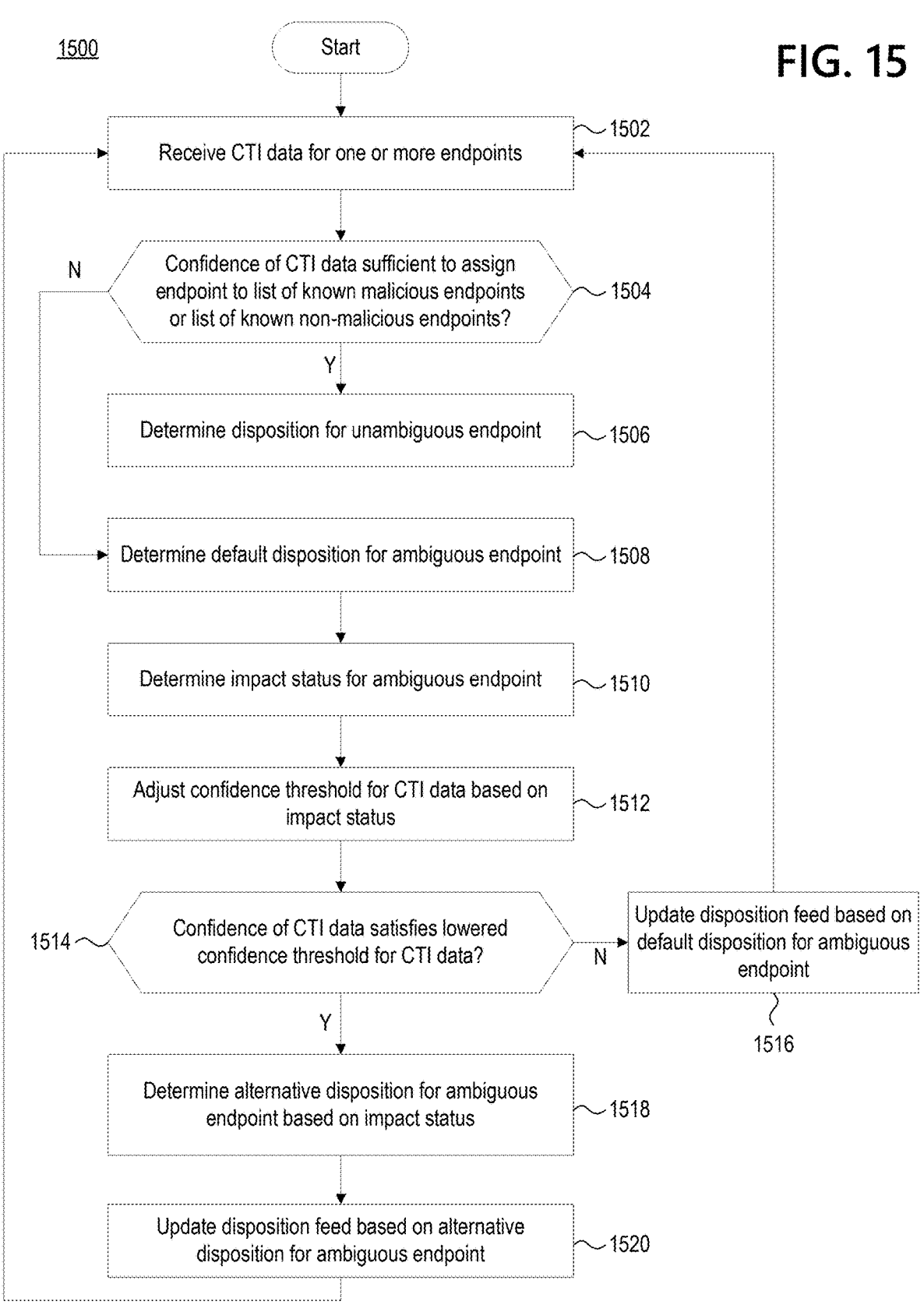
FIG. 15 depicts another example method for determining disposition feeds based on impact status according to various aspects described herein.
Figure 16:
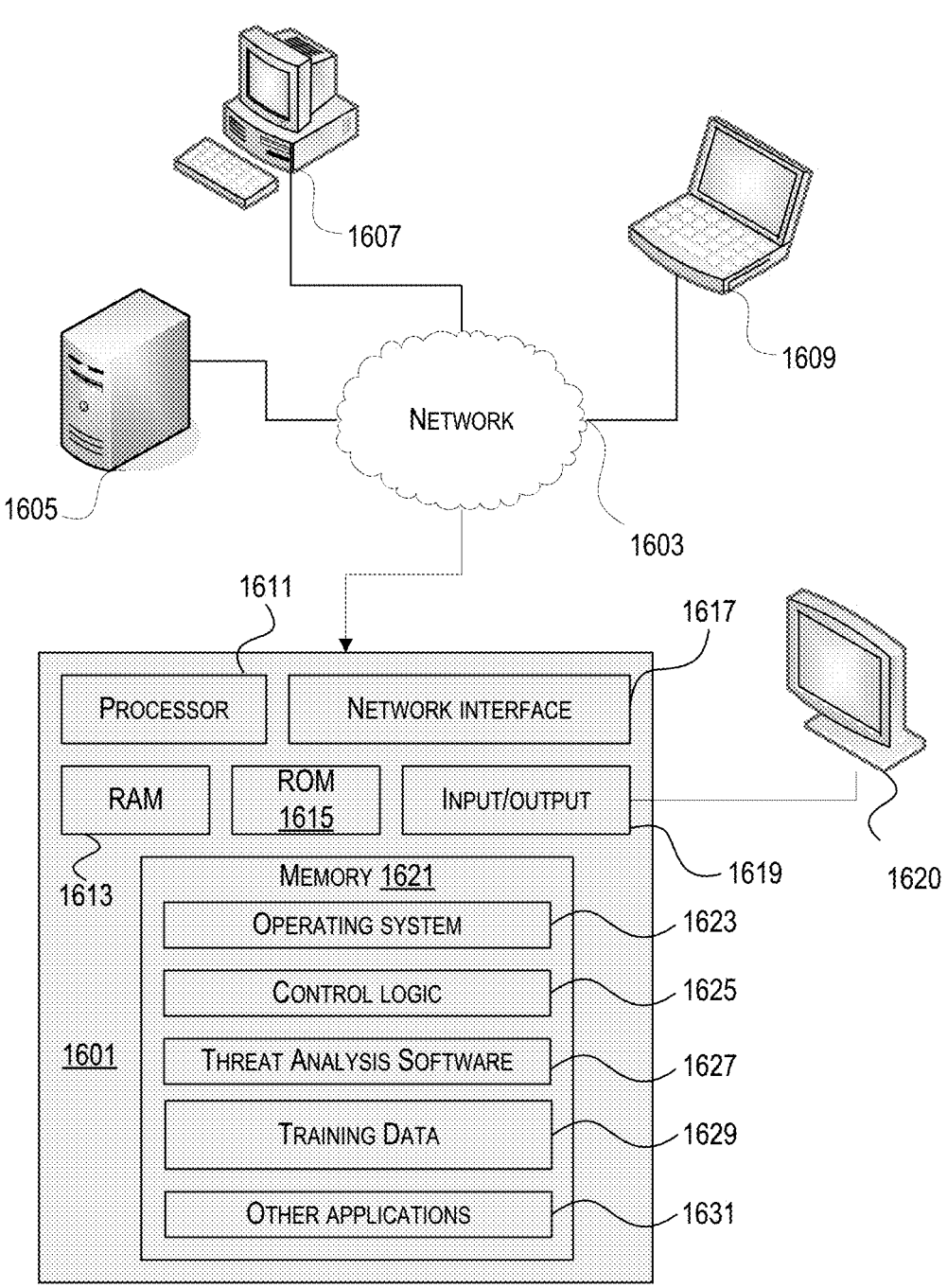
FIG. 16 depicts an example of a computing device that may be used in implementing one or more aspects described herein.

Additional examples, and details, of the above introduction, as well as other examples and details, will be discussed below in connection with FIGS. 1-16. FIG. 1 depicts a block diagram that provides an example computing environment 100 in which cyber threats may be detected. FIGS. 2, 3A-3D, 4, and 5A-5B depict block diagrams that provide further examples of ways in which the example computing environment 100 may be implemented to detect cyber threats, such as by configuring machine learning models and/or rules/policies in particular example configurations. FIGS. 6A-6B and 7-9 depict example methods that may be performed by the example computing environment 100 in connection with detecting cyber threats. FIGS. 10A-10F and 11A-11B depict example flows showing how the example computing environment 100 may operate in connection with detecting cyber threats. FIG. 12 depicts a block diagram of an example computing environment 1200 that may be configured to address cyber threats based on impact status. FIG. 13 depicts an example method that may be performed by the example computing environment 1200 in connection with addressing cyber threats based on impact status. FIG. 14 depicts an example flow showing how the example computing environment 1200 may operate in connection with addressing cyber threats based on impact status. FIG. 15 depicts another example method an example method that may be performed by the example computing environment 1200 in connection with addressing cyber threats based on impact status. FIG. 16 depicts an example of a computing device that may be used in implementing various components of the example computing environment 100.

FIG. 1 depicts a block diagram of an example computing environment 100 that may be configured to detect cyber threats based on threat context and/or threat changes. The computing environment 100 may be an enterprise computing environment that, among other things, provides a cyber threat detection service to enterprise customers. As a brief overview, the computing environment 100 is depicted as including data repositories 110 and various agents 105, 130, 140, 150 that, together, detect cyber threats based on threat context and/or threat changes. The data repositories 110 may be implemented on one or more storage devices. The various agents 105, 130, 140, 150 may be implemented on one or more computing devices. The data repositories 110 and the various agents 105, 130, 140, 150 may be located locally or remotely from each other. Further, some or all of the data repositories 110 and the various agents 105, 130, 140, 150 may be implemented using a cloud computing service (e.g., the data repositories 110 may be implemented using a cloud computing service, and the various agents 105, 130, 140, 150 may be implemented on one or more computing devices that communicate with the cloud computing service via one or more networks). The computing environment 100 may include additional components not depicted in FIG. 1 including, for example, additional data repositories, additional computing devices, and/or additional networks.

In connection with the detection of cyber threats, the example computing environment 100 depicts the data repositories 110 as including particular types of data repositories (e.g., provider feed repositories 112, threat analysis data repositories 120) and specific data repositories that store particular types of data (e.g., raw data and metadata archive 114, endpoint data archive 115, event data repository 121, telemetry repository 122, detection data repository 123, exclusion data repository 124, address data repository 126, disposition feed criteria repository 127, and CTI mapping repository 128). The depicted data repositories 110 are provided as examples of the repositories that may be used when detecting cyber threats. Some variations may include different, additional, or fewer data repositories than those shown in the example computing environment 100 of FIG. 1.

Also in connection with the detection of cyber threats, the example computing environment 100 depicts the various agents 105, 130, 140, 150 as performing various processes that may send and/or receive data to/from the data repositories 110; receiving particular input data; and providing particular output data. Indeed, one or more data collection agents 105 are depicted as receiving one or more types of data from various providers 101-1 to 101-X; performing one or more processes for receiving, storing, and/or processing received data; and outputting endpoint data 108. One or more threat analysis agents 130 are depicted as receiving the endpoint data 108; performing one or more processes for ingesting and analyzing the endpoint, and other, data; and outputting threat differential data 135. One or more threat monitoring agents 140 are depicted as performing one or more processes for threat monitoring and outputting threat differential data 145. One or more disposition feed agents 150 are depicted as receiving threat differential data (e.g., threat differential data 135 from the one or more threat analysis agents 130 and threat differential data 145 from the one or more threat monitoring agents 140); and performing one or more processes for determining disposition feeds; and outputting feed notification 152 and disposition feeds 154 (e.g., disposition feed 1 to disposition feed Z), any of which may be received by the computing device 170 via the network 160. The depicted agents 105, 130, 140, 150, processes, input data, and output data are provided as examples that may be used when detecting cyber threats. Some variations may include different, additional, or fewer agents; different, additional, or fewer processes; different, additional, or fewer types of input data; and different, additional, or fewer types of output data than those shown in the example computing environment of FIG. 1.

Also in connection with the detection of cyber threats, the example computing environment 100 depicts the various agents 105, 130, 140, 150 as including machine-learning models and/or rules/policies. For example and as depicted in FIG. 1, the one or more data collection agents 105 may include one or more machine-learning models 105-1 and rules/policies 105-2. The one or more threat analysis agents 130 may include machine-learning model 130-1 and rules/policies 130-2. The one or more threat monitoring agents 140 may include machine-learning model 140-1 and rules/policies 140-2. The one or more disposition feed agents 150 may include machine-learning model 150-1 and rules/policies 150-2. The depicted machine-learning models and rules/policies are provided as examples that may be used by the various agents 105, 130, 140, 150 in connection with detection of cyber threats. Some variations may include different, additional, or fewer machine-learning models and/or rules/policies than those shown in FIG. 1. Details of the machine-learning models and rules/policies will be discussed below and, in particular, in connection with FIGS. 2, 3A-3D, 4, and 5A-5B.

A more detailed discussion of the example computing environment 100 and how it detects cyber threats can begin with the providers 101-1 to 101-X and the one or more data collection agents 105. A provider may be any source of data including an external entity (e.g., a provider external to an enterprise providing the cyber detection service), an internal entity (e.g., a provider internal to an enterprise providing the cyber detection service), a non-government organization, a government organization, an open source organization, a subscription-based entity, and the like. Providers 101-1 to 101-X may publish, or otherwise send, various types of data via provider feeds 101-1 to 101-X. The example computing environment 100 illustrates two example types of data that may be sent via a provider feed: CTI data (e.g., shown at CTI data 103) and exclusion data (e.g., shown at Ex data 106). Each provider feed may deliver data in real-time, based on a publication schedule, and/or based on application programming interface (API) requests.

One or more providers 101-1 to 101-X may, via its own provider feed, send its own data in any suitable format. Often, providers use a proprietary format for its own data. In this way, data received from different providers may have different structure, organization, representation, and/or semantics. For example, as depicted in FIG. 1, provider 101-1 provides, via provider feed 1, CTI data 103. CTI data 103 may be formatted in accordance with a proprietary CTI data scheme specific to provider 101-1. Thus, the structure, organization, representation, and/or semantics of CTI data 103 may differ from CTI data provided via different feeds and/or by different providers. Some non-exhaustive examples of formats for CTI data include JavaScript Object Notation (JSON), comma-separated values (CSV), Extensible Markup Language (XML), Structured Threat Information Expression (STIX), and text file. Further, even if CTI data from different feeds and/or different providers are formatted in a similar way (e.g., CTI data from two different providers are both formatted using JSON), the manner in which the CTI data is expressed may be different (e.g., the two different CTIP providers may use different labeling schemes). Further, CTI data may be structured in a wide variety of ways including more simple structures and more complex structures. For example, some CTI data may include a single element of CTI (e.g., an IOC for a single endpoint). Other CTI data may include plural elements organized as a list (e.g., each row includes an element). Yet other CTI data may include elements structured at greater complexity. CTI data may include a wide variety in volume of data. For example, some CTI data may be one or more kilobytes in size, while other CTI data may be one or more terabytes in size.

CTI data may be received in a variety of ways. For example, some providers may allow for an entire file of CTI data to be downloaded in a single transaction. In this way, some CTI data received by the one or more data collectors 105 in a single transaction (e.g., a single download and/or a single API call) may include an entire file. Other providers may require multiple downloads and/or multiple API calls to download an entire file of CTI data. In this way, some CTI data received by the one or more data collectors 105 in a single transaction may include a subset of an entire file (e.g., a page of the entire file).

CTI data 103 provides a brief example of CTI data. As depicted in FIG. 1, CTI data 103 includes, among other data, an identifier of the provider 101-1 ("Provider_ID") and an identification of an endpoint ("www.xyz123.c"). The CTI data 103, based on the identification of the endpoint, may include an IOC for the endpoint. In this way, the CTI data 103 may indicate the endpoint is a potential cyber threat. As indicated by the " . . . " of the brief example provided by CTI data 103, CTI data may include much more information than an identifier of a CTI provider and an identification of an endpoint. Indeed, CTI data may include information for any number of endpoints, metadata associated with the endpoints and/or the provider, as well as other data not meant to be indicative of an IOC or a cyber threat (e.g., geospatial data). More generally, CTI data may include evidence, and other information, about a cyber threat posed by one or more endpoints. CTI data may indicate the nature of the threat posed by the one or more endpoints. For example, CTI data may indicate that a threat posed by a particular endpoint involves a virus or other malware, a bot, a phishing attack, an exfiltration, a hacking attempt, and/or some other type of activity that is known or suspected. CTI data may include information about threat actors associated with, or suspected to be associated with, the endpoint. CTI data may explicitly identify one or more IOCs, and/or IOCs may be derivable from information included in CTI data. CTI data may comprise a threat level that has a value indicating a confidence the endpoint being a cyber threat.

CTI data may provide, and often does, indicate an incomplete assessment of the cyber threat posed by an endpoint. For example, CTI data may include one type of IOC for an endpoint, but may lack other types of IOCs and/or may lack threat context associated with the endpoint. Over time, the providers 101-1 to 101-X may provide new CTI data that allows for a more complete assessment of the cyber threat posed by the endpoint. The new CTI data may include additional types of IOCs for the endpoint and/or changes to IOCs provided in earlier CTI data for the endpoint. A change to IOCs may result in later CTI data including an IOC not included in earlier CTI data, and/or later CTI data not including an IOC included in earlier CTI data. As will be apparent based on the examples discussed throughout this disclosure, changes provided by the CTI data, including changes to IOCs, may provide a basis for analyzing the cyber threat posed by an endpoint and determining a disposition for the endpoint, which indicates how devices should filter network traffic associated with the endpoint.

Exclusion data may identify, or otherwise indicate, one or more endpoints as exclusions. The exclusion may indicate one or more conditions on which to prevent publication of an endpoint, or any disposition associated with that endpoint, into a disposition feed. In this way, while the one or more conditions of the exclusion are satisfied, devices that receive the disposition feeds (e.g., computing device 170) may not receive a disposition that indicates to block network traffic associated with the endpoint. The one or more conditions may depend on the type of exclusion. Types of exclusions may include global exclusions and time-based exclusions, both of which will be discussed in more detail below. As various properties of an endpoint may change over time, such as the IP address of the endpoint, exclusion data for an endpoint may also change over time and, therefore, providers have a need to update exclusion data.

One or more providers 101-1 to 101-X may, via its own feed, send its own exclusion data in any suitable format. Often, exclusion providers use a proprietary format for its own exclusion data. In this way, exclusion data received from different exclusion providers may have different structure, organization, representation, and/or semantics. For example, as depicted in FIG. 1, exclusion provider 101-X provides, via provider feed X, exclusion data 106. Exclusion data 106 may be formatted in accordance with a proprietary exclusion data scheme specific to exclusion provider 101-X. Thus, the structure, organization, representation, and/or semantics of the exclusion data 106 may differ from exclusion data provided via different feeds and/or by different providers. Some non-exhaustive examples of formats for exclusion data include JavaScript Object Notation (JSON), comma-separated values (CSV), Extensible Markup Language (XML), Structured Threat Information Expression (STIX), and text file. Further, even if exclusion data from different feeds and/or different providers are formatted in a similar way (e.g., exclusion data from two different providers are both formatted using a text file), the manner in which the exclusion data is expressed may be different (e.g., the two different exclusion providers may use different labeling schemes). Further, exclusion data may be structured in a wide variety of ways including more simple structures and more complex structures. For example, some exclusion data may include a listing of endpoints for exclusion. Yet other exclusion data may include elements structured at greater complexity including, for example, a structure that identifies what type of exclusion should be applied to the endpoint (e.g., global exclusion, time-based exclusion, etc.) and includes any other data associated with the type.

In addition to the CTI data and the exclusion data shown by the example computing environment 100, additional, or different, types of data may be sent via provider feeds 101-1 to 101-X. For example, non-structured data (e.g., non-structured intelligence data), raw network traffic, data providing reports of network activity from customers of the enterprise that provides cyber threat detection (e.g., a report indicating a user clicked on malware, which resulted in a redirection to a malicious entity in a particular geographic region), various types of non-intelligence data, and the like. Further, providers may send more than one type of data via its feed or in separate feeds. For example, one or more providers may send a feed that includes both CTI data and exclusion data.

The various agents 105, 130, 140, and 150 may be configured to perform one or more processes based on the additional, or different, types of data. For example, the threat analysis agent 130 may be configured to analyze the additional, or different, types of data; and, based on the analysis, determine whether the additional, or different, types of data indicates malicious traffic is occurring or has occurred. Some examples of the types of malicious traffic that may be determined include whether one or more ports have been accessed that should not have been accessed; whether a source of the network traffic is associated with a geographic location that is prohibited or otherwise indicative of malicious activity; or whether any malware signatures exist. The analysis of the non-structured data may include filtering the non-structured data or raw network traffic, extracting particular types of network traffic from reports received from customers. For example, customers may provide reports of their network activities, which may be used to determine the potential impact of blocking legitimate network traffic between the customers' respective networks and one or more endpoints. These network activity reports may indicate, for example, a volume and/or a frequency of network traffic between the customers' respective networks and one or more endpoints as well as indications of particular addresses (e.g., IP addresses), machines and/or machine types, computing resources (e.g., applications, protocols, services, data stores), users, user groups, departments, offices, geographic locations, and the like that are associated with the customer's respective network traffic. Such network activity reports may be used to determine a disposition (e.g., an alternative to a default disposition) for an endpoint based on an anticipated impact on legitimate network traffic between that endpoint and a customer's network.

By determining indication of malicious traffic based on the additional, or different, types of data, the various agents 105, 130, 140, and 150, may be capable of responding to those indications by creating and updating policies and rules distributed to enforcement agents that enforce those policies and rules to filter packets, for example, by allowing, blocking, or monitoring packets to and/or from endpoints associated with the malicious traffic. Notably, because the additional, or different, types of data includes, among other types, non-intelligence data and/or reports of network activity received from customers, the various agents 105, 130, 140, and 150 may be able to respond to indications of malicious traffic that is infrequent, unpredictable, and/or to which no CTI data or IOCs exist. One example of malicious traffic that is infrequent, unpredictable, and/or to which no CTI data or IOCs exist includes an attack on a single customer that may be short in duration (e.g., a few seconds in length) and/or slow in periodicity (e.g., reoccurring every couple of weeks). Another example of malicious traffic that is infrequent, unpredictable, and/or to which no CTI data or IOCs exist includes traffic to or from an endpoint the network has not previously communicated with or an endpoint previously unknown to the network.

In connection with determining, and responding to, a small, targeted attack, there are many different analyses that may be performed. As some examples, raw network traffic going to and/or from a single customer may be collected and analyzed to identify a collection of endpoints that are sending data to the customer and/or receiving data from the customer. From this collection of endpoints, a set of trusted, known legitimate, or whitelisted endpoints may be removed. The remaining endpoints may be analyzed to determine whether there is a legitimate reason for traffic to be sent/received from the endpoints. For example, a legitimate reason may exist if the customer is known to conduct business with endpoints in the geographic location and/or if the customer, in its normal course of business, sends traffic to high risk endpoints. As some other examples, a legitimate reason may exist if the customer has historically shown a pattern of traffic being sent/received from the endpoints; if other customers in a similar business also have traffic sent/received from the endpoints and/or with a similar frequency; if the endpoints are above a risk threshold; if the total volume of traffic sent/received from the endpoints is below a volume threshold; and the like. Based on the various analyses, a disposition (e.g., an alternative to a default disposition) to allow, block, or monitor the endpoints may be determined (e.g., block if the total volume of traffic is below the volume threshold; block if there is a legitimate reason traffic is sent/received from the endpoint; etc.). These analyses and the determination of a disposition may be performed by one or more machine-learning models and/or rules/policies that are specific to a particular customer. For example, one or more machine-learning models configured to indicate the impact of blocking network traffic to and/or from a given endpoint may be trained on historical network activity data received from a customer. The trained machine-learning models thus may be provided, as input, network traffic data associated with network traffic to and/or from an endpoint and provide, as output, an indication of a potential impact of blocking legitimate network traffic to and/or from that endpoint.

The analyses that may be performed to discover small, targeted attacks generally may involve analyzing CTI, network traffic data, and/or non-intelligence data to identify connections between seemingly unconnected IOCs (or to identify relationships between seemingly unrelated IOCs) received from different CTI providers. Given the volume of raw data received from multiple CTI provides, it may be challenging to correlate such data to identify new, emerging, or potential malicious activity. For example, CTI data from a single CTI provider may not be sufficient on its own to suggest malicious activity targeting one or more endpoints but may, when correlated or otherwise combined with CTI data from multiple providers reveal such malicious activity. As described below, CTI data as well as non-CTI data may be pooled to generate datasets (including data subsets) that are analyzed to generate and output additional CTI data that may be considered when determining the threat context for one or more endpoints. The data collection agents (e.g., data collection agents 105), therefore, may include one or more data collection agents that ingest and analyze CTI data from one or more CTI providers as well as non-CTI data (e.g., data received or otherwise obtained from the data repositories 110) and output endpoint data (e.g., endpoint data 108) that includes information regarding potential malicious activity suggested by discovered connections/relationships between IOCs based on an analysis of the pooled data. Such endpoint data may be provided to the threat analysis agents (e.g., threat analysis agents 130). In this way, the potential malicious activity suggested by discovered connections/relationships in the endpoint data may be one of many factors the threat analysis agents take into account when determining a threat context for an endpoint. The data collection agents may also exist as a separate and independent system that ingest, as input, CTI data and non-CTI data provided by another system (e.g., computing environment 100) and provide, as output, the endpoint data that includes information regarding potential malicious activity suggested by discovered connections/relationships.

In general, discovering hidden connections/relationships between IOCs based on the pooled data may involve generating datasets that include overlapping contextual information and analyzing the datasets to identify commonalities between the different contexts respectively associated with the IOCs. This may include determining the relative importance of such overlap. For example, some attributes may be relatively more important than others when determining whether their commonality suggests a connection/relationship between IOCs. As one example, a category of the contextual information may be minimally helpful to discover connections/relationships between IOCs in the absence of other similarities. As described further below, the overlap (or intersection) between contexts may be analyzed to determine a likelihood (e.g., a probability) of a connection/relationship between IOCs in order to assess the extent of a potential threat associated with originally received CTI data.

Contexts may overlap where they share at least some of the same attributes and/or characteristics. Further, IOCs may be described as having a direct connection/relationship with other IOCs. IOCs also may have indirect connections/relationships with other IOCs. For example, an IOC (e.g., IOC A) may have an indirect connections/relationship with another IOC (e.g., IOC C) based on both of those IOCs having a direct connection/relationship with a common IOC (e.g., IOC B). For case of reference a connection/relationship may be identified herein using a double-arrow notation (e.g., IOC A↔IOC B↔IOC C). An IOC (e.g., IOC D) also may have an indirect relationship with another IOC (e.g., IOC G) via a chain of direct or indirect relationships with multiple IOCs (e.g., IOC E and IOC F) (e.g., IOC D↔IOC E↔IOC F↔IOC G). For ease of reference, connections/ relationships between IOCs may be characterized based on their degrees of separation. The degree of separation between IOCs may be based on a quantity of attributes/ characteristics in the link between IOCs. For example, two IOCs may have a direct connection/relationship where they share one common attribute (e.g., IOC A [category a]↔ [category a] IOC B) and may be described as having one degree of separation. IOCs having a direct relationship may share multiple common attributes, and the confidence in the relationship between the IOCs may be based on the quantity of attributes they have in common (e.g., relatively higher confidence based on relatively more common attributes and relatively lower confidence based on relatively fewer common attributes). As another example, two IOCs having an indirect connection/relationship may be described as having x degrees of separation depending on the quantity of common attributes that connect them through a chain of common attributes respectively shared between multiple IOCs (e.g., two degrees of separation between IOC A and IOC C where IOC A [category a]↔[category a] IOC B [signature b]↔ [signature b] IOC C, three degrees of separation between IOC A and IOC D where IOC A [category a]↔[category a] IOC B [signature b]↔[signature b] IOC C [timeframe c]↔[timeframe c] IOC D, and so forth). A direct connection/ relationship may be referred to as a primary connection/ relationship; an indirect connection/relationship with a sepa- ration of two degrees may be referred to as a secondary connection/relationship; an indirect connection/relationship with a separation of three degrees may be referred to as a tertiary connection/relationship; and so forth (e.g., x-degree connection/relationship).

A confidence may be determined for connections/relation- ships between IOCs. The confidence may be indicative of (e.g., quantify) the extent to which the connection/relation- ship is not coincidental or accidental. The confidence may be used to determine whether to retrieve and analyze contextual information associated with any IOCs one further degree removed from a current IOC being evaluated. Additionally or alternatively, additional contextual information for addi- tional IOCs may be retrieved without regard for the confi- dence associated with the connections/relationships between IOCs. For example, additional contextual information may be retrieved for IOCs up to x degrees removed (e.g., three) from a current IOC being evaluated. The number of degrees used when considering additional contextual information may be a configurable parameter, which may be configured specifically for one entity (e.g., on an entity-by-entity basis) or globally for multiple (or all) entities. Retrieving addi- tional contextual information x degrees removed from a currently evaluated IOC may include selecting one or more attributes/characteristics (e.g., category, signature, descrip- tor, indicators, timestamps, etc.) and retrieving any contex- tual information that includes the selected one or more attributes/characteristics. The selected characteristics/attri- butes may be specified manually (e.g., by network security personnel) and/or automatically (e.g., by the data collection agents, the threat agents, etc.)

Additional contextual information may be retrieved based on the confidence of a threat context. Additional contextual information (e.g., additional characteristics/attributes) may be retrieved for both low-confidence threat context (e.g., for scenarios where the confidence in any available CTI data can be described as "low" or scenarios where no CTI data is available) and high-confidence threat context (e.g., for sce- narios where the confidence in the available CTI data can be described as "high"). The various agents described herein (e.g., the threat analysis agents) may retrieve additional contextual information (e.g., as part of performing a threat analysis). The additional contextual information retrieved may indicate that an update to the confidence in the threat context and/or the confidence of the CTI data is warranted (e.g., upgrading or downgrading the confidence from "low" to "high" or "high" to "low") or may affirm the determined confidence. As one example, for low-confidence threat con- texts, the additional contextual information retrieved may indicate a pattern associated with the threat context, indicate a threshold prevalence of the threat context, and/or indicate changes in the threat context over time (e.g., increasing instances of the threat context), any of which may suggest upgrading (e.g., increasing) the confidence of the threat context and/or the confidence of the CTI data (e.g., upgrad- ing from low confidence to high confidence). As another example, for low-confidence CTI data, the additional con- textual information retrieved may conflict with the low- confidence CTI data and/or indicate that the threat context is not prevalent (e.g., does not satisfy a threshold prevalence), which may affirm the determined confidence of the threat context and/or CTI data. On the other hand, for high- confidence threat contexts and/or CTI data, additional con- textual information may be retrieved to affirm the high confidence determined, for example, based on the impact of filtering (e.g., blocking) network traffic associated with the threat context. As an example, even if a high confidence has been determined, additional contextual information may be retrieved to affirm that high confidence where a potential impact of blocking network traffic would be significant (e.g., satisfies an impact threshold as described herein). In other words, for scenarios where false positives may result in significant impact to an entity's network operations, addi- tional contextual information may be retrieved even for high-confidence threat contexts and/or high-confidence CTI data. Additional contextual information may be retrieved for additional degrees of separation based on, for example, diminishing returns in any changes to the determined con- fidence. As one example, additional contextual information may be retrieved for further degrees of separation until any change to a determined confidence does not satisfy a change threshold (e.g., does not meet or exceed the change thresh- old). As another example, additional contextual information may be retrieved for further degrees of separation until a sufficient balance between the risk posed by a potential threat and the confidence in that threat is achieved (e.g., a difference between a risk score and a threat score is mini- mized). In some scenarios, for example, affirming contextual information (e.g., agreement about a threat context) may increase at relatively closer degrees of separation while conflicting contextual information (e.g., disagreement about a threat context) may increase at further degrees of separa- tion. In other words, disagreement about a threat context may decrease as additional contextual information is retrieved up to a point at which disagreement about the threat context may begin to increase as additional contextual information is retrieved. In this regard, the relationship between disagreement (or agreement) about a threat context and the degrees of separation may be parabolic whereby the extent of disagreement (e.g., a quantified disagreement value) decreases as the degrees of separation increase until minimum point (nadir) where the extent of disagreement begins to increase as the degrees of separation further increase (or alternatively whereby the extent of agreement (e.g., a quantified agreement value) increases as the degrees of separation increase until a maximum point (peak) where the extent of agreement begins to decrease as the degrees of separation further increase). Determining the extent to which additional contextual information retrieved, therefore, may involve minimizing the disagreement between the retrieved contextual information (e.g., minimizing a quantified disagreement value) or maximizing the agreement between the retrieved contextual information (e.g., maximizing a quantified disagreement value). Determining the extent to which additional contextual information retrieved additionally or alternatively may be based on a comparison between combined confidences respectively determined for contextual information indicating that a potential threat is more likely (e.g., "bad" contextual information), that the potential threat is less likely (e.g., "good" contextual information), or neither more or less likely (e.g., "neutral" contextual information). For example, a combined confidence may be determined for all of the confidences determined for "bad" contextual information and a combined confidence may be determined for all of the confidences determined for "good" contextual information. Those combined confidences may be compared to each other, and additional contextual information may be retrieved until a sufficient difference between the combined confidences is observed (e.g., until a difference between the combined confidences exceeds a difference threshold). Additional contextual information may be retrieved, for example, until the confidences determined for the "good" contextual information sufficiently outweighs the confidences determined for the "bad" contextual information (or vice versa). In this way, the reason why contextual information may be deemed "good" or "bad" may be less important than the fact that a sufficient amount of collective "good" or "bad" contextual information has been retrieved.

Analyzing additional contextual information to discover connections/relationships between seemingly unconnected/unrelated IOCs may help to evaluate a threat associated with originally received CTI data (e.g., an originally received IOC). By leveraging discovered connections/relationships between IOCs, potential attacks associated with those contexts may be uncovered that might have otherwise gone unnoticed. Contexts may be evaluated as described herein to discover hidden attacks, previously unnoticed attacks, and/or potential future attacks whenever a data collection agent (e.g., one or more of data collection agents 105) ingests new CTI that provides an IOC with corresponding context. As described herein, the contextual information received with the IOC may be evaluated to determine whether the threat context has changed. Even in the absence of any change to the threat context, the resubmission of the IOC in the received CTI data may suggest that the threat is still active. As a result, the status of that threat context may be refreshed, and the contextual information may be analyzed as described herein in order to identify connections/relationships with any other IOCs in furtherance of potentially updating the threat context for the IOC based on the results of such analysis and in furtherance of determining a disposition for an endpoint.

To illustrate these principles of discovering connections/relationships between contexts, the following scenarios are provided. These scenarios are provided by way of example only and without limitation.

In one example scenario, the contextual information respectively associated with two different endpoints (e.g., different domains) may overlap only by virtue of their respective certificates being signed by the same certificate authority (CA) but otherwise indicate the endpoints have different characteristics and/or attributes. For example, their respective contextual information may indicate that different endpoints: resolve to different IP addresses (or resolve to different rotating groups of IP addresses that randomly change with every request), are hosted by different hosting providers, execute different applications and/or services (e.g., exhibit different application/service fingerprints), provide different services (e.g., HTTP, HTTPS, representational state transfer-REST, etc.), employ different security mechanisms (e.g., transport layer security (TLS) protocol, secure socket layer (SSL) protocol, etc.), and otherwise provide data and/or features. As a result, the confidence in any connection/relationship between the endpoints' contextual information may be relatively low (e.g., suggesting an accidental or coincidental connection/relationship). In this example scenario, additional contextual information (e.g., new CTI data) may be received indicating that the common CA was previously compromised (e.g., by a malicious actor impersonating the CA using stolen/compromised CA keys to obtain keys and signed certificates issued to various endpoints). This additional contextual information may be pooled with the existing contextual information to reveal a connection/relationship between IOCs that had any association with the compromised CA during the compromised period (e.g., by increasing the confidence to an extent that suggests the connection/relationship is not accidental or coincidental). In this way, the respective threat contexts for those IOCs may be updated and appropriate dispositions determined.

In another example scenario, CTI data may be received indicating that malicious actors may use two different versions or types of malware to engage in malicious activity. Separate threat contexts may be identified for each malware version/type, and those different threat contexts may not be correlated with each other. For example, the CTI data for one version/type of malware may be received from one CTI provider at one time, and the CTI data for a different version/type of malware may be received from different CTI provider at a different time. As such, the threat contexts and corresponding contextual information may remain separate and distinct from each other until addition contextual information (e.g., CTI data and/or non-CTI data) is received that connects the contextual information for those threat contexts.

In a further example, CTI may be received that includes an IOC for a particular endpoint and contextual information may indicate that an IP address associated with that endpoint also has been associated with multiple different domains (e.g., 100s of different domains) over a prior time period (e.g., the past two weeks). The data collection agents, therefore, may retrieve contextual information associated with those different domains (e.g., up to x degrees separated from the contextual information for the IOC in the received CTI data), and analyze contextual information for additional IOCs having a primary, secondary, tertiary, etc., relationship with the current IOC being evaluated. Based on these connections/relationships, the threat context for that IOC may be determined (e.g., revised).

In another example scenario, CTI data may be received about two different endpoints, such as identified by different IP addresses, domain names and/or URLs, with no apparent overlap in threat context. Additional CTI data may be subsequently received that establish a direct 1st degree or indirect >1 degree relationship, such as that a domain of one endpoint and an IP address of another endpoint may be controlled by a single threat actor group that employs a variety of attack methods. The analysis of the combination of the CTI data can change the dispositions of the associated IOCs to detect the threat activity that would otherwise be missed due to insufficient or incomplete threat context.

In another example scenario, CTI data may be received about an endpoint with different and conflicting threat context, such as one benign context indicating an undesirable but legitimate service and another malicious context indicating malware command and control (C2) activity. An analysis of these conflicting contexts may lead to improper disposition of the IOCs due to insufficient confidence in the level of risk of threat. Additional CTI data may be subsequently received that supports an increase in confidence of one context, such as the C2 activity, over another context, such as the benign service. A series of additional CTI data received may further increase or decrease confidence in associated contexts. The analysis of the combination of the CTI data can change the dispositions of the associated IOCs based on importance, risk level or impact potential of one context over another context.

In another example scenario, CTI data may be received about an endpoint with threat context that includes risk and/or confidence scores of a particular threat. The criteria for choosing a disposition may depend upon the risk and/or confidence scores, which if below a threshold, may lead to an unintended disposition. CTI data may be subsequently received about the endpoint with similar low risk threat context from one or more CTI sources. A series of additional CTI data may be received in real time. A continued analysis of the additional threat context from different providers, each of which may be insufficient alone to cross the threshold, may collectively elevate a composite risk and/or confidence scores to exceed the threshold to achieve an intended disposition.

In another example scenario, CTI data, such as high confidence and high risk threat context, and non-CTI data, such as impact context, may be received about an endpoint. The threat context may strongly indicate a particular disposition, such as blocking all traffic to the associated endpoints. However, the impact context may strongly indicate that the endpoint may be a frequently used service that is critical to a business need. The analysis of the combination of the CTI and non-CTI data can change the disposition of the associated IOCs, such as constraining the selectable dispositions to a subset like monitoring all traffic to the associated endpoints, to reduce the risk of interrupting the business functions while enabling the detection of the threat activity.

In another example scenario, CTI data, such as context with temporal context, may be received about an endpoint. The temporal context may indicate changes in applicability, confidence, risk and/or validity of the threat context based on the time that the threat context is used or applied. Additional CTI data may be received from another source which may provide a different temporal context for the same threat context on the same endpoints. Additional non-CTI data may be received, such as impact context and associated temporal context, about the same endpoint. The analysis of the combination of the CTI data and the non-CTI data can change the disposition of the associated IOCs across time based on evaluating the business impact of certain dispositions at certain times of the day, such as monitoring but allowing high threat risk but high business impact risk traffic during the day when network activity is high while blocking high threat risk but low business impact traffic during the evening.

Additional examples and scenarios will be appreciated with reference to the disclosures herein.

While the above discussion regarding the additional, or different, types of data provides a basis for a wide range of ways in which malicious traffic (e.g., a small, targeted attack) may be determined and responded to, the remaining discussion of FIGS. 1-15 will, for simplicity, be discussed in view of the CTI data and the exclusion data shown in FIG. 1.

As depicted in FIG. 1, the one or more data collection agents 105 may receive, via the provider feeds 1 to X, data, of one or more data types, from one or more of the providers 101-1 to 101-X. In some variations, there may be a plurality of data collection agents 105 operating in the computing environment 100. As one example, in such variations, each provider feed and/or each provider 101-1 to 101-X may have its own data collection agent (e.g., there may be X data collection agents for the providers 101-1 to 101-X). As another example, in such variations, a subset of provider feeds and/or a subset of providers 101-1 to 101-X may have its own data collection agent (e.g., the provider feeds and/or providers may be grouped into subsets by a classification scheme that is based on a level of trust in the providers and/or based on a similarity measurement between the different proprietary formats and proprietary notations of the providers). One or more of the plurality of data collection agents 105 may be operating in parallel with the others, listening to its particular provider feed, receiving its particular CTI data, and the like. Additionally, One or more of the plurality of data collection agents 105 may have its own one or more machine learning models 105-1 and/or rules/policies 105-2. In this way, the one or more machine learning models 105-1 and/or rules/policies 105-2 may be configured to process data from a particular provider.

After receiving data from a particular provider (e.g., CTI data 103 via provider feed 1 from provider 101-1), the one or more data collection agents 105 may perform one or more processes for receiving, storing, and/or processing the received data. For simplicity, these one or more processes will be discussed in terms of receiving CTI data 103 and exclusion data 106.

Based on receiving data from a provider (e.g., CTI data 103 via provider feed 1 from provider 101-1 or exclusion data 106 via provider feed X from provider 101-X), the one or more data collection agents 105, as part of the one or more processes for receiving, storing, and/or processing the received data, may store the received data in the raw data and metadata archive 114. Storing the received data in this manner allows for the raw data and metadata archive 114 to include an unprocessed copy of the received data (e.g., an unprocessed copy of the CTI data 103 and an unprocessed copy of the exclusion data 106), as it was received by the one or more data collection agents 105. Moreover, storing the received data in this manner may allow for the unprocessed copy to be reprocessed if necessary or for the unprocessed copy to be available for future use (e.g., as training data for a machine-learning model, such as the one or more machine-learning models 105-1).

The one or more data collection agents 105, as part of the one or more processes for receiving, storing, and/or processing the received data, may classify the received data according to a data type. For example, the one or more data collection agents 105 may classify the CTI data 103 as the CTI data type and may classify the exclusion data 106 as the exclusion data type. This classification may be based on the specific data included by the received data. For example, CTI data 103 is depicted as including an identifier of the provider 101-1 ("Provider_ID") and an identification of an endpoint ("www.xyz123.c"). The one or more data collection agents 105 may classify the CTI data 103 as the CTI data type based on including this information in a particular syntax. As another example, exclusion data 106 is depicted as including a listing of exclusions that identifies at least two endpoints as exclusions (e.g., endpoint "www.abc987.c" is one exclusion and endpoint "10.20.81.0/24" is another exclusion). The one or more data collection agents 105 may classify the exclusion data 106 as the exclusion data type based on including the listing of exclusions. In some arrangements, this classification may be performed by one or more machine learning models and/or based on rules/ policies of the one or more data collection agents 105. Classifying the received data may allow the one or more data collection agents 105 to perform processes specific to the type of data that was received (e.g., the processing of the CTI data 103 may differ from the processing of the exclusion data 106). Further details on how the one or more data collection agents 105 may perform processes that are specific to the type of data that was received will be discussed below in connection with the processing of CTI data 103 and exclusion data 106.

After classifying the received data (e.g., CTI data 103) as the CTI data type, the one or more data collection agents 105, as part of the one or more processes for receiving, storing, and/or processing the CTI data 103, may determine metadata associated with the CTI data 103 and/or associated with the provider 101-1, and may store the metadata in the raw data and metadata archive 114. Metadata associated with the CTI data 103 and/or associated with the provider 101-1 may be referred interchangeably herein as CTI-based metadata. The CTI-based metadata, or portions thereof, may be included in the CTI data 103; included in a CTIP feed that provides the CTI-based metadata separate from the CTI data 103 (e.g., the CTI-based metadata maybe received via a CTIP feed different from Provider feed 1); determined from any data received from the provider 101-1; and/or determined based on how a data collection agent received the CTI data 103. The CTI-based metadata may include, for example, an indication of whether receipt of the CTI data 103 was successful or failed; an indication of a duration of time that it took to receive the CTI data 103; an indication of a volume of data included by the CTI data 103, an indication of the type of transaction performed for receiving the CTI data 103 (e.g., via a file download, via an API call, and/or via a software development kit (SDK)), an identifier that uniquely identifies the transaction performed for receiving the CTI data 103, an indication of how often the provider 101-1 is sending its CTI data and/or how often the provider 101-1 is being requested for its CTI data. These examples of CTI-based metadata are only a few examples of the types of metadata that may be determined.

Table I illustrates more detailed examples of CTI-based metadata. In particular, Table I provides example descriptions of attributes that may be included in CTI-based metadata and, for each example description, an example attribute-value pair (e.g., attribute: value) that may be included in CTI-based metadata. The examples of Table I provide only some examples of the attributes and values that may be included in CTI-based metadata.

TABLE I

| Example CTI-based metadata | |
|---|---|
| Example Description of Attribute | Example Attribute-Value Pair |
| A string value that uniquely identifies the transaction that resulted in receiving the CTI data | "txUid": "20220501.123450" |
| A string value to indicate an identifier of a subset of an entire file associated with the CTI data | "txPageUid": "612343c680-60504b" |
| A string value to indicate a unique identifier for the series of transactions performed to receive the entire file associated with the CTI data | "txSeriesUid": "30b32efb-895c-cb22fd" |
| A string value that identifies the provider of the CTI data | "txSource": "Provider 101-1" |
| A string value that indicates a type of the transaction performed for receiving the CTI data | "txAccessType": "SDK" |
| A string value indicating an identifier of a data collection agent that received the CTI data | "txAccessAgent": "Data-collector-ID/Provider-Python-SDK 1.0" |
| A string value indicating information about the data collection agent at the time the CTI data was received, such as indication of what software version the data collection agent was at the time the CTI data was received | "txAccessAgentContext": "version 1.5.2" |
| A string value indicating a URI used to request the CTI data | "txURI": "sftp://download.ctip.c/path_to_ctidata" |
| A value indicating a time at which the receiving of the CTI data began (e.g., in milliseconds) | "txTsStart": 1646731527.515 |
| A value indicating a duration over which the CTI data was received (e.g., in seconds) | "txDuration": 3.515 |

TABLE I-continued

| Example CTI-based metadata | |
|---|---|
| Example Description of Attribute | Example Attribute-Value Pair |
| A value indicating the volume of data included in the CTI data (e.g., in bytes) | "txBytes": 151516 |
| A value indicating if the transaction performed for receiving the CTI data was successful (e.g., a Boolean true or false) | "txSuccess": true |
| A string indicating a status of the transaction performed for receiving the CTI data | "txLog": "Successfully downloaded 10123 indicators from the provider" |

The one or more data collection agents 105, as part of the one or more processes for receiving, storing, and/or processing the CTI data 103, may determine endpoint data 108 based on the CTI data 103. The endpoint data 108 may include data for an endpoint in a common format and/or the data for the endpoint may be expressed by the endpoint data 108 in a common notation. The data for the endpoint may be included in the endpoint data 108 due to the CTI data 103 including an IOC for the endpoint. The common format may be JSON, CSV, XML, STIX, a text file, or any other suitable format. The common notation may include attribute-value pairs with an attribute naming scheme configured for the one or more data collection agents 105.

Determining the endpoint data 108 may be performed by determining data for the endpoint from the CTI data 103, mapping the data to the common format and/or common notation, and/or deriving, based on the CTI data 103, additional data in the common format and/or common notation. This determination may be performed by using one or more machine-learning models 105-1 and/or by applying rules/policies 105-2 of the one or more data collection agents 105. In variations using the one or more machine-learning models 105-1, the one or more machine-learning models may be trained using a corpus of CTI data previously received from the provider 101-1 (e.g., as stored in the raw data and metadata archive 114). In variations using the rules/policies 105-2, the rules/policies 105-2 may be authored by a human user that has knowledge of how the provider 101-1 provides its CTI data (e.g., the rules/policies 105-2 may have rules for extracting data for an endpoint from CTI data 103 and rules for mapping the data to the common format and/or common notation).

Determining the endpoint data 108 may be performed based on mapping information included in the CTI mapping repository 128. The mapping information may provide rules for mapping CTI data from the providers 101-1 to 101-X to the common format and/or common notation used by the endpoint data 108. The CTI mapping repository 128 may have been authored by one or more human operators with knowledge of any of the providers 101-1 to 101-X that provide data of the CTI data type.

In some variations, the endpoint data 108 may include data for a single endpoint. In this way, the endpoint data 108 may represent a single object of endpoint data for a single endpoint indicated by the CTI data 103. As the CTI data 103 may include data, such as IOCs, for one or more endpoints, the one or more data collectors 105 may determine one or more objects of endpoint data for the one or more endpoints indicated by the CTI data 103. Once determined, the endpoint data 108 may be stored in the endpoint data archive

115 for later use (e.g., as training data for one or more machine learning models 130-1 of the one or more threat analysis agents 130). Further, the one or more threat analysis agents 130 may be notified that the endpoint data 108 is available for analysis. Notifying the one or more threat analysis agents 130 that the endpoint data 108 is available for analysis may include sending the endpoint data 108 to at least one of the one or more threat analysis agents 130; inserting the endpoint data 108 into a feed between the one or more data collection agents 105 and the one or more threat analysis agents 130; and/or storing the endpoint data 108 to a location accessible to the one or more threat analysis agents 130.

FIG. 1 depicts a generalized example of the endpoint data 108 and the generalized example is based on the example of the CTI data 103 also depicted in FIG. 1. Indeed, as depicted in FIG. 1, the CTI data 103 is shown as including data for the endpoint "www.xyz123.c". The generalized example of the endpoint data 108 may have been the result of the one or more data collection agents 105 determining data for the endpoint from the CTI data 103 and mapping the data to the common format and/or common notation. Indeed, because of the CTI data 103 is shown as including data for the endpoint "www.xyz123.c", the generalized example of the endpoint data 108 includes the data for the endpoint "www.xyz123.c" after having mapped the data for the endpoint "www.xyz123.c" into the common format and/or common notation (e.g., "[EndP: www.xyz123.c]"). The endpoint data 108 may include additional information associated with the endpoint "www.xyz123.c". Indeed, as depicted in FIG. 1, the endpoint data 108 includes another attribute-value pair with the identifier of the provider 101-1 (e.g., "[Prov: Provider_ID]"). The generalized example of endpoint 108 provides only one example of the common format and/or common notation that could be used by the one or more data collection agents.

Table II illustrates more detailed examples of the endpoint data 108. In particular, Table II provides example descriptions of attributes that may be included in the endpoint data 108 and, for each example description, an example attribute-value pair (e.g., attribute: value) that may be included in the endpoint data 108. The examples of Table II provide only some examples of the attributes and values that may be included in endpoint data, such as the endpoint data 108 shown in FIG. 1. Moreover, values and/or attributes included in the endpoint data 108 may depend on what a provider includes for the endpoint. For example, some values may be left empty, or null, if the provider does not provide data corresponding to an attribute and/or the attribute may not be included by the endpoint data 108 if the provider does not provide data corresponding to an attribute.

TABLE II

| Example Endpoint Data | |
| --- | --- |
| Example Description of Attribute | Example Attribute-Value Pair |
| A string value providing a human readable representation of the endpoint, which may be a comma separated concatenation of two or more attributes shown below in this table | "display": "www.xyz123.c, Provider 101-1" |
| A string value indicating a type of the endpoint, e.g., a DN type endpoint, an IP type endpoint, a MD type endpoint, or a URI type endpoint | "type": "IP" |
| An object indicating, based on the type of the endpoint, a definition of the endpoint | "endpoint": {"value": "www.xyz123.c"} |
| A string value that identifies the provider that provided the endpoint | "provider": "Provider 101-1" |
| A value indicating the feed on which the endpoint was received | "feed": "CTI-Feed-1" |
| A value indicating a time at which the endpoint was identified by the data collection agent (e.g., in milliseconds) | "endpointIdTs": 1644941134000 |
| A value indicating a time at which the provider sent data for the endpoint on the feed (e.g., in milliseconds) | "addedTs": 1644518253000 |
| A value indicating a time at which the provider began reporting a modification to the endpoint (e.g., in milliseconds) | "modifiedTs": 164494563300 |
| A value indicating a time at which the provider indicated the endpoint was removed from the feed (e.g., in milliseconds) | "deletedTs": 134594892200 |
| A value indicating if the endpoint is an exclusion (e.g., a Boolean value of true or false) | "isExclusion": false |
| A value indicating if the endpoint was the last CTI data processed in a feed (e.g., a Boolean value of true or false) | "isLastInFeed": false |
| A JSON object indicating the raw attributes of the endpoint, as extracted from the CTI data | "rawContext": {JSON object with data for the endpoint www.xyz123.c, which was extracted from the CTI data 103 by the one or more data collection agents 105} |
| A hash value computed on one or more attribute-value pairs of the endpoint data, as shown above in this table | "endpointHash": "abc4568183e01f367895" |

After classifying the received data (e.g., exclusion data 106) as the exclusion data type, the one or more data collection agents 105, as part of the one or more processes for receiving, storing, and/or processing the exclusion data 106, may determine metadata associated with the exclusion data 106 and/or associated with the provider 101-X, and may store the metadata in the raw data and metadata archive 114. Metadata associated with the exclusion data 106 and/or associated with the provider 101-X may be referred interchangeably herein as exclusion-based metadata. The exclusion-based metadata, or portions thereof, may be included in the exclusion data 106; included in a provider feed that provides the exclusion-based metadata separate from the exclusion data 106 (e.g., the exclusion-based metadata maybe received via a provider feed different from the provider feed X); determined from any data received from the provider 101-X; and/or determined based on how a data collection agent received the exclusion data 106. The exclusion-based metadata may include, for example, data similar to those discussed above with respect to the CTI-based metadata, except the data may now relate to the exclusion data and/or the provider that sent the exclusion data. For example, the exclusion-based metadata may include attribute-value pairs similar to those of Table I, except the attribute-value pairs may relate to the exclusion data and/or the provider 101-X. As other examples, the exclusion-based metadata may include an indication of whether receipt of the exclusion data 106 was successful or failed; an indication of a duration of time that it took to receive the exclusion data 106; an indication of a volume of data included by the exclusion data 106, an indication of the type of transaction performed for receiving the exclusion data 106 (e.g., via a file download, via an API call, and/or via a software development kit (SDK)), an identifier that uniquely identifies the transaction performed for receiving the exclusion data 106, an indication of how often the provider 101-X is sending its exclusion data and/or how often the provider 101-X is being requested for its exclusion data. These examples of exclusion-based metadata are only a few examples of the types of metadata that may be determined.

The one or more data collection agents 105, as part of the one or more processes for receiving, storing, and/or processing the exclusion data 106, may determine endpoint data based on the exclusion data 106. This endpoint data, once determined, may indicate one or more exclusions for an endpoint. The endpoint data determined based on the exclusion data 106 may be similar to the generalized example of the endpoint data 108 discussed above. In this way, such endpoint data may include data for an endpoint, which was indicated as an exclusion in the exclusion data 106, in a common format and/or in a common notation. The common format and common notation may be the same as those used for the endpoint data 108. For example, the endpoint data determined based on the exclusion data 106 may include attribute-value pairs similar to those discussed above in connection with Table II, except the data may relate to an endpoint indicated as an exclusion (e.g., an attribute-value pair may indicate the endpoint is an exclusion, such as "isExclusion": true).

Determining the endpoint data based on the exclusion data 106 may be performed by determining data for the endpoint from the exclusion data 106, mapping the data to the common format and/or common notation, and/or deriving, based on the exclusion data 106, additional data in the common format and/or common notation. This determination may be performed by using one or more machine-learning models 105-1 and/or by applying rules/policies 105-2 of the one or more data collection agents 105. In variations using the one or more machine-learning models 105-1, the one or more machine-learning models may be trained using a corpus of exclusion data 106 previously received from the provider 101-X (e.g., as stored in the raw data and metadata archive 114). In variations using the rules/policies 105-2, the rules/policies 105-2 may be authored by a human user that has knowledge of how the provider 101-X provides its exclusion data (e.g., the rules/policies 105-2 may have rules for extracting data for an endpoint from exclusion data 106 and rules for mapping the data to the common format and/or common notation).

In some variations, the endpoint data determined based on the exclusion data 106 may include data for a single endpoint. In this way, such endpoint may represent a single object of endpoint data for a single endpoint indicated by the exclusion data 106 as an exclusion. As the exclusion data 106 may include indications of exclusions for one or more endpoints, the one or more data collectors 105 may determine one or more objects of endpoint data for the one or more endpoints indicated by the exclusion data 106 as exclusions. Once determined, the endpoint data determined based on the exclusion data 106 may be stored in the endpoint data archive 115 for later use (e.g., as training data for a machine learning model). Moreover, the endpoint data determined based on the exclusion data 106 may be stored in an exclusion data repository 124 (which may be monitored and/or accessed by the one or more threat monitoring agents 140 and/or the one or more disposition feed agents 150). Further, the one or more threat analysis agents 130 may be notified that the endpoint data determined based on the exclusion data 106 is available for analysis. Notifying the one or more threat analysis agents 130 that the endpoint data determined based on the exclusion data 106 is available for analysis may include sending such endpoint data to at least one of the one or more threat analysis agents 130;

inserting such endpoint data into a feed between the one or more data collection agents 105 and the one or more threat analysis agents 130; and/or storing such endpoint data to a location accessible to the one or more threat analysis agents 130. Additionally, the exclusion data 106 may cause (e.g., via endpoint data determined based on the exclusion data 106 and/or via data indicating the exclusion data 106 stored to the threat analysis data repositories 120) disposition feeds to be determined, changed, constructed, and/or deconstructed via the one or more disposition feed agents 150. Details of disposition feeds and the one or more disposition feed agents 150 are discussed below.

As briefly mentioned above, there may be different types of exclusions. As also briefly mentioned above, two example types are global exclusions and time-based exclusions. Global exclusions may prevent an endpoint, or any disposition associated with the endpoint, from being included in any disposition feed for as long as the global exclusion remains in place (e.g., for as long as the exclusion data repository 124 and/or the event data repository stores the global exclusion; and/or until the global exclusion is deleted from the exclusion data repository 124 and/or the event data repository 121). In this way, the one or more conditions for a global exclusion may be a condition of whether the global exclusion is stored in one of the threat analysis data repositories 120.

A time-based exclusion, as the name implies, may have one or more conditions that are time-based. For an endpoint indicated as a time-based exclusion, any endpoint data for that endpoint may cause performance of a determination as to whether the one or more time-based conditions are satisfied. An example of time-based condition includes a condition as to whether a threshold window of time (e.g., a couple of seconds) has not expired since an IOC for the endpoint has been received (e.g., a window of time since the first IOC for the endpoint has been received). If the time-based condition is not satisfied (e.g., the threshold window of time has expired since an IOC for the endpoint was received), the time-based exclusion may be enforced and, as a result, the time-based exclusion may prevent an endpoint, or any disposition associated with the endpoint, from being included in any disposition feed. If the time-based condition is satisfied (e.g., the threshold window of time has not expired since an IOC for the endpoint was received), the time-based exclusion may not be enforced and, as a result, the endpoint, or any disposition associated with the endpoint, may be included in a disposition feed. In this way, based on the time-based exclusion, disposition feeds may include a disposition for an endpoint indicated as a time-based exclusion within the threshold window of time, but not outside the threshold window of time. In some variations, during the threshold window of time, any dispositions for an endpoint indicated as a time-based exclusion may be included in a temporary feed for the time-based exclusion. In some variations, while the temporary feed is constructed, only the temporary feed may include dispositions for the endpoint. A time-based exclusion may be for certain endpoints (e.g., domains) that are trusted and/or rarely, if ever, pose a cyber threat. In this way, the temporary feed may indicate that included dispositions are for endpoints in trusted network infrastructure. In this way, a time-based exclusion may indicate an endpoint is in trusted network infrastructure. Moreover, use of time-based exclusions may allow for quick responses to emerging cyber threats in trusted network infrastructure and/or may allow for further review of emerging cyber threats within the trusted network infrastructure before taking further action.

In some variations, there may be additional types of exclusions. Provider-based exclusions, feed-based exclusions are two additional examples of the types of exclusions that may be supported by the computing environment 100. Provider-based exclusions may apply conditions that exclude IOCs, for an endpoint, that were received from certain providers. In this way, dispositions determined for the endpoint may be determined and sent, but done in a way that excludes any IOCs received from an excluded provider. A provider-based exclusion may be useful, for example, if certain providers are less trusted and/or are found to provide too many false positives of the cyber threat posed by an endpoint. Feed-based exclusions may apply conditions that exclude IOCs, for an endpoint, that were received from certain provider feeds. In this way, dispositions determined for the endpoint may be determined and sent, but done in a way that excludes any IOCs received from an excluded provider feed. A feed-based exclusion may be useful, for example, if certain provider feeds are less trusted and/or are found to provide too many false positives of the cyber threat posed by an endpoint.

In some variations, the computing environment 100 may be configured to cause expiration of exclusions. This expiration may be performed such that only certain types of exclusions expire or all types of exclusions expire. Causing an exclusion to expire may include deleting it from one or more of the threat analysis data repositories 120. For example, to cause an exclusion to expire, the exclusion may be deleted from the exclusion data repository 124. As another example, to cause an exclusion to expire, the exclusion may be indicated as deleted from the event data repository 121. Details of deleting from the event data repository 121 will be discussed below.

Continuing the more detailed discussion of the example computing environment 100, the one or more threat analysis agents 130 are depicted as receiving the endpoint data 108; performing one or more processes for ingesting and analyzing endpoint data; and outputting threat differential data 135. This endpoint data 108 may be based on CTI data (e.g., CTI data 103, as shown in the depicted generalized example of the endpoint data 108), based on exclusion data (e.g., exclusion data 106), or based on other data received by the one or more data collection agents 105. The one or more threat analysis agents 130 may receive the endpoint data 108 after receiving a notification the endpoint data 108 is available. Based on receiving the endpoint data 108, the one or more threat analysis agents 130 may perform one or more processes for ingesting and analyzing the endpoint data 108.

As part of performing the one or more processes for ingesting and analyzing the endpoint data 108, the one or more threat analysis agents 130 may determine, based on the endpoint data 108, a threat status for an endpoint indicated by the endpoint data 108. In some variations, the threat status may indicate various statuses such as changed, unchanged, or duplicate. To provide an example of threat status, assume the endpoint data 108 includes attribute-value pairs that indicate an IOC for the endpoint. Under this example, the threat status may indicate changed if the IOC for the endpoint has changed based on one or more previous IOCs for the endpoint; the threat status may indicate unchanged if the IOC for the endpoint has not changed based on one or more previous IOCs for the endpoint; and the threat status may indicate duplicate if the IOC for the endpoint is the same as one or more previous IOCs.

The threat status may be determined based on a comparison of the endpoint data 108 to additional context stored in the event store repository 121. The additional context may indicate various attributes of the threat posed by an endpoint indicated by the endpoint data 108. As one example, the additional context may include IOCs for the endpoint that were previously received from the providers 101-1 to 101-X. As will be discussed in more detail below, the format and the notation of the additional context stored in the event store repository 121 may be similar to that of the endpoint data 108. Accordingly, determining the threat status may be performed by comparing matching attributes between the endpoint data 108 and the additional context stored by the event store repository 121 and determining if the values of the matching attributes are different from each other.

The event store repository 121 may be configured as a time-series of stored events over all providers 101-1 to 101-X. In this way, the event store repository 121 may store a time-based record that includes, or is indicative of, every object of endpoint data received by the one or more threat analysis agents 130. This time-based record, for example, may indicate when IOCs for an endpoint have been repeatedly received from the same provider and/or provider feed (e.g., by indicating duplicative IOCs for an endpoint have been received); may indicate when IOCs have been removed from a provider feed (e.g., by indicating IOCs for an endpoint have been removed from the provider feed); and/or may indicate when IOCs for an endpoint have changed (e.g., by indicating the changed IOC for the endpoint). The event store repository 121 and/or its time-based record may be searchable and indexed according to various attributes (e.g., provider, provider feed, endpoint, and the like).

In variations where the event store repository 121 is configured as a time-series of stored events, the threat status may be determined based on the time-series of stored events. For example, the additional context may include one or more of the most recent stored events for an endpoint indicated by the endpoint data 108. In this way, the threat status may be determined based on the one or more most recent stored events, even perhaps only the most recent stored event. As another example, the additional context may include any stored event within a threshold window of time. In this way, the threat status may be determined based on stored events that were created and/or stored within the time window. As another example, the additional context may include any stored event that indicates an ongoing cyber threat posed by the endpoint (e.g., the additional context may include stored events from the current time until a time at which, as indicated by the time-series of stored events, an IOC for an endpoint is not within a threshold time from another IOC for the endpoint).

The computing environment 100 may be configured such that event data is not deleted from the event store repository 121 (e.g., no deletions ever or no deletions for a period of time measured in weeks, months, and/or years). In this way, for example, when a provider 101-1 to 101-X removes an IOC from its data, event data indicating the IOC is removed may be stored to the event store repository 121. Deletion or expiration of an exclusion may be handled in a similar way by storing event data indicating the deletion, or expiration, of the exclusion to the event store repository 121. This process of storing event data that indicates removal, deletion, expiration, etc., is in contrast to deleting actual data from the event store repository 121. Deleting actual data from the event store repository 121 may include, for example as based on removal of an IOC from a provider feed, searching for event data that includes the IOC and deleting the event data that includes the IOC from the event store repository 121.

In variations that include an exclusion data repository 124, the exclusion data repository 124 may be configured similar to the event data 121, except it may be dedicated to storing exclusion data. For example, the exclusion data repository 124 may be configured as a time-series of stored events over all exclusion providers 104-1 to 104-Y. Threat status may be determined based on the exclusion data repository 124. The computing environment 100 may be configured in a way that event data is not deleted from the exclusion data repository 124 (e.g., no deletions ever or no deletions for a period of time measured in weeks, months, and/or years).

Based on the threat status, the one or more threat analysis agents 130 may perform various threat status-specific actions. For example, in some variations, the threat status may indicate various statuses such as changed, unchanged, or duplicate. If a threat status indicates changed, the one or more threat analysis agents 130 may perform actions based on a determination that a change has occurred. Such actions may include storing event data to the event data repository 121 based on the type of change that occurred. For example, event data that adds an IOC for an endpoint may be stored to the event data repository 121, event data that indicates removal of an IOC for an endpoint may be stored to the event data repository 121, and/or event data that indicates a change to a previously-added IOC for the endpoint may be stored to the event data repository 121. A change may occur in various ways. For example, one change is an IOC of the endpoint data 108 differing from an IOC of the additional context stored by the event store repository, even if the IOCs are from the same provider and/or provider feed. In other words, the threat status may indicate changed if different IOCs are received from any provider and/or provider feed.

If a threat status indicates unchanged, the one or more threat analysis agents 130 may perform actions based on a determination that no change has occurred. One example of no change is if an IOC of the endpoint data 108 does not differ from an IOC of the additional context, except for provider and/or provider feed. In other words, the threat status may indicate unchanged if the same IOCs are received from different providers and/or via different provider feeds.

If a threat status indicates a duplicate, the one or more threat analysis agents 130 may perform actions based on a determination that duplicate endpoint data exists. One example of a duplicate is if the same IOCs have been received from the same provider and/or provider feed. In other words, the threat status may indicate duplicate if the same IOC is repeatedly received from the same provider and/or provider feed at different times. Changed, unchanged, and duplicate are only three examples of the types of statuses that could be supported by the example computing environment 100.

Threat status-specific actions performed based on the threat status may include storing data to particular threat analysis data repositories 121 and/or and notifying the one or more disposition feed agents 150 that data is available, such as threat differential data 135. For example, if the threat status indicates changed, the one or more threat analysis agents 130 may determine threat differential data 135 and event data (not shown) that indicates the change. The event data may be stored in the event data repository 121. The one or more disposition feed agents 150 may be notified of the availability of the threat differential data 135. Notifying the one or more disposition feed agents 150 that the threat differential data 135 is available may include sending the threat differential data 135 to at least one of the one or more disposition feed agents 150; inserting the threat differential data 135 into a feed between the one or more threat analysis agents 130 and the one or more disposition feed agents 150; and/or storing the threat differential data 135 to a location accessible to the one or more disposition feed agents 150. As another example, if the threat status indicates unchanged, the one or more threat analysis agents 130 may determine event data (not shown) that indicates there has been no change. If the threat status indicates duplicate, the one or more threat analysis agents 130 may determine event data (not shown) that indicates a duplicate of the endpoint data 108 was found.

Threat differential data 135 may include, or otherwise indicate, context associated with the endpoint data 108 and/or the additional context stored by the event data repository 121. This context may provide an up-to-date snapshot of the cyber threat posed by the endpoint indicated by the endpoint data 108. The exact information included by threat differential data 135 may be based on what is included in the endpoint data 108 and/or the additional context stored by the event data repository 121. Due to the dynamic nature of cyber threats, the exact information included by threat differential data 135 may change over time as more CTI data is received (e.g., as IOCs are added/removed from provider feeds by the providers 101-1 to 101-X); and/or as more exclusion data is received (e.g., as exclusions are added/removed from provider feeds by the providers 101-1 to 101-X).

FIG. 1 provides a generalized example of what threat differential data 135 may include. As depicted in FIG. 1, threat differential data 135 may include, or otherwise indicate, a change for the endpoint, such as what IOCs have changed between the endpoint data 108 and the additional context stored in the event data repository 121. Threat differential data 135 may include, or otherwise indicate, occurrences, over all providers 101-1 to 101-X, of IOCs for an endpoint. The occurrences may be a number of IOCs received for an endpoint, a number of providers that provided the IOCs, and/or attributes describing the IOCs. The threat differential data 135 may include, or otherwise indicate, one or more exclusions associated with an endpoint, such as whether the endpoint is, or has been, indicated as a global exclusion, a time-based exclusion, or the like.

Event data may include, or otherwise indicate, the threat status and other information associated with how the one or more threat analysis agent(s) analyzed the endpoint data 108. For example, the event data may include a time at which the event is created or stored to the event store repository 121; an indication of the threat status (e.g., changed, unchanged, duplicate); and an event hash with a hash value computed on one or more attribute-value pairs of the event data. In some variations, the event data may be a copy of, or otherwise include, the threat differential data 135. For example, in such variations, if the threat status indicates changed, the event data may include a copy of the threat differential data 135.

Both threat differential data 135 and event data may be in a format and notation similar to that of the endpoint data 108. In this way, both threat differential data and event data may include attribute-value pairs in a similar format and/or similar notation as that of the endpoint data 108 including any of the attribute-value pairs discussed in connection with Table II.

Table III illustrates more detailed examples of attribute-value pairs that may be included in threat differential data 135 and event data. Similar to the previous tables, Table III provides example descriptions of attributes that may be included in the threat differential data 135 and the event data. Further, for each example description, an example attribute-value pair (e.g., attribute: value) is also provided. The examples of Table III provide only some examples of the attributes and values that may be included in the threat differential data 135 and the event data. Moreover, as the threat differential data 135 and the event data may include any of the attribute-value pairs discussed in connection with Table II, what may be included in the threat differential data 135 and the event data may depend on how the one or more data collection agents 105 determine the endpoint data 108. As the endpoint data 108 may depend on the providers, what may be included in the threat differential data 135 and the event data may depend on the providers 101-1 to 101-X.

TABLE III

| Example Threat Differential Data and Event Data | |
| --- | --- |
| Example Description of Attribute | Example Attribute-Value Pair |
| A value indicating a time at which the threat differential data or the event data was created (e.g., in milliseconds) | "ingestTs": 1789731275.123 |
| A string value indicating the threat status (e.g., values of "duplicate", "unchanged", "changed") and, in some variations, the type of change (e.g., "added", "modified", "removed", "expired") | "threatStatus": "modified" |
| A hash value computed on one or more attribute-value pairs of the threat differential data or the event data | "threatHash": "547bc38906ac99a26498d" |

Due to the dynamic and data intensive nature of cyber threat detection, in some variations, there may be a plurality of threat analysis agents 130 operating in the computing environment 100. Each of the plurality of threat analysis agents 130 may be operating in parallel with the others, listening to any feed(s) from the one or more data collection agents 105, receiving endpoint data, processing its own endpoint data, determines its own threat differential data, storing its own event data, and the like. Additionally, each of the plurality of threat analysis agents 130 may have its own one or more machine learning models 130-1 and/or rules/ policies 130-2.

The plurality of threat analysis agents 130 may also receive other data not depicted in FIG. 1. For example, the plurality of threat analysis agents 130 may receive endpoint queries (e.g., DNS queries) from devices (e.g., computing device 170) associated with a customer of the enterprise. For example, the computing device 170 may send a DNS query identifying an endpoint and a threat analysis agent may receive the DNS query and determine threat differential data for the endpoint. In some variations, the plurality of threat analysis agents 130 may receive the endpoint queries based on an API that the customer, and its devices, are able to access and use, and/or via a feed mechanism similar to the provider feeds. A more detailed example involving the endpoint queries will be discussed below in connection with FIG. 10D.

As also depicted in FIG. 1, one or more threat monitoring agents 140 also may determine threat differential data. Particularly, the one or more threat monitoring agents 140 are shown as determining and/or sending threat differential data 145 to the one or more disposition feed agents 150. Threat differential data 145 may include similar data as those discussed in connection with threat differential data 135. Indeed, threat differential data 145 may include, or otherwise indicate, a change for an endpoint; occurrences, over all providers 101-1 to 101-X, of IOCs for an endpoint; and/or one or more exclusions associated with an endpoint. Further, threat differential data 145 may include the same, or similar, attribute-value pairs as discussed in connection with the threat differential data 135 (e.g., any attribute-value pair as discussed in connection with Tables II and III). However and as depicted in FIG. 1, instead of determining the threat differential data 145 based on the endpoint data 108, the one or more threat monitoring agents 140 may determine the threat differential data based on one or more processes for threat monitoring.

As part of the one or more processes for threat monitoring, the one or more threat monitoring agents 140 may monitor data sources and/or repositories for changes. Based on any changes, the one or more threat monitoring agents 140 may determine whether the one or more disposition feeds agents 150 should be signaled to the changes. The changes may be signaled to the one or more disposition feed agents 150 by threat differential data 145. For example, the one or more threat monitoring agents 140 may monitor any or all of the threat analysis data repositories 120 for changes, evaluate the changes based on monitoring criteria, and if the monitoring criteria is satisfied, determine threat differential data 145 that includes information indicative, or otherwise associated with, the changes.

More particularly, the one or more threat monitoring agents 140 may monitor the event data repository 121 for changes (e.g., event data that changes an exclusion or indicates an exclusion has expired, event data that adds an IOC for an endpoint, request data sent from a disposition feed agent that indicates a request for more context on an endpoint). Based on those changes, the one or more threat monitoring agents 140 may determine the threat differential data 145 (e.g., indicate the changed or expired exclusion, indicate a range of endpoints associated with the endpoint with the added IOC, indicate additional context for an endpoint based on a request from a disposition feed agent, etc.).

In variations that use an exclusion data repository 124, the one or more threat monitoring agents 140 may monitor the exclusion data repository 124 for changes (e.g., a change to an exclusion or an indication that an exclusion has expired). Based on those changes, the one or more threat monitoring agents 140 may determine the threat differential data 145 (e.g., indicate the changed or expired exclusion, indicate a range of endpoints associated with the added or expired exclusion, etc.).

The one or more threat monitoring agents 140 may monitor the telemetry data repository 122 for changes. The telemetry data repository 122 may include statistics, computations, and other data determined in connection with the computing environment 100 (e.g., data determined from of any metadata stored in the raw data and metadata archive 114). The statistics, computations, and other data stored by the telemetry data repository 122 may be determined by any of the agents 105, 130, 140, 150, or some other software application (not shown) executing in the computing environment 100. Once determine, the statistics, computations, and other data may be stored in the telemetry data repository 122. For example, the one or more data collection agents 105 may, prior to storing the metadata to the raw data and metadata archive 114, may process the metadata into one or more statistics regarding a provider, Provider feed, endpoint, or into a normalized format that converts the metadata from the proprietary form used by the CTI provider. The one or more statistics and/or any metadata processed into the normalized form and stored in the telemetry data repository 122. The one or more threat monitoring agents 140 may monitor the statistics, computations, and other data stored by the telemetry data repository 122 for changes. Based on those changes, the one or more threat monitoring agents 140 may determine the threat differential data 145 (e.g., indicate an endpoint associated with a CTI provider that had a statistic change).

The statistics, computations, and other data stored in the telemetry data repository 122 may each be stored as an object that includes various fields. For example, each object may include one or more fields that indicate the value of the statistic, computation, or other data that the object is for. This value may have a particular data type (e.g., integer, string, float); a particular unit (e.g., milliseconds, operations, etc.); and a data fact (e.g., the actual statistic, computation, or other data). Each object may include a field indicating the type of statistic, computation, or other data that the object is for. Each object may include a field indicating (e.g., in milliseconds) of a time at which the statistic, computation, or other data was created or stored in the telemetry data repository 122. Each object may include a field indicating a location where the statistic, computation, or other data was created (e.g., identify a particular data center, cloud service, geographic region where the data center or cloud service is located, or the like). Each object may include a field indicating additional information about the location (e.g., identify a zone of a data center within which the statistic was determined). Each object may include a field indicating additional context to the statistic, computation, or other data (e.g., one or more endpoints associated with the statistic, computation, or other data; one or more CTI providers associated with the statistic, computation, or other data; and/or one or more provider feeds associated with the statistic, computation, or other data). Due to the dynamic nature of cyber threats and the data intensive nature of its detection, there is a wide, almost limitless, variety to the types of statistics, computations, or other data that can be created and/or stored in the telemetry data repository 122. To provide some additional generalized examples of the types of statistics, computations, or other data that can be created and/or stored in the telemetry data repository 122, the telemetry data repository 122 may be queried (e.g., by a human operator and/or the one or more monitoring agents 140) to gather statistical, computational, and other data answers to queries such as: the overall time it takes to collect a feed from a provider; the overall time for an endpoint (e.g., an IOC for an endpoint received in CTI data) from receipt by the one or more data collection agents 105 and to inclusion of a disposition, based on the endpoint, into a disposition feed 154; an elapsed time for all CTI data of a provider feed to be received and processed by the one or more data collection agents 105; how many disposition feed agents of the one or more disposition feed agents 150, based on particular threat differential data, constructed a disposition feed and/or inserted a disposition into a disposition feed; how many disposition feed agents are currently operating in the computing environment 140; and an elapsed time to construct a disposition feed.

The one or more threat monitoring agents 140 may monitor the detection data repository 123 for changes. The detection data repository 123 may include statistics, computations, and other data determined in connection with devices that receive the disposition feeds 154. As some examples, the statistics, computations, and other data may be determined to indicate how much, how often, and for what endpoints network traffic was blocked or monitored due to a disposition sent via a disposition feed. The statistics, computations, and other data may be determined to indicate how many, how often, and for what endpoints queries were sent from devices that received the disposition feeds 154 (e.g., how many DNS queries were sent by computing device 170). These statistics, computations, and other data may be determined by a device that receives a disposition feed 154 (e.g., computing device 170, which may be configured as a RULEGATE by CENTRIPETAL, INC. and may determine statistics about how the RULEGATE monitors and/or blocks network traffic) or another device in communication with such a device (e.g., the one or more threat monitoring agents 140 and/or the one or more disposition feed agents 150). Once determined, the statistics, computations, and other data may be stored (e.g., by the one or more threat monitoring agents 140 and/or the one or more disposition feed agents 150) in the detection data repository 123. The one or more threat monitoring agents 140 may monitor the statistics, computations, and other data stored by the detection data repository 123 for changes. Based on those changes, the one or more threat monitoring agents 140 may determine the threat differential data 145 (e.g., indicate an endpoint associated with a DNS query that was received from computing device 170).

The one or more threat monitoring agents 140 may also monitor additional or alternative data sources and/or repositories than just those shown in FIG. 1. For example, an operator may be able to monitor for a data source that sends signals from a human operator. This may allow for endpoints to be indicated in threat differential data 145 based on human observed behavior or as a way to cause reconfiguration of the disposition feeds 154.

The one or more threat monitoring agents 140 may also, in connection with the one or more processes for threat monitoring, access information stored in the threat analysis data repositories 120. For example, due to some changes (e.g., a change in an exclusion) and/or some monitoring criteria (e.g., when an exclusion changes see if the endpoint is associated with other endpoints), the one or more threat monitoring agents 140 may access the address data repository 126. The address data repository 126 may include a list of all non-overlapping CIDR ranges. Based on some changes and/or some monitoring criteria, the one or more threat monitoring agents 140 may identify an endpoint associated with the changes and/or monitoring criteria, search the list of all non-overlapping CIDR ranges for a range of CIDR addresses that includes the endpoint, and determine threat differential data 145 that indicates the range of CIDR addresses.

In variations that allow the one or more disposition agents 150 to communicate with the one or more threat monitoring agents 140, the one or more threat monitoring agents 140 may monitor for request data sent from the one or more disposition agents 150 (e.g., a disposition agent may send data that indicates a request for more context on an endpoint). Based on received request data, the one or more threat monitoring agents 140 may access various repositories 110; search for any stored information associated with the endpoint; and analyze and/or filter the stored information such that additional context is determined for the endpoint; and determine the threat differential data 145 based on the additional context (e.g., indicate the additional context for the endpoint requested by the disposition feed agent).

The above discussion of the one or more threat monitoring agents 140 provides some examples of the different changes that can be monitored by the one or more threat monitoring agents 140 and/or the different monitoring criteria that may be implemented by the one or more threat monitoring agents 140. There are many different changes that may be monitored by the one or more threat monitoring agents 140, as there are many different types of monitoring criteria that can be implemented by the one or more threat monitoring agents 140. Indeed, the dynamic nature of cyber threats and the data intensive nature of its detection allows such agents to monitor for a wide variety of changes and/or implement innumerable combinations of monitoring criteria.

In view of the wide variety of changes and/or monitoring criteria, in some variations, there may be a plurality of threat monitoring agents 140 operating in the computing environment 100. For example, each of the plurality of threat monitoring agents 140 may monitor for its own changes and/or may implement its own monitoring criteria. Each of the plurality of threat monitoring agents 140 may be operating in parallel with the others, monitoring for its particular changes, determining whether its monitoring criteria is satisfied, determining its threat differential data, and the like. Additionally, each of the plurality of threat monitoring agents 140 may have its own one or more machine learning models 140-1 and/or rules/policies 140-2. In this way, the one or more machine learning models 140-1 and/or rules/policies 140-2 may be configured to be used in connection with monitoring for the changes and/or implementing the monitoring criteria of the threat monitoring agent.

In some variations, the one or more threat monitoring agents 140 may determine and store, in the event data repository 121, event data (not shown) related to the one or more processes for threat monitoring. For example, the one or more threat monitoring agents 140 may determine and store event data indicating monitoring criteria, event data indicating, or otherwise including, threat differential data 145, and the like. The event data determined by the one or more threat monitoring agents 140 may be in the common format and/or common notation used throughout the computing environment 100. Further, the event data may include attribute-value pairs similar to those discussed above in connection with Tables II and III with additional attribute-value pairs to indicate information about the monitoring criteria, threat monitoring agent, and the like.

As also depicted in FIG. 1, the one or more disposition feed agents 150 are shown as receiving threat differential data (e.g., threat differential data 135 from the one or more threat analysis agents 130 and threat differential data 145 from the one or more threat monitoring agents 140); and performing one or more processes for determining disposition feeds; and outputting feed notification 152 and disposition feeds 154 (e.g., disposition feed 1 to disposition feed Z), any or all of which may be received by the computing device 170 via the network 160. The disposition feeds 154 may include dispositions determined based on an endpoint-by-endpoint basis (e.g., as opposed to a provider feed-by-provider feed basis and/or a provider-by-provider basis). In this way, the disposition feeds 154 may include a separate disposition for each endpoint indicated by various objects of threat differential data received by the one or more disposition feed agents 150. The remaining discussion of the one or more disposition feed 150 provider further examples of dispositions determined based on an endpoint-by-endpoint basis.

As part of the one or more processes for determining disposition feeds, the one or more disposition feed agents 150 may receive threat differential data (e.g., threat differential data 135 or threat differential data 145) and determine whether the threat differential data satisfied feed criteria. If the threat differential data satisfied the feed criteria, the one or more disposition feed agents 150 may, if needed, construct a disposition feed, determine a disposition based on the threat differential data, and include or otherwise send the disposition via a disposition feed. If the threat differential data did not satisfy the feed criteria, the one or more disposition feed agents 150 may wait for the next threat differential data to be received and/or may deconstruct a disposition feed.

Due to the dynamic nature of cyber threats and the data intensive nature of its detection, there is a wide, almost limitless, variety to the types of feed criteria that can be used by the one or more disposition feed agents 150. Further, users of the devices that receive the disposition feeds 154 may have their own needs and preferences for filtering network traffic and, thus, each user and/or device that receives a disposition feed may define, or be used as a basis for defining, their own feed criteria. Exclusion data may form the basis for feed criteria (e.g., feed criteria may be established to enforce, or not enforce, a time-based exclusion) and this may increase the variety of feed criteria further. Machine learning models may be trained and used as a basis for determining feed criteria for constructing new disposition feeds and that may increase the variety of feed criteria even further. As some generalized examples of the types of feed criteria that may be used by the one or more disposition feed agents 150, feed criteria may be based on the endpoint indicated by the threat differential data, a change indicated by the threat differential data, IOCs indicated by threat differential data, providers indicated by the threat differential data, a provider feed indicated by the threat differential data, an exclusion indicated by the threat differential data, any address data indicated by the threat differential data, any exclusion data indicated by the threat differential data, any exclusion data associated with the endpoint indicated by the threat differential data, etc.

In some variations, there may be a plurality of disposition feed agents 150 operating in the computing environment 100. For example, each of the plurality of disposition feed agents 150 may use its own feed criteria for constructing its own disposition feed. In this way, each of the plurality of disposition feed agents 150 may construct and deconstruct its own disposition feed. Each of the plurality of disposition feed agents 150 may be operating in parallel with the others, monitoring for threat differential data, determining whether the threat differential data satisfies its feed criteria, determining a disposition based on the threat differential data, and the like. Additionally, each of the plurality of disposition feed agents 150 may have its own one or more machine learning models 150-1 and/or rules/policies 150-2. In this way, the one or more machine learning models 150-1 and/or rules/policies 150-2 may be configured to be used in connection with its own disposition feed agent.

In some further variations, there may be a second plurality of disposition feed agents 150 operating in the computing environment 100. For example, each of this second plurality may have its own one or more machine learning models 150-1 and/or rules/policies 150-2 that are trained and used as a basis for determining new feed criteria for new disposition feeds. In this way, the second plurality may be determining new feed criteria based on threat differential data. That new feed criteria can be used by a new dispositional feed agent to construct a new disposition feed.

The feed criteria may be stored in disposition feed criteria repository 127. In some variations, the disposition feed criteria repository 127 may store the feed criteria and data associating the feed criteria to particular disposition feed agents of the one or more disposition feed agents 150. In other variations, the disposition feed criteria repository 127 may store the code of the one or more disposition feed agents 150 and the code may include the feed criteria. In other variations, the disposition feed criteria repository 127 may not be used, and the code of the one or more disposition feed agents 160 and the feed criteria may be stored in an alternative location (e.g., in one or more computing devices executing the one or more disposition feed agents 150).

As mentioned above, if feed criteria is satisfied, the one or more disposition feed agents 150 may, if needed, construct a disposition feed, determine a disposition based on the threat differential data, and include or otherwise send the disposition via a disposition feed. When constructing a disposition feed, the one or more disposition feed agents 150 may assign a name to the disposition feed that will be used to uniquely identify the disposition from any other disposition feed. This name may determined in various ways including a randomized fashion or based on a naming convention. The naming convention, for example, may be based on any providers and/or any endpoints indicated by the threat differential data. Moreover, the naming convention may be based on the mapping information stored by the CTI mapping repository 128 (e.g., so the name uses the common format and/or common notation used throughout the computing environment 100).

If the feed criteria is satisfied, the one or more disposition feed agents 150 may determine a disposition based on the threat differential data. The disposition may indicate a level of threat for an endpoint and may cause a device that receives the disposition to filter network traffic associated with the endpoint based on the severity of threat posed by the endpoint. For example, a disposition may indicate to remove the endpoint, which may remove the endpoint from the disposition feed (e.g., because the endpoint is no longer a threat and/or is subject to an exclusion). The disposition may indicate to add the endpoint, which may add the endpoint to the disposition feed (e.g., because the endpoint is an emerging threat and/or is no longer subject to an exclusion). The disposition may indicate to monitor the endpoint (e.g., because the endpoint is a growing threat). The disposition may indicate to block the endpoint (e.g., because the endpoint is a severe threat). The above are only some examples of what a disposition may indicate. In some variations, the disposition may indicate fewer types (e.g., only monitor or block) or more types (e.g., the disposition may indicate a time-based exclusion for the endpoint to indicate further dispositions are carried in a temporary disposition feed during a time window for the time-based exclusion).

Due to the dynamic nature of cyber threats and the data intensive nature of its detection, there is a wide, almost limitless, variety to ways in which the one or more disposition feed agents 150 can determine a disposition based on the threat differential data. Further, users of the devices that receive the disposition feeds 154 may have their own needs and preferences for filtering network traffic and, thus, each user and/or device that receives a disposition feed may be used as a basis for how a disposition is determined. As some generalized examples of the ways in which the one or more disposition feed agents 150 can determine a disposition based on threat differential data, a disposition may be determined based on the endpoint indicated by the threat differential data, a change indicated by the threat differential data, IOCs indicated by threat differential data, providers indicated by the threat differential data, a provider feed indicated by the threat differential data, an exclusion indicated by the threat differential data, any address data indicated by the threat differential data, any exclusion data indicated by the threat differential data, any exclusion data associated with the endpoint indicated by the threat differential data, etc. Moreover, the disposition may be determined based on statistics, computations, or other data determined based on the above examples. Indeed, the disposition may be determined by first determining a confidence value indicative of a confidence in threat level (e.g., a confidence value associated with an IOC and indicative of a confidence in the threat level of the IOC) and then determining the disposition based on if the confidence value is above one or more confidence thresholds (e.g., a first threshold for a monitor disposition, a second, higher threshold for a block disposition). The disposition may be determined by first determining a count of IOCs or providers that are indicated by the threat differential data and then determining the disposition based on if the count is greater than one or more count thresholds (e.g., a first threshold for a monitor disposition, a second, higher threshold for a block disposition).

As some examples of the ways in which the one or more disposition feed agents 150 can determine a disposition based on the threat differential data, a disposition may be determined based on how many providers 101-1 to 101-X have indicated an IOC for the endpoint (e.g., if at least three providers have sent data indicating an IOC for the endpoint, determine a disposition to monitor network traffic associated with the endpoint; if at least seven providers have sent data indicating an IOC for the endpoint, determine a disposition to block network traffic associated with the endpoint). A disposition may be determined based on which of the providers 101-1 to 101-X have indicated an IOC for the endpoint (e.g., determine a disposition to monitor if a provider is associated with trust value indicating a low level of trust in the provider; determine a disposition to block if a provider is associated with a trust value indicating a high level of trust in the provider). A disposition may be determined based on indications that one or more of the providers 101-1 to 101-X have repeatedly indicated the same IOC for the endpoint (e.g., based on threat differential data providing an indication as to how many duplicates have been received for the endpoint, determine a disposition to block if the number of duplicates exceeds a threshold). A disposition may be determined based on a time difference between IOCs received for an endpoint (e.g., if the time difference is below a threshold, determine a disposition to block the endpoint). A disposition may be determined based on a time indicating how long the endpoint has been in a current disposition (e.g., determine a disposition to block the endpoint if the endpoint has been in a monitoring disposition for at least a threshold amount of time). A disposition may be determined based on a combination of confidence values, weights, attribute-value pairs, or other data (e.g., a disposition may be determined based on a first confidence value associated a first IOC, a second confidence value associated with one or more attributes of the threat differential data, and a third confidence value associated with at least one provider).

After the disposition is determined, the one or more disposition feed agents 150 may include the disposition in a disposition feed. Once the disposition is included in a disposition feed, the disposition feed may deliver, or otherwise send, the disposition to a device capable of receiving the disposition feed (e.g., computing device 170) in real-time and/or based on API requests. The disposition feed may take one of various forms. For example, a disposition feed may be a DNS feed (e.g. a CleanDNS feed), an Advanced Cyber Threat (ACT) feed, a response policy zone (RPZ) feed, and/or a composite feed. A DNS feed (e.g., a Clean-DNS feed) may allow for feeds constructed to specific user needs (e.g., a DNS feed may be constructed based on feed criteria that is specifically for device 170 or the user of device 170 and/or based on specific endpoint requests from the device 170). An ACT feed may provide dispositions to rules enforcement agents that receive feeds (e.g., computing device 170, which may be configured as a RULEGATE by CENTRIPETAL, INC.). An RPZ feed may allow for an RPZ file include the disposition and be available to requests (e.g., respond, based on the RPZ file, to endpoint requests with a disposition for the requested endpoint and/or to download requests for the RPZ file). A composite feed may be con-figured for particular levels of threat and/or particular sets of endpoints or providers. In this way, a composite feed may allow for a device to receive a feed that includes only desired levels of threat (e.g., a composite feed that includes only block dispositions), desired endpoints (e.g., a composite feed that includes dispositions for a particular CIDR range of endpoints), and/or desired providers (e.g., a composite feed that includes dispositions for IOCs sent by provider 101-1).

FIG. 1 provides a generalized example of a disposition feed and the feed data 155 that it includes. As depicted, disposition feed Z includes feed data 155. The format of the feed data 155 may depend on the type of feed (e.g., DNS feed, ACT feed, RPZ feed, composite feed). The feed data 155 may also include one or more dispositions. Each dis-position may indicate a level of threat for an endpoint and, once received, may cause a receiving device to filter traffic based on the level of threat. For example, if the disposition indicates to monitor the endpoint, a receiving device (e.g., device 170) may log network traffic associated with the endpoint. This log may be sent back to the computing environment 100 for storage, and/or to determine statistics, computations, and other data based on the log and for storage in the detection data repository 123. If the disposi-tion indicates to block the endpoint, a receiving device (e.g., device 170) may block network traffic associated with the endpoint. Indications of what network traffic is blocked may be sent back to the computing environment 100 for storage, and/or to determine statistics, computations, and other data based on the log and for storage in the detection data repository 123.

The one or more disposition feed agents 150 may include any number, or combination of the above types of feeds. And the exact number, or combination, may change over time. As a way to notify devices of which feeds are currently con-structed, the one or more disposition feed agents 150 may identify the constructed feeds in feed notification 152. The feed notification 152 may include the names of disposition feeds currently constructed and/or an indication of what feed criteria is used for the constructed disposition feeds. In this way, receiving devices (e.g., device 170) may determine which disposition feeds they want to receive and begin receiving the desire disposition feeds.

In some variations, the one or more disposition feed agents 150 may determine and store, the event store reposi-tory 121, event data (not shown) related to the one or more processes for determining disposition feeds. For example, the one or more disposition feed agents 150 may determine and store event data indicating a constructed disposition feed, event data indicating that an API call was made via a disposition feed, and the like. The event data determined by the one or more disposition feed agents 150 may be in the common format and/or common notation used throughout the computing environment 100. Further, the event data may include attribute-value pairs similar to those discussed above in connection with Tables II and III with additional attribute-value pairs to indicate information about the disposition feed, API call, disposition feed agent, and the like.

Having discussed the example computing environments 100 of FIG. 1, examples of machine learning models and/or the rules/policies of the various agents 105, 130, 140, 150 of FIG. 1 will now be discussed. These examples are depicted at FIGS. 2, 3A-3D, 4, and 5A-5B. Many of these examples include a machine-learning model, which may be a neural network of various configuration (e.g., feed forward neural network, multilayer perceptron neural network, radial basis function neural network, recurrent neural network, modular neural network). These machine learning models may be trained using a supervised training process that uses human labeled training data. Where appropriate, additional details on the training data will be provided as the examples of FIGS. 2, 3A-3D, 4, and 5A-5B are discussed. Additionally, for these examples, the common format and/or common notation will refer to the common format and/or common notation discussed throughout the computing environment 100 of FIG. 1, including Tables II and III. Further, these examples should be understood as being variations that can operate within the example computing environment 100 of FIG. 1, or a similar computing environment, in any combi-nation. Additionally, for simplicity, the rules/policies depicted in these examples are discussed as receiving out-put, performing determinations, and/or performing analyses. This phrasing is used to simplify that an agent or a com-puting device configured with the rules/policies would apply the rules/policies based on received input and to perform the determinations and/or analyses. In other words, this phrasing is used as a simplified representation that the rules/policies are being used in connection with an agent or a computing device receiving input, performing determinations, and/or performing analyses.

Beginning with FIG. 2, FIG. 2 depicts examples 205, 210, 215 of a data collection agent (e.g., the one or more data collection agents 105 of FIG. 1). The example data collec-tion agent 205 uses rules/policies 208 to determine endpoint data 209 based on the data 206 (e.g., CTI data 103 or exclusion data 106 of FIG. 1). In this way, the rules/policies 208 may be authored to map data from the format and notation of the data 206 into the common format and/or common notation of the endpoint data 209.

The example data collection agent 205 uses machine learning model 212 to determine endpoint data 213 based on the data 211 (e.g., CTI data 103 or exclusion data 106 of FIG. 1). In this way, the machine learning model 212 may be configured to receive, as input, data that is in a particular format and notation (e.g., the format of provider 101-1 of FIG. 1) and to map data from that format and notation into the common format and/or common notation. The machine-learning model 212 may be trained using a corpus of data that is in that particular format and notation (e.g., a corpus of data received from the provider 101-1 of FIG. 1).

Figure 3A:
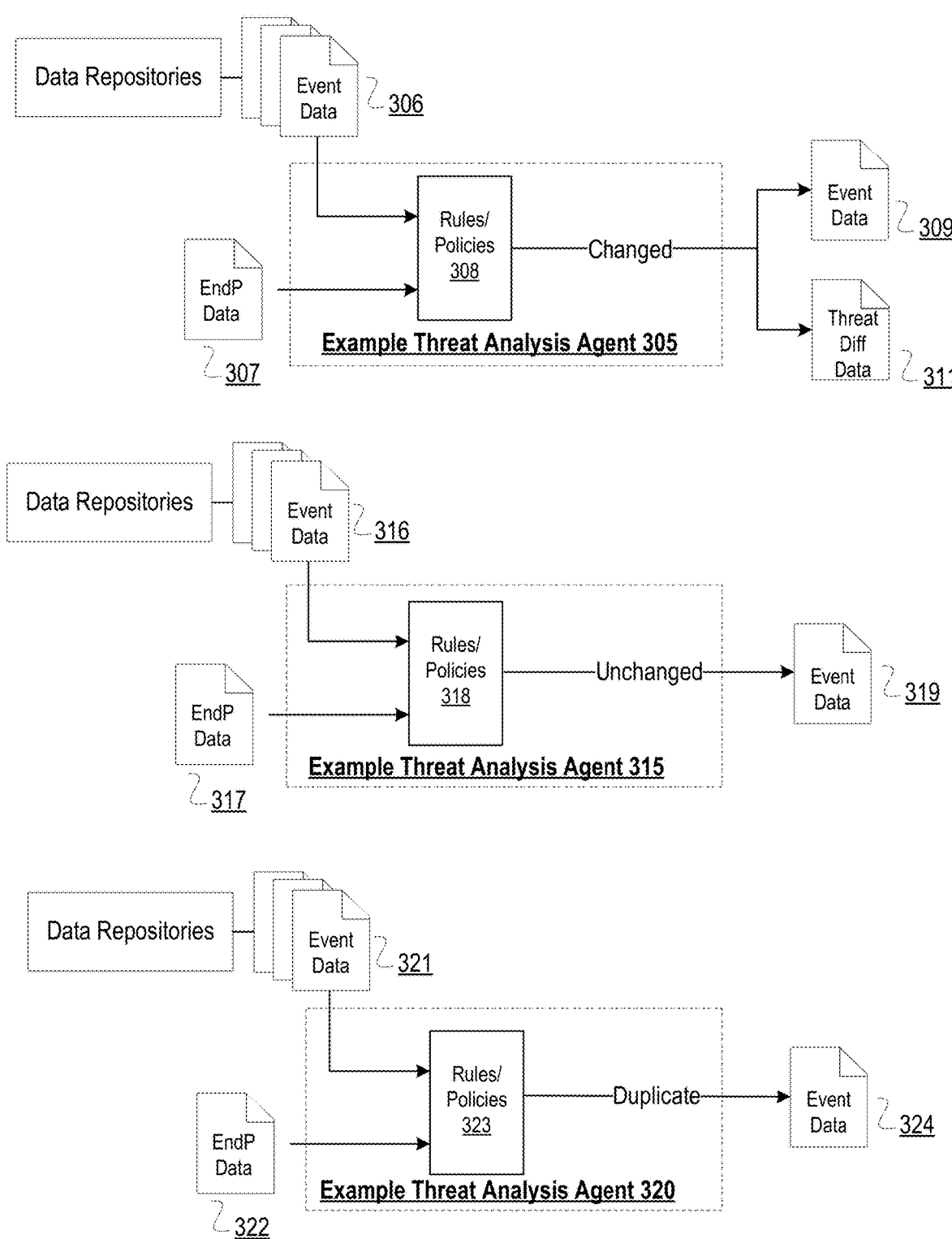
FIGS. 3A-3D depict block diagrams that provide examples related to threat analysis according to various aspects described herein.

The example data collection agent 205 uses machine learning model 217 and rules/policies 218 to determine endpoint data 213 based on the data 216 (e.g., CTI data 103 or exclusion data 106 of FIG. 1). In this way, the machine learning model 212 may be configured to receive, as input, data that is in a particular format and notation (e.g., the format of provider 101-X of FIG. 1) and to map the data into a form that the rules/policies 218 can convert into the common format and/or notation. The machine-learning model 212 may be trained using a corpus of data that is in that particular format and notation (e.g., a corpus of data received from the provider 101-X of FIG. 1). The rules/policies 208 may be authored to convert the output of the machine learning model 217 into the common format and/or common notation of the endpoint data 209. Continuing at FIG. 3A, FIG. 3A depicts examples 305, 315, 320 of a threat analysis agent (e.g., the one or more threat analysis agents 130 of FIG. 1). Each of the example threat analysis agents 305, 315, 320 uses rules/policies to analyze endpoint data (e.g., as sent from the one or more data collection agents 105) and event data (e.g., as stored by the event store repository 121 of FIG. 1). More particularly, the example threat analysis agent 305 includes rules/policies 308 to determine, based on the endpoint data 307 and the event data 306 that a change for an endpoint has occurred. Based on the change, the rules/policies 308 may determine event data 309 and threat differential data 311, both of which are in the common format and/or notation. The rules/policies 308 may be authored to determine that the change for the endpoint has occurred, to determine the event data 309, and to determine the threat differential data 311.

The example threat analysis agent 315 includes rules/policies 318 to determine, based on the endpoint data 317 and the event data 316 that a change for the endpoint has not occurred. Based on the change not occurring, the rules/policies 318 may determine event data 319 in the common format and/or notation. The rules/policies 318 may be authored to determine that the change for the endpoint has occurred and to determine the event data 309.

The example threat analysis agent 320 includes rules/policies 328 to determine, based on the endpoint data 322 and the event data 321 that a duplicate for the endpoint has been received. Based on the duplicate, the rules/policies 328 may determine event data 324 in the common format and/or notation. The rules/policies 328 may be authored to determine that the duplicate for the endpoint has been received and to determine the event data 319.

Figure 3B:
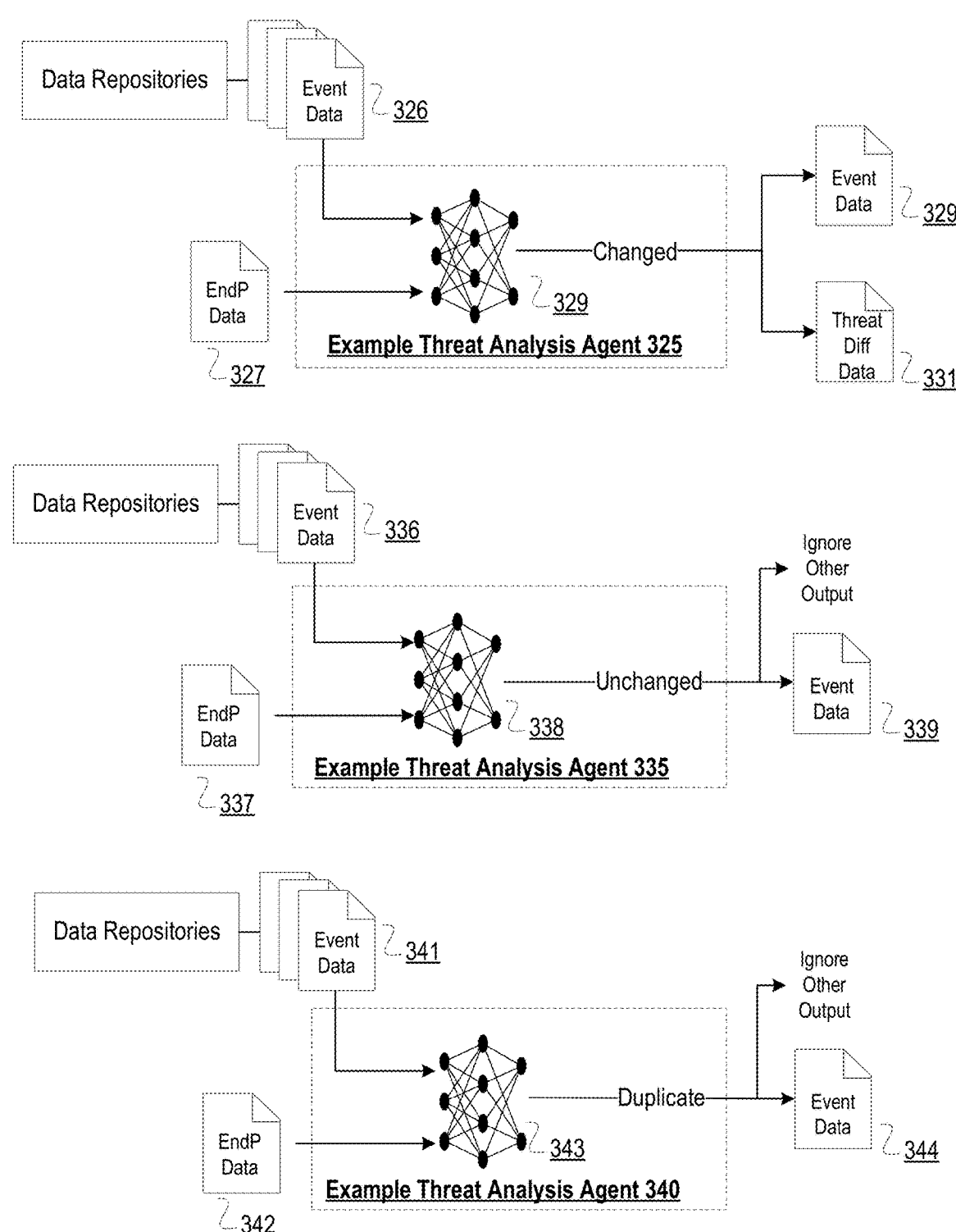

Continuing at FIG. 3B, FIG. 3B depicts examples 325, 335, 340 of a threat analysis agent (e.g., the one or more threat analysis agents 130 of FIG. 1). Each of the example threat analysis agents 325, 335, 340 uses a machine learning model to analyze endpoint data (e.g., as sent from the one or more data collection agents 105) and event data (e.g., as stored by the event store repository 121 of FIG. 1). More particularly, the example threat analysis agent 325 includes a machine learning model 329 configured to analyze the endpoint data 327 and the event data 326. In this way, the machine learning model 329 may be configured to receive, as input, event data and endpoint data; determine that a change for an endpoint has occurred; and output, based on the determination, event data 329 and threat differential data 331, both of which are in the common format and/or common notation. Further, the machine-learning model 329 may indicate the change for the endpoint has occurred based on a confidence value indicative of whether the change for the endpoint has occurred. The machine-learning model 329 may be trained using a corpus of combined event data and endpoint data. The corpus of combined event data and endpoint data may include human labeled combinations of event data and endpoint data where the labels indicate whether the combination has a change, is unchanged, or is a duplicate.

The example threat analysis agent 335 includes a machine learning model 338 to analyze the endpoint data 336 and the event data 337. In this way, the machine learning model 338 may be configured to receive, as input, event data and endpoint data; determine that a change for an endpoint has not occurred; and output, based on the determination, event data 338, which is in the common format and/or common notation. Any other output of the machine learning model 338 may be ignored. Further, the machine-learning model 338 may indicate the change for the endpoint has not occurred based on a confidence value indicative of whether the change for the endpoint has occurred. The machine-learning model 338 may be trained using a corpus of combined event data and endpoint data. The corpus of combined event data and endpoint data may include human labeled combinations of event data and endpoint data where the labels indicate whether the combination has a change, is unchanged, or is a duplicate.

The example threat analysis agent 340 includes a machine learning model 343 to analyze the endpoint data 342 and the event data 341. In this way, the machine learning model 343 may be configured to receive, as input, event data and endpoint data; determine that a duplicate for an endpoint has been received; and output, based on the determination, event data 344, which is in the common format and/or common notation. Any other output of the machine learning model 343 may be ignored. Further, the machine-learning model 343 may indicate the duplicate for the endpoint has been received based on a confidence value indicative of whether a duplicate has been received. The machine-learning model 343 may be trained using a corpus of combined event data and endpoint data. The corpus of combined event data and endpoint data may include human labeled combinations of event data and endpoint data where the labels indicate whether the combination has a change, is unchanged, or is a duplicate.

Figure 3C:
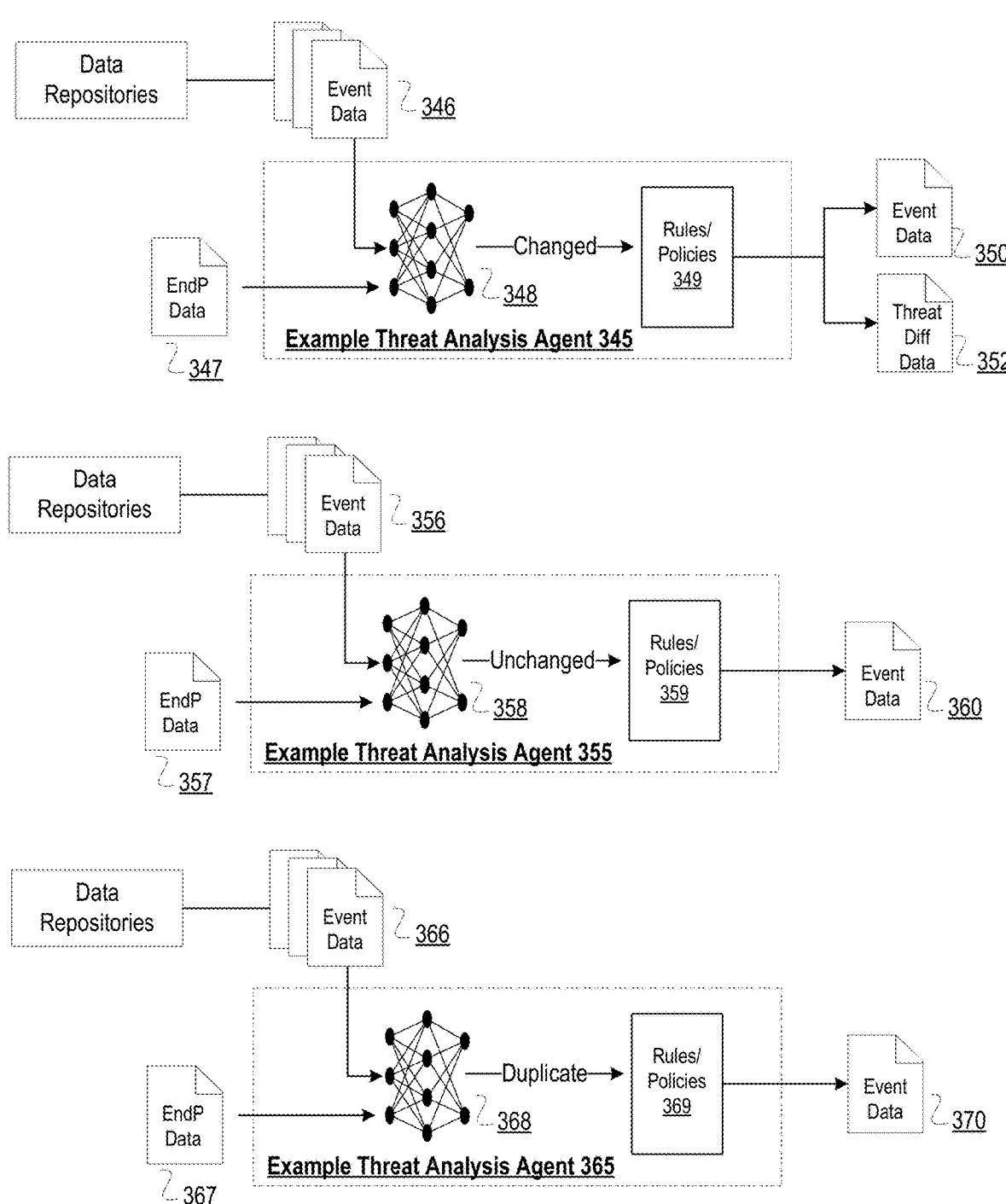

Continuing at FIG. 3C, FIG. 3C depicts examples 345, 355, 365 of a threat analysis agent (e.g., the one or more threat analysis agents 130 of FIG. 1). Each of the example threat analysis agents 345, 355, 365 uses a machine learning model to analyze endpoint data (e.g., as sent from the one or more data collection agents 105) and event data (e.g., as stored by the event store repository 121 of FIG. 1). As also depicted by each of the example threat analysis agents 345, 355, 365, output of the machine learning model is used as a basis for rules/policies to determine event data and/or threat differential data. More particularly, the example threat analysis agent 345 includes a machine learning model 348 configured to analyze the endpoint data 347 and the event data 346. In this way, the machine learning model 348 may be configured to receive, as input, event data and endpoint data; determine that a change for an endpoint has occurred; and output at least a confidence value as to whether the change for the endpoint has occurred. The rules/policies 349 may receive the confidence value (and other output from the machine-learning model 348). Based on the confidence value, the rules/policies 349 may determine that the change occurred and, based on the event data 346 and the endpoint data 347 (and/or any other output from the machine-learning model 348), may determine threat differential data 352 and event data 350, both of which are in the common format and/or common notation. The machine-learning model 348 may be trained using a corpus of combined event data and endpoint data. The corpus of combined event data and endpoint data may include human labeled combinations of event data and endpoint data where the labels indicate whether the combination has a change, is unchanged, or is a duplicate. The rules/policies 349 may be authored to determine that the change for the endpoint occurred, to determine the threat differential data 352, and to determine the event data 350.

The example threat analysis agent 355 includes a machine learning model 358 configured to analyze the endpoint data 357 and the event data 356. In this way, the machine learning model 358 may be configured to receive, as input, event data and endpoint data; determine that a change for an endpoint has not occurred; and output at least a confidence value as to whether the change for the endpoint has not occurred. The rules/policies 359 may receive the confidence value (and other output from the machine-learning model 358). Based on the confidence value, the rules/policies 359 may determine that the change has not occurred and, based on the event data 356 and the endpoint data 357 (and/or any other output from the machine-learning model 358), may determine event data 360, which is in the common format and/or common notation. The machine-learning model 358 may be trained using a corpus of combined event data and endpoint data. The corpus of combined event data and endpoint data may include human labeled combinations of event data and endpoint data where the labels indicate whether the combination has a change, is unchanged, or is a duplicate. The rules/policies 359 may be authored to determine that the change for the endpoint has not occurred and to determine the event data 360.

The example threat analysis agent 365 includes a machine learning model 368 configured to analyze the endpoint data 367 and the event data 366. In this way, the machine learning model 368 may be configured to receive, as input, event data and endpoint data; determine that a duplicate for the endpoint has been received; and output at least a confidence value as to whether the duplicate for the endpoint has been received. The rules/policies 369 may receive the confidence value (and other output from the machine-learning model 368). Based on the confidence value, the rules/policies 369 may determine that the duplicate for the endpoint has been received and, based on the event data 366 and the endpoint data 367 (and/or any other output from the machine-learning model 368), may determine event data 370, which is in the common format and/or common notation. The machine-learning model 368 may be trained using a corpus of combined event data and endpoint data. The corpus of combined event data and endpoint data may include human labeled combinations of event data and endpoint data where the labels indicate whether the combination has a change, is unchanged, or is a duplicate. The rules/policies 369 may be authored to determine that the duplicate for the endpoint has been received and to determine the event data 370.

Figure 3D:
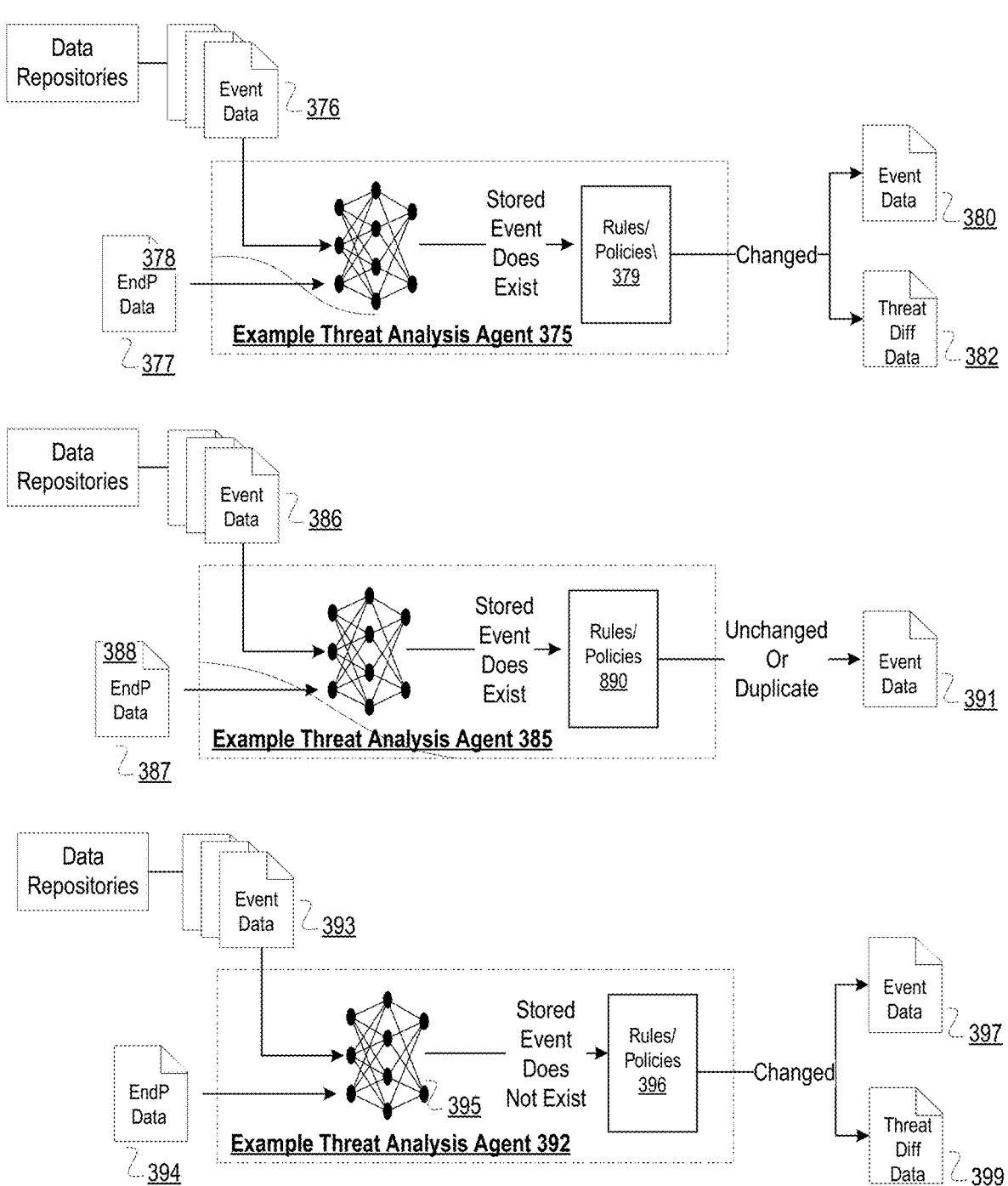

Continuing at FIG. 3D, FIG. 3D depicts examples 375, 385, 392 of a threat analysis agent (e.g., the one or more threat analysis agents 130 of FIG. 1). Each of the example threat analysis agents 375, 385, 392 uses a machine learning model to analyze endpoint data (e.g., as sent from the one or more data collection agents 105) and event data (e.g., as stored by the event store repository 121 of FIG. 1). As also depicted by each of the example threat analysis agents 375, 385, 392, output of the machine learning model is used as a basis for rules/policies to determine event data and/or threat differential data. More particularly, the example threat analysis agent 375 includes a machine learning model 378 configured to analyze the endpoint data 377 and the event data 376. In this way, the machine learning model 378 may be configured to receive, as input, event data and endpoint data; determine that a stored event exists for an endpoint indicated by the endpoint data 377 (e.g., the event data 376 includes a stored event for an endpoint indicated by the endpoint data 377); and output at least a confidence value for the stored event existing. The rules/policies 379 may receive the confidence value (and other output from the machine-learning model 378). Based on the confidence value, the rules/policies 379 may proceed to perform further analysis on the event data 346 and/or the endpoint data 347. Based on the further analysis, the rules/policies 379 may determine that a change for the endpoint has occurred and, based on the event data 376 and the endpoint data 377 (and/or any other output from the machine-learning model 378), may determine threat differential data 382 and event data 380, both of which are in the common format and/or common notation. The machine-learning model 378 may be trained using a corpus of combined event data and endpoint data. The corpus of combined event data and endpoint data may include human labeled combinations of event data and endpoint data where the labels indicate whether the event data includes data for an endpoint indicated by the endpoint data. The rules/policies 379 may be authored to determine that the change for the endpoint occurred, to determine the threat differential data 382, and to determine the event data 380.

The example threat analysis agent 385 includes a machine learning model 388 configured to analyze the endpoint data 387 and the event data 386. In this way, the machine learning model 388 may be configured to receive, as input, event data and endpoint data; determine that a stored event exists for an endpoint indicated by the endpoint data 387 (e.g., the event data 386 includes a stored event for an endpoint indicated by the endpoint data 387); and output at least a confidence value for the stored event existing. The rules/policies 390 may receive the confidence value (and other output from the machine-learning model 388). Based on the confidence value, the rules/policies 390 may proceed to perform further analysis on the event data 386 and/or the endpoint data 387. Based on the further analysis, the rules/policies 390 may determine that a change for the endpoint has not occurred or a duplicate for the endpoint has been received. Accordingly, based on the event data 386 and the endpoint data 387 (and/or any other output from the machine-learning model 388), the rules/policies 390 may determine event data 391, which is in the common format and/or common notation. The machine-learning model 388 may be trained using a corpus of combined event data and endpoint data. The corpus of combined event data and endpoint data may include human labeled combinations of event data and endpoint data where the labels indicate whether the event data includes data for an endpoint indicated by the endpoint data. The rules/policies 390 may be authored to determine that the change for the endpoint has not occurred and/or to determine that a duplicate for the endpoint has been received, and to determine the event data 390.

The example threat analysis agent 392 includes a machine learning model 395 configured to analyze the endpoint data 394 and the event data 393. In this way, the machine learning model 395 may be configured to receive, as input, event data and endpoint data; determine that a stored event exists for an endpoint indicated by the endpoint data 394 (e.g., the event data 393 includes a stored event for an endpoint indicated by the endpoint data 394); and output at least a confidence value for the stored event existing. The rules/policies 396 may receive the confidence value (and other output from the machine-learning model 395). Based on the confidence value, the rules/policies 396 may proceed to determine that a change for the endpoint has occurred (e.g., because a stored event does not exist). Accordingly, based on the event data 393 and the endpoint data 394 (and/or any other output from the machine-learning model 395), the rules/policies 396 may determine event data 398 and threat differential data 399, which are both in the common format and/or common notation. The machine-learning model 395 may be trained using a corpus of combined event data and endpoint data. The corpus of combined event data and endpoint data may include human labeled combinations of event data and endpoint data where the labels indicate whether the event data includes data for an endpoint indicated by the endpoint data. The rules/policies 396 may be authored to determine that the change for the endpoint has occurred, to determine the threat differential data 399, and to determine the event data 398.

Continuing at FIG. 4, FIG. 4 depicts examples 405, 420, 430 of a threat monitoring agent (e.g., the one or more threat monitoring agents 140 of FIG. 1). Each of the example threat monitoring agents 405, 420, 430 uses a machine learning model and/or rules/policies to monitor one or more data repositories (e.g., threat analysis data repositories 121 of FIG. 1) and determine if monitoring criteria is satisfied. As also depicted by each of the example threat monitoring agents 405, 420, 430, based on the monitoring criteria being satisfied, each of the example threat monitoring agents 405, 420, 430 uses a machine learning model and/or rules/policies to determine threat differential data and/or event data.

The example threat monitoring agent 405 includes a machine learning model 407 configured to analyze event data 406 (e.g., as stored in the event data repository 121 of FIG. 1). In this way, the machine learning model 407 may be configured to receive, as input, event data; determine whether monitoring criteria is satisfied based on the event data; and output at least a confidence value as to whether the monitoring criteria is satisfied. The rules/policies 409 may receive the confidence value (and other output from the machine-learning model 407). Based on the confidence value, the rules/policies 409 may proceed to determine that the monitoring criteria is satisfied (e.g., because confidence value is above a threshold). Accordingly, based on the event data 406 (and/or any other output from the machine-learning model 407), the rules/policies 409 may determine event data 410 and threat differential data 412, which are both in the common format and/or common notation. The machine-learning model 407 may be trained using a corpus of event data. The corpus of event data may include human labeled event data where the labels indicate whether the event data satisfies the meeting criteria. The rules/policies 409 may be authored to determine that the meeting criteria is satisfied, to determine the threat differential data 412, and to determine the event data 410.

The example threat monitoring agent 420 includes rules/policies 422 configured to analyze event data 421 (e.g., as stored in the event data repository 121 of FIG. 1), determine that the monitoring criteria is satisfied, determine event data 423, and determine threat differential data 425. The event data 410 and the threat differential data 412 may be both in the common format and/or common notation. The rules/policies 409 may be authored to determine that the meeting criteria is satisfied, to determine the threat differential data 412, and to determine the event data 410.

The example threat monitoring agent 435 includes a machine learning model 432 configured to analyze event data 431 (e.g., as stored in the event data repository 121 of FIG. 1). In this way, the machine learning model 432 may be configured to receive, as input, event data; determine whether monitoring criteria is satisfied based on the event data; and output event data 433 and/or threat differential data 435, which are both in the common format and/or common notation. The machine-learning model 407 may be trained using a corpus of event data. The corpus of event data may include human labeled event data where the labels indicate whether the event data satisfies the meeting criteria.

Figure 5A:
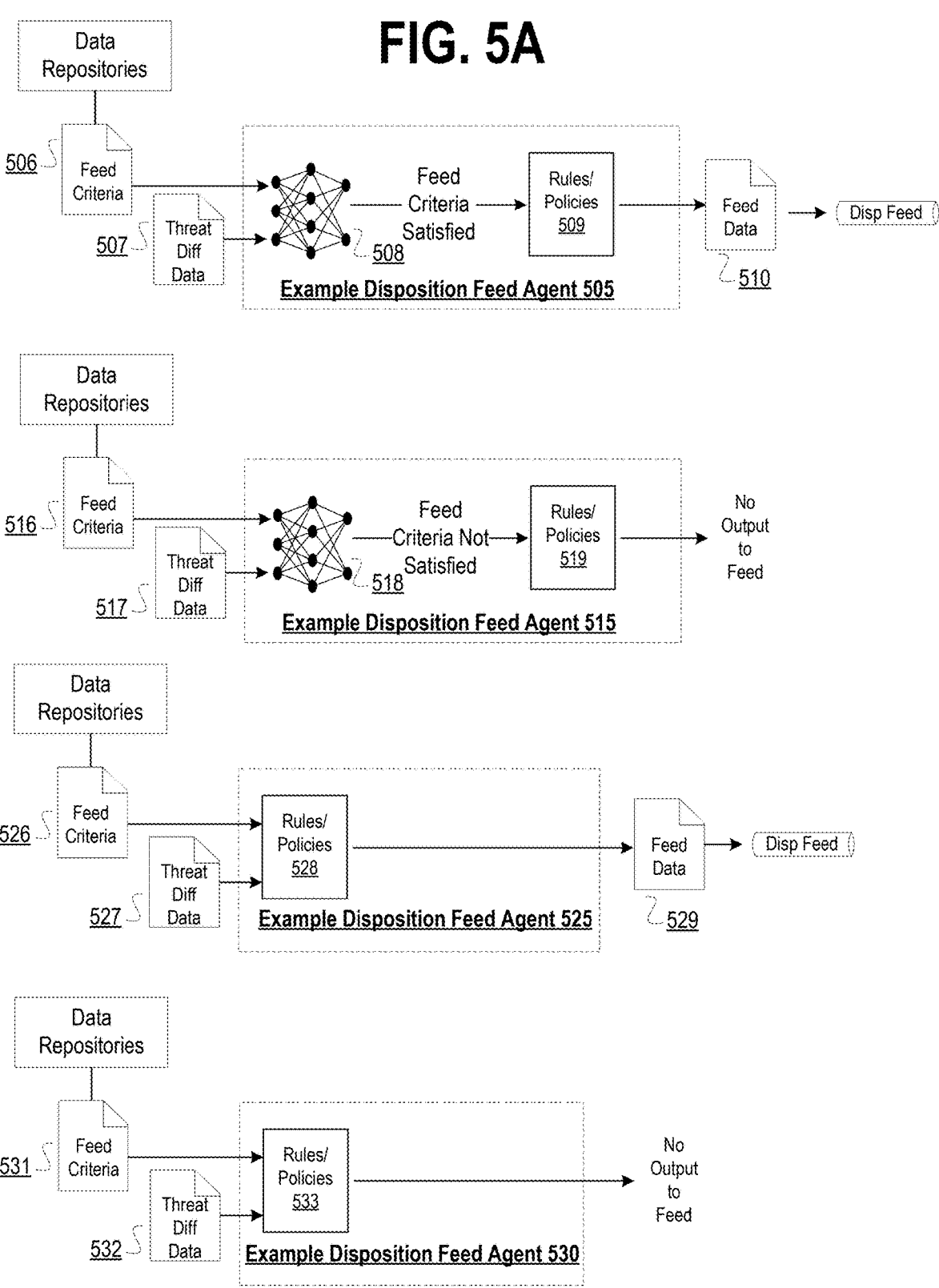

Continuing at FIG. 5A, FIG. 5A depicts examples 505, 515, 525, 530 of a disposition feed agent (e.g., the one or more disposition feed agents 150 of FIG. 1). Each of the example disposition feed agents 505, 515, 525, 530 uses a machine learning model and/or rules/policies to determine if feed criteria is satisfied and, if the feed criteria is satisfied, include feed data in a disposition feed. More particularly, the example disposition feed agent 505 includes a machine-learning model 508 configured to analyze threat differential data 507 based on feed criteria 506. In this way, the machine learning model 508 may be configured to receive, as input, threat differential data; determine that feed criteria is satisfied based on the threat differential data; and output at least a confidence value as to whether the feed criteria is satisfied. The rules/policies 509 may receive the confidence value (and other output from the machine-learning model 508). Based on the confidence value, the rules/policies 509 may proceed to determine that the feed criteria is satisfied (e.g., because the confidence value is above a threshold). Accordingly, based on the threat differential data 507 (and/or any other output from the machine-learning model 506), the rules/policies 509 may determine feed data 510 that includes a disposition for an endpoint indicated by the threat differential data 507. The feed data 510 may be included in a disposition feed. The machine-learning model 508 may be trained using a corpus of threat differential data. The corpus of threat differential data may include human labeled threat differential data where the labels indicate whether feed criteria is satisfied. The rules/policies 509 may be authored to determine that feed criteria is satisfied, to determine the feed data 510 and the included disposition, and to include the feed data 510 in a disposition feed.

The example disposition feed agent 515 includes a machine-learning model 518 configured to analyze threat differential data 517 based on feed criteria 516. In this way, the machine learning model 518 may be configured to receive, as input, threat differential data; determine that feed criteria is not satisfied based on the threat differential data; and output at least a confidence value as to whether the feed criteria is not satisfied. The rules/policies 519 may receive the confidence value (and other output from the machine-learning model 518). Based on the confidence value, the rules/policies 519 may proceed to determine that the feed criteria is not satisfied (e.g., because the confidence value is below a threshold). Accordingly, based on the threat differential data 517 (and/or any other output from the machine-learning model 516), the rules/policies 519 may determine not to output to a differential feed. The machine-learning model 518 may be trained using a corpus of threat differential data. The corpus of threat differential data may include human labeled threat differential data where the labels indicate whether feed criteria is satisfied. The rules/policies 51 may be authored to determine that the feed criteria is not satisfied.

The example disposition feed agent 525 includes rules/policies 528 configured to analyze threat differential data 527 based on feed criteria 526 and determine that the feed criteria 526 is satisfied based on the threat differential data 527. Based on the feed criteria 526 being satisfied, the rules/policies 528 may determine feed data 529 that includes a disposition for an endpoint indicated by the threat differential data 527. The feed data 529 may be included in a disposition feed. The rules/policies 528 may be authored to determine that the feed criteria 527 is satisfied, to determine the feed data 529 and the included disposition, and to include the feed data 529 in a disposition feed.

The example disposition feed agent 530 includes rules/policies 533 configured to analyze threat differential data 532 based on feed criteria 531 and determine that the feed criteria 531 is not satisfied based on the threat differential data 532. Based on the feed criteria 531 not being satisfied, the rules/policies 533 may determine not to output to a disposition feed. The rules/policies 533 may be authored to determine that the feed criteria 531 is not satisfied.

Continuing at FIG. 5B, FIG. 5B depicts examples 540, 550 of a disposition feed agent (e.g., the one or more disposition feed agents 150 of FIG. 1). Each of the example disposition feed agents 540, 550 uses a machine learning model and/or rules/policies to determine if new feed criteria should be used to create a new disposition feed. More particularly, the example disposition feed agent 540 includes a machine-learning model 542 configured to analyze threat differential data 541. In this way, the machine learning model 542 may be configured to receive, as input, threat differential data; determine new feed criteria based on the threat differential data; and output at least one confidence value for the new feed criteria. The rules/policies 543 may receive the at least one confidence value and the new feed criteria. Based on the at least one confidence value, the rules/policies 543 may proceed to determine that the new feed criteria should be a basis for a new disposition feed (e.g., because the at least one confidence value is above a threshold). Accordingly, a new disposition feed agent 545 may be created and the feed criteria 544, which may include the new feed criteria output by the machine learning model 542, may be assigned to the new disposition feed agent 545. based on the feed criteria 544, the new disposition feed agent may create a new disposition feed. The machine-learning model 542 may be trained using a corpus of threat differential data. The corpus of threat differential data may include human labeled threat differential data where the labels indicate various criterions that could be used as a basis for new feed criteria. The rules/policies 543 may be authored to determine that the new feed criteria should be a basis for a new disposition feed and to create a new disposition feed agent.

The example disposition feed agent 550 includes a machine-learning model 552 configured to analyze threat differential data 551. In this way, the machine learning model 552 may be configured to receive, as input, threat differential data; determine new feed criteria based on the threat differential data; and output at least one confidence value for the new feed criteria. The rules/policies 553 may receive the at least one confidence value and the new feed criteria. Based on the at least one confidence value, the rules/policies 553 may proceed to determine that the new feed criteria should not be a basis for a new disposition feed (e.g., because the at least one confidence value is below a threshold). The machine-learning model 552 may be trained using a corpus of threat differential data. The corpus of threat differential data may include human labeled threat differential data where the labels indicate various criterions that could be used as a basis for new feed criteria. The rules/policies 553 may be authored to determine that the new feed criteria should not be a basis for a new disposition feed.

Figure 6A:
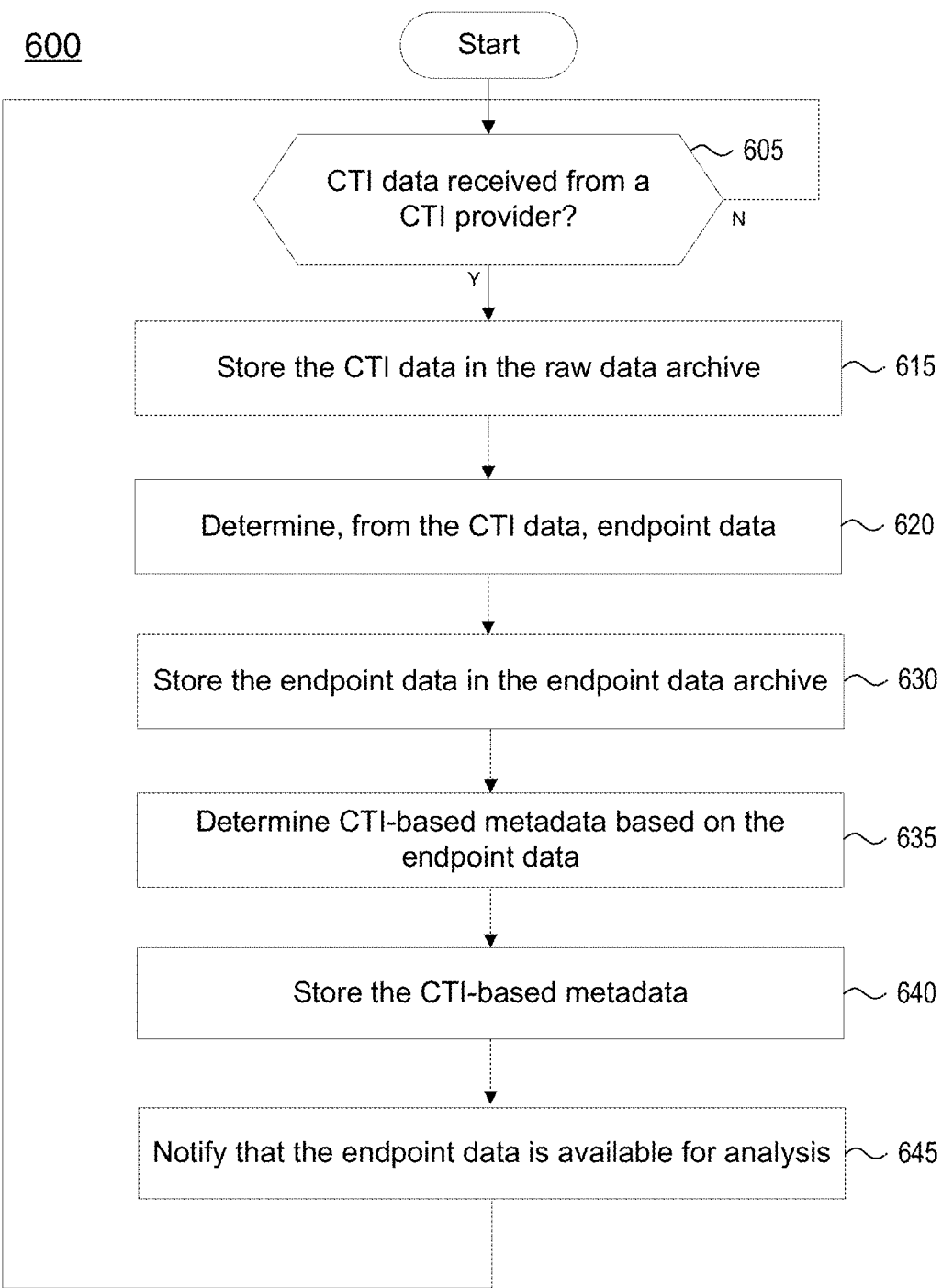
FIGS. 6A-6B depict example methods for receiving, storing, and/or processing CTI data and/or exclusion data according to various aspects described herein.
Figure 6B:
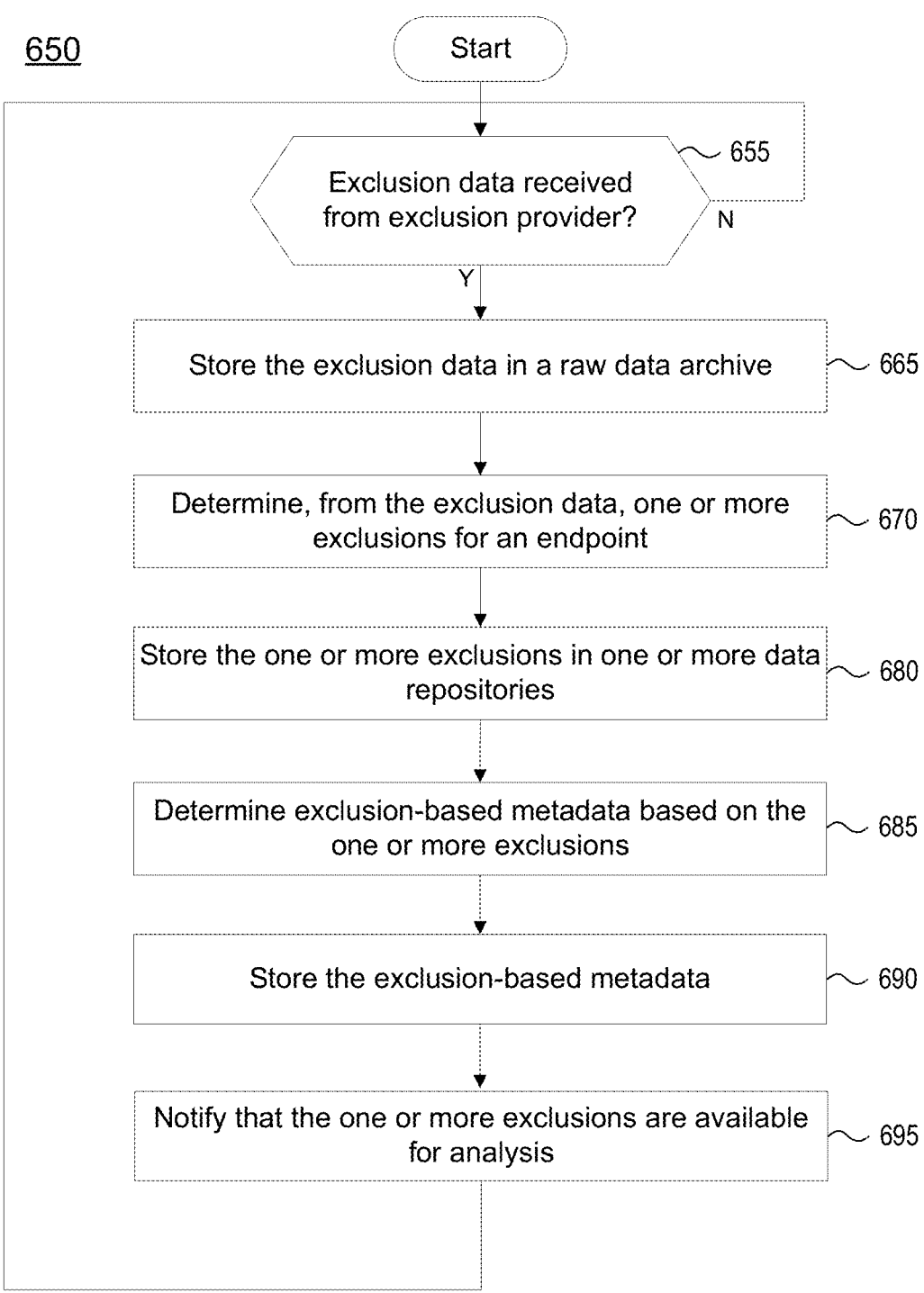
Figure 7:
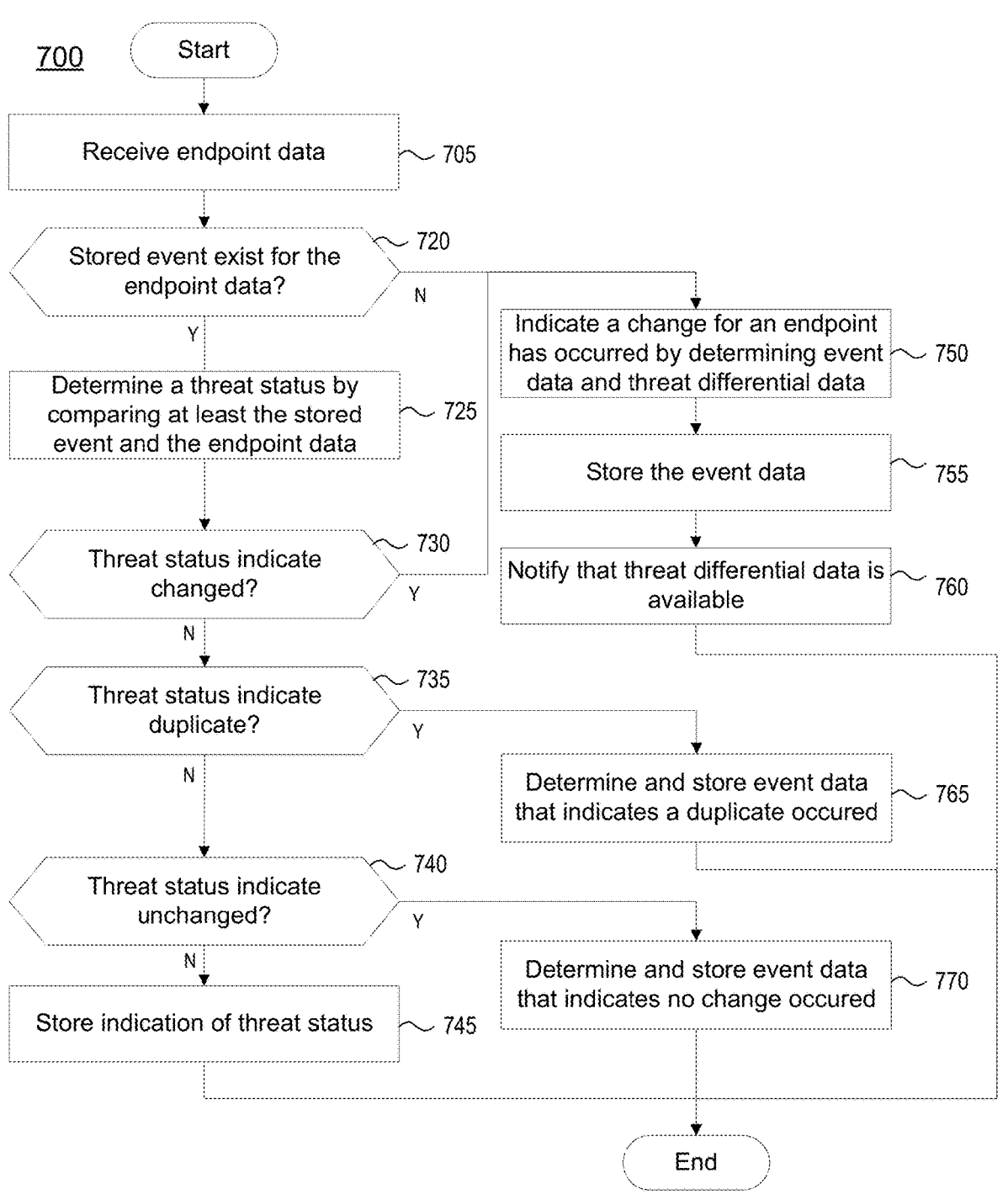
FIG. 7 depicts an example method for ingesting and analyzing endpoint data according to various aspects described herein.
Figure 8:
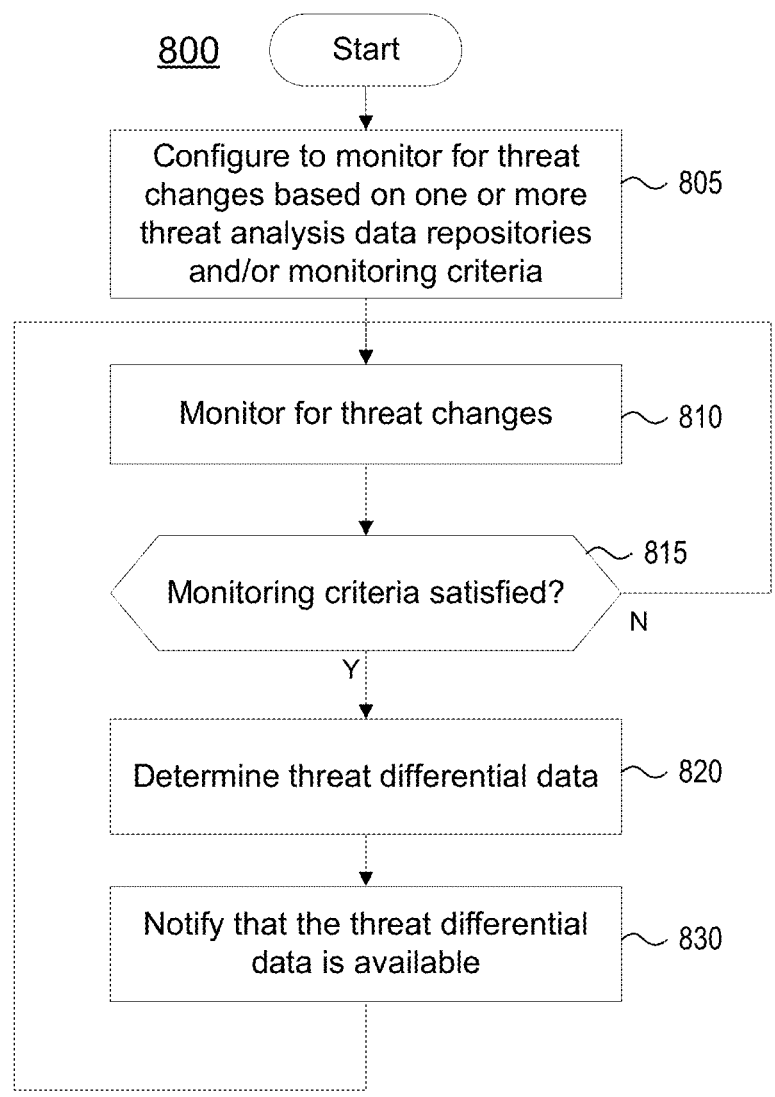
FIG. 8 depicts an example method for threat monitoring according to various aspects described herein.
Figure 9:
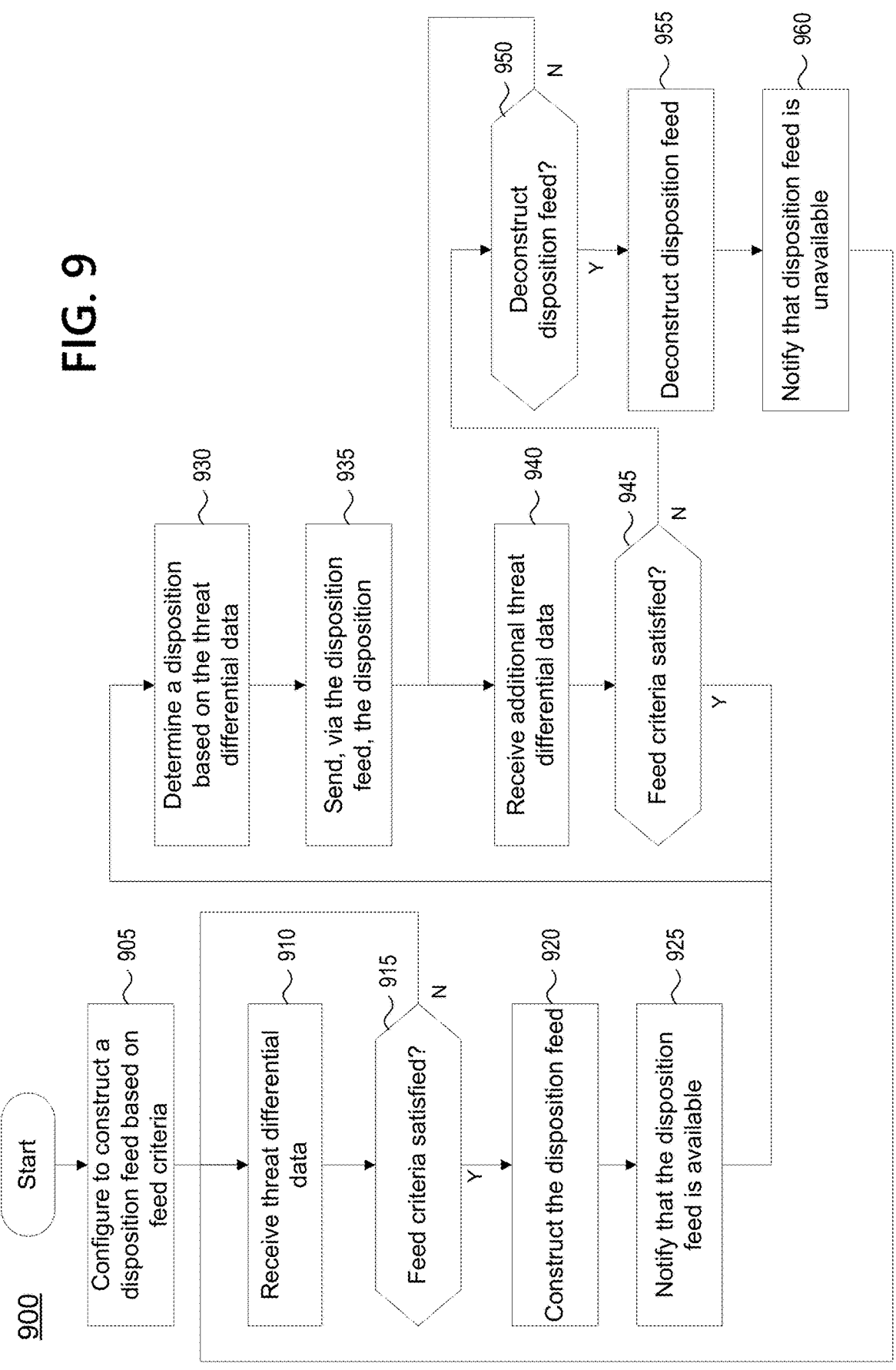
FIG. 9 depicts an example method for determining disposition feeds according to various aspects described herein.

Having discussed the example computing environments 100 of FIG. 1, as well as examples of machine learning models and/or the rules/policies of the various agents 105, 130, 140, 150 of FIG. 1, examples of methods that may be performed by the various agents 105, 130, 140, 150 of FIG. 1 will now be discussed. FIGS. 6A and 6B depicts example methods 600, 650 that may be performed by the one or more data collection agents 105 of FIG. 1 (e.g., as part of the one or more processes for receiving, storing, and/or processing CTI data and/or exclusion data). FIG. 7 depicts an example method 700 that may be performed by the one or more threat analysis agents 130 of FIG. 1 (e.g., as part of the one or more processes for ingesting and analyzing endpoint data). FIG. 8 depicts an example method 800 that may be performed by the one or more threat monitoring agents 140 of FIG. 1 (e.g., as part of the one or more processes for threat monitoring). FIG. 9 depicts an example method 900 that may be performed by the one or more disposition feed agents 150 of FIG. 1 (e.g., as part of the one or more processes for determining disposition feeds). The example methods 600, 650, 700, 800, 900 are only some examples of the processes that can be performed by the various agents 105, 130, 140, 150 of FIG. 1. Other variations may include omitting steps from the example methods 600, 650, 700, 800, 900, adding new steps to the example methods 600, 650, 700, 800, 900, and/or changing the order of steps from the example methods 600, 650, 700, 800, 900. For these example methods 600, 650, 700, 800, 900, the common format and/or common notation will refer to the common format and/or common notation discussed throughout the computing environment 100 of FIG. 1, including Tables II and III. Additionally, for simplicity, the example methods 600, 650, 700, 800, 900, will be discussed in terms of being performed by one or more computing devices.

Beginning with the example method 600 of FIG. 6A, at step 605, one or more computing device may determine whether data of a CTI data type has been received from a provider. This determination may be performed based on a process that classifies received data as the CTI data type. This classification may be performed the same as, or similar to, the classification discussed in connection with FIG. 1. The data that is being classified may be received via a provider feed (e.g., in real-time or based on an API call). If data of the CTI data type is received (e.g., via provider feed 1 of FIG. 1), the method 600 may proceed to step 615. If data of the CTI data type is not received, the method 600 may proceed to wait for data of the CTI data type to be received by repeating step 605. For simplicity, the remaining steps of FIG. 6A will refer to the data of the CTI data type as "CTI data".

At step 615, the one or more computing devices may store the CTI data for storage in a raw data archive (e.g., the raw data and metadata archive 114 of FIG. 1).

At step 620, the one or more computing devices may determine, from the CTI data, endpoint data. Once determined, for example, the endpoint data may indicate one or more IOCs for an endpoint. This determination may include extracting portions from the CTI data, mapping the portions from a format and/or notation of the CTI data (e.g., a first format and/or first notation) and into a common format and/or common notation of the endpoint data (e.g., a second format and/or second notation). Once determined, the endpoint data may include attribute-value pairs similar to those discussed above in connection with Table II, and the attributes of the endpoint data may have values based on the portions extracted from the CTI data and/or values associated with how the CTI data was received. This determination may be performed based on any of the example variations of a data collection agent as discussed in connection with FIG. 2.

At step 630, the one or more computing devices may store the endpoint data in an endpoint data archive (e.g., endpoint data archive 115 of FIG. 1).

At step 635, the one or more computing devices may determine CTI-based metadata based on the endpoint data. This CTI-based metadata may be the same as, or similar to, the CTI-based metadata discussed in connection with FIG. 1.

At step 640, the one or more computing devices may store the CTI-based metadata. The CTI-based metadata may be stored in a raw data archive (e.g., the raw data and metadata archive 114 of FIG. 1).

At step 645, the one or more computing devices may notify that the endpoint data is available for analysis. Notifying the endpoint data is available for analysis may include sending the endpoint data to at least one threat analysis agent (e.g., the one or more threat analysis agents 130 of FIG. 1); inserting the endpoint data into a feed between a data collection agent (e.g., the one or more data collection agents 105 of FIG. 1) and a threat analysis agent (e.g., the one or more threat analysis agents 130 of FIG. 1); and/or storing the endpoint data to a location accessible to the threat analysis agent.

Continuing with the example method 650 of FIG. 6B, at step 655, one or more computing device may determine whether data of the exclusion data type has been received from a provider. This determination may be performed based on a process that classifies received data as the CTI data type. This classification may be performed the same as, or similar to, the classification discussed in connection with FIG. 1. The data that is being classified may be received via a provider feed (e.g., in real-time or based on an API call). If data of the exclusion data type is received (e.g., via exclusion feed Y of FIG. 1), the method 650 may proceed to step 665. If data of the exclusion data type is not received, the method 650 may proceed to wait for data of the exclusion data type to be received by repeating step 655. For simplicity, the remaining steps of FIG. 6B will refer to the data of the exclusion data type as "exclusion data".

At step 665, the one or more computing devices may store the exclusion data for storage in a raw data archive (e.g., the raw data and metadata archive 114 of FIG. 1).

At step 670, the one or more computing devices may determine, from the exclusion data, one or more exclusions for an endpoint. This determination may include extracting portions from the exclusion data, mapping the portions from a format and/or notation of the exclusion data (e.g., a first format and/or first notation) and into a common format and/or common notation (e.g., a second format and/or second notation). The common format and/or common notation may be the same as, or similar to, the common format and/or common notation used by the endpoint data of step 620 of FIG. 6A. Once determined, the one or more exclusions may include attribute-value pairs similar to those discussed above in connection with Table II and/or the endpoint data determined based on exclusion data, as discussed in connection with FIG. 1. Indeed, in some variations, the one or more endpoints may be included in an object of endpoint discussed in connection with FIG. 1. The attributes of the one or more exclusions may have values based on the portions extracted from the exclusion data and/or values associated with how the exclusion data was received. This determination may be performed based on any of the example variations of a data collection agent as discussed in connection with FIG. 2.

At step 680, the one or more computing devices may store the one or more exclusions in one or more data repositories (e.g., endpoint data archive 115 of FIG. 1 and/or exclusion data repository 124 of FIG. 1).

At step 685, the one or more computing devices may determine exclusion-based metadata based on the one or more exclusions. This exclusion-based metadata may be the same as, or similar to, the exclusion-based metadata discussed in connection with FIG. 1.

At step 690, the one or more computing devices may store the exclusion-based metadata. The exclusion-based metadata may be stored in a raw data archive (e.g., the raw data and metadata archive 114 of FIG. 1).

At step 695, the one or more computing devices may notify that the one or more exclusions are available for analysis. Notifying that the one or more exclusions are available for analysis may include sending the one or more exclusions to at least one threat analysis agent (e.g., the one or more threat analysis agents 130 of FIG. 1); inserting the one or more exclusions into a feed between a data collection agent (e.g., the one or more data collection agents 105 of FIG. 1) and a threat analysis agent (e.g., the one or more threat analysis agents 130 of FIG. 1); and/or storing the endpoint data to a location accessible to the threat analysis agent.

Continuing with the example method 700 of FIG. 7, the example method 700 is discussed in terms of processing endpoint data. This endpoint data may be the same as, or similar to, the endpoint data of FIG. 6A. The same method, or a similar method, could be used to process the one or more exclusions of FIG. 6B. Further, as discussed in connection with FIG. 6B, the one or more endpoints may be included in an object of endpoint data (e.g., as discussed in connection with FIG. 1). In such variations the example method 700 may be viewed as processing either the endpoint data of FIG. 6A and/or the object of endpoint data of FIG. 6B, which includes the one or more exclusions.

At step 705, one or more computing devices may receive endpoint data. This endpoint data may indicate one or more IOCs for an endpoint.

After receiving the endpoint data, the one or more computing devices may determine whether a change for the endpoint has occurred and/or whether a duplicate for the endpoint has been received. The remaining steps 720-770 of the example method 700 show examples how the one or more computing devices make these determinations and what actions may be performed as a response.

At step 720, the one or more computing devices may determine whether a stored event exists for the endpoint data. This determination may include identifying the endpoint indicated by the endpoint data, and searching an event data repository (e.g., event data repository 121 of FIG. 1) to determine if a stored event exists that indicates the endpoint. In some variations, this determination may be performed based on the example variations discussed in connection with FIG. 3D. If the stored event exists, the example method 700 may proceed to step 725. If the stored event does not exist, the example method 700 may proceed to step 750 (e.g., to indicate a change for the endpoint has occurred).

At step 725, the one or more computing devices may determine a threat status by comparing at least the stored event and the endpoint data. This determination may be performed the same as, or similar to, the determination of a threat status, as discussed in connection with FIG. 1. In some variations, the threat status may indicate changed, unchanged, duplicate. The comparing at least the stored event and the endpoint may be performed the same as, or similar to the comparison of the endpoint data 108 to additional context stored in the event store repository 121, as discussed in connection with FIG. 1, where at least the stored event is, or includes, the additional context.

At step 730, the one or more computing devices may determine whether the threat status indicates changed. If the threat status indicates changed, the method may proceed to step 750. If the threat status does not indicate changed, the method may proceed to step 735.

At step 735, the one or more computing devices may determine whether the threat status indicates duplicate. If the threat status indicates duplicate, the method 700 may proceed to step 765. If the threat status does not indicate duplicate, the method may proceed to step 745.

At step 740, the one or more computing devices may determine whether the threat status indicates unchanged. If the threat status indicates unchanged, the method 700 may proceed to step 770. If the threat status does not indicate unchanged, the method 700 may proceed to step 745.

At step 745, the one or more computing devices may store an indication of threat status. Storing the indication of threat status may allow for further review of the threat status. The indication of threat status may be stored in an event data repository or some other data repository.

At step 750, the one or more computing devices may indicate a change for an endpoint has occurred by determining event data and threat differential data. This determination may be performed the same, or similar to, the determination of event data and threat differential data, as discussed in connection with FIG. 1. In this way, for example, the event data and the threat differential data may be in the common format and/or common notation and may include attribute-value pairs as discussed in connection with Tables II and III. Further, this determination may be performed based on one or more variation discussed in connection with FIGS. 3A-3C.

At step 755, the one or more computing devices may store the event data. The event data may be stored in an event data repository (e.g., the event data repository 121 of FIG. 1).

At step 760, the one or more computing devices may notify that the threat differential data is available. Notifying that the threat differential data is available may include sending the threat differential data to at least one disposition feed agent (e.g., the one or more disposition feed agents 150 of FIG. 1); inserting the threat differential data into a feed between a threat analysis agent (e.g., the one or more threat analysis agents 130 of FIG. 1) and any disposition feed agent (e.g., the one or more disposition feed agents 150 of FIG. 1); and/or storing the threat differential data to a location accessible to any disposition feed agent.

At step 765, the one or more computing devices may determine and store event data that indicates a duplicate for an endpoint has been received. Event data that indicates a duplicate for an endpoint has been received may be the same, or similar to, such event data discussed above in connection with FIG. 1. The event data may be in the common format and/or common notation and may include attribute-value pairs, as discussed in connection with Tables II and III. The event data may be stored in an event data repository (e.g., the event data repository 121 of FIG. 1). Additionally, this determination may be performed based on one or more variation discussed in connection with FIGS. 3A-3C.

At step 770, the one or more computing devices may determine and store event data that indicates no change for an endpoint occurred. Event data that indicates no change for an endpoint occurred may be the same, or similar to, such event data discussed above in connection with FIG. 1. The event data may be in the common format and/or common notation and may include attribute-value pairs, as discussed in connection with Tables II and III. The event data may be stored in an event data repository (e.g., the event data repository 121 of FIG. 1). Additionally, this determination may be performed based on one or more variation discussed in connection with FIGS. 3A-3C.

After steps 760, 765, and 770, the method 700 may end. The method 700 may be repeated each time notification is received that endpoint data is available (e.g., based on step 645 of FIG. 6A).

Continuing with the example method 800 of FIG. 8, at step 805, one or more computing devices may configure themselves to monitor for threat changes based on one or more threat analysis data repositories and/or monitoring criteria. A threat change may be any change to the one or more threat analysis data repositories (e.g., the one or more threat analysis data repositories 120 of FIG. 1). The monitoring criteria can be the same as, or similar to, the monitoring criteria discussed above in connection with FIG. 1 and the one or more threat monitoring agents 140.

At step 810, the one or more computing devices may monitor for threat changes. For example, the one or more computing devices may monitor for any change to the one or more threat analysis data repositories. This may be the same as, or similar to, the monitoring performed by the one or more threat monitoring agents 140 of FIG. 1. Additionally, this determination may be performed based on one or more variation discussed in connection with FIG. 4 (e.g., example threat monitoring agent 405).

At step 815, the one or more computing devices may determine whether monitoring criteria has been satisfied. This determination may be based on any threat changes that were monitored. This may be the same as, or similar to, the manner in which the one or more threat monitoring agents 140 of FIG. 1 determine whether monitoring criteria is satisfied. Additionally, this determination may be performed based on one or more variation discussed in connection with FIG. 4 (e.g., example threat monitoring agent 405, 420, 430). If the monitoring criteria is satisfied, the method 800 may proceed to step 820. If the monitoring criteria is not satisfied, the method 800 may proceed to step 810 to continue monitoring for threat changes.

At step 820, the one or more computing devices may determine threat differential data. The threat differential data may be the same as, or similar to, the threat differential data 145 of FIG. 1. In this way, the threat differential data may be in the common format and/or common notation and may include attribute-value pairs, as discussed in connection with Tables II and III.

At step 830, the one or more computing device may notify that the threat differential data is available. Notifying that the threat differential data is available may include sending the threat differential data to at least one disposition feed agent (e.g., the one or more disposition feed agents 150 of FIG. 1); inserting the threat differential data into a feed between a threat monitoring agent (e.g., the one or more threat monitoring agents 140 of FIG. 1) and any disposition feed agent (e.g., the one or more disposition feed agents 150 of FIG. 1); and/or storing the threat differential data to a location accessible to any disposition feed agent.

Continuing with the example method 900 of FIG. 9, the example method 900 provides further examples as to how dispositions may be determined based on an endpoint-by-endpoint basis. At step 905, one or more computing devices may configure themselves to construct a disposition feed based on feed criteria. The disposition feed may be the same as, or similar to, the disposition feeds 154 of FIG. 1. The feed criteria may be the same as, or similar to, any feed criteria discussed in connection with FIG. 1.

At step 910, the one or more computing devices may receive threat differential data. The threat differential data may be received, for example, from a threat analysis agent (e.g., based on step 760 of FIG. 7) or a threat monitoring agent (e.g., based on step 830 of FIG. 8).

At step 915, the one or more computing devices may determine whether the feed criteria is satisfied. This determination may be performed the same as, or similar to, a determination, by the one or more disposition feed agents of FIG. 1, as to whether feed criteria is satisfied, as discussed in connection with FIG. 1. Additionally, this determination may be performed based one or more variations discussed in connection with FIG. 5A. If the feed criteria is satisfied, the method 900 may proceed to step 920. If the feed criteria is not satisfied, the method 900 may proceed to step 910 and wait to receive further threat differential data.

At step 920, the one or more computing devices may construct the disposition feed. Construction may be the same, or similar to, the construction of disposition feeds 154 of FIG. 1. Indeed, the disposition feed may be constructed as a DNS feed, an ACT feed, an RPZ feed, or a composite feed. Moreover, if the feed criteria is based on a time-based exclusion, the disposition feed may be a temporary feed for the time-based exclusion.

In some arrangements, constructing the disposition feed may be based on customer preferences associated with a customer that will receive the disposition feed. In this way, a disposition feed may be specifically constructed for a customer based on their customer preferences. For example, customer preferences may indicate certain exclusions to enforce or ignore, and this may result in a disposition feed that, based on the customer preferences, enforces or ignores those exclusions. Due to the dynamic nature of cyber threats and the differing needs of customers, a disposition feed can be constructed based on a wide variety of customer preferences.

At step 925, the one or more computing devices may notify that the disposition feed is available. This may include sending a name of the disposition feed, or some other identifier of the disposition feed, over a feed notification (e.g., feed notification 152) so that devices will be informed that the disposition feed is available.

At step 930, the one or more computing devices may determine a disposition based on the threat differential data. This determination may be performed the same as, or similar to, a determination of a disposition performed by the one or more disposition feeds 150 of FIG. 1. The disposition may be the same as, or similar to, any disposition discussed in connection with FIG. 1. In this way, the disposition may indicate a level of threat for an endpoint indicated by the threat differential data. As some examples, the disposition may indicate to monitor network traffic associated with the endpoint, block network traffic associated with the endpoint, and the like. This determination of the disposition may be on an endpoint-by-endpoint basis (e.g., as opposed to a Provider feed-by-Provider feed basis and/or a CTI provider-by-CTI provider basis). In this way, a disposition may be for a single endpoint indicated by the threat differential data.

At step 935, the one or more computing devices may send, via the disposition feed, the disposition. Sending the disposition via the disposition feed may include inserting, or otherwise including, the disposition in the disposition feed. The sending may depend on the type of the disposition, as some feeds may send dispositions in real-time and others may send dispositions via an API. The disposition may be sent the same, or similar to, the ways in which disposition feeds 154 of FIG. 1 send dispositions. Because the disposition may be determined on an endpoint-by-endpoint basis, the disposition feeds 154, over time, may send, or otherwise include, a separate disposition for each endpoint indicated by various objects of threat differential data.

At step 940, the one or more computing devices may receive additional threat differential data. The additional threat differential data may be received, for example, from a threat analysis agent (e.g., based on step 760 of FIG. 7) or a threat monitoring agent (e.g., based on step 830 of FIG. 8).

At step 945, the one or more computing devices may determine whether the feed criteria is satisfied. This determination may be performed the same as, or similar to, a determination, by the one or more disposition feed agents of FIG. 1, as to whether feed criteria is satisfied, as discussed in connection with FIG. 1. Additionally, this determination may be performed based one or more variation discussed in connection with FIG. 5A. If the feed criteria is satisfied, the method 900 may proceed to step 930 to determine a disposition based on the additional threat differential data. If the feed criteria is not satisfied, the method 900 may proceed to step 950.

At step 950, the one or more computing devices may determine whether to deconstruct the disposition feed. Deconstructing the disposition feed may be based on the feed criteria or some other criteria used as a basis for deconstructing a disposition feed (e.g., type of the disposition feed). For example, if the feed criteria is based on a time-based exclusion, the one or more computing devices may determine to deconstruct the disposition feed based on a time-based condition of the time-based exclusion. As one particular example, if the time-based condition indicates a threshold window of time for the time-based exclusion, the one or more computing devices may determine whether the threshold window of time has expired. If the threshold window of time has expired, the one or more computing devices may determine to deconstruct the disposition feed. If the one or more computing devices determine to deconstruct the disposition feed, the method may proceed to step 955. If the one or more computing devices determine to not deconstruct the disposition feed, the method 900 may proceed to step 940 to wait for further threat differential data.

At step 955, the one or more computing devices may deconstruct the disposition feed. Deconstructing the disposition feed may depend on the type of feed (e.g., how the deconstruction is performed may depend on whether the disposition feed is a DNS feed, an ACT feed, an RPZ feed, or a composite feed). Moreover, if the feed criteria is based on a time-based exclusion, the disposition feed may be a temporary feed for the time-based exclusion. In such variations, deconstructing the disposition may cause the time-based exclusion to be enforced again (e.g., network traffic associated with the endpoint may be blocked).

At step 960, the one or more computing devices may notify that the disposition feed is unavailable or otherwise deconstructed. This may include sending, over a feed notification (e.g., feed notification 152), a name of the disposition feed, or some other identifier of the disposition feed, and an indication of the deconstruction so that devices will be informed that the disposition feed is unavailable or otherwise deconstructed.

Having discussed the example computing environments 100 of FIG. 1, the examples of machine learning models and/or the rules/policies of the various agents 105, 130, 140, 150 of FIG. 1, as well as the examples of methods that may be performed by the various agents 105, 130, 140, 150 of FIG. 1, examples as to how the various agents may determine various dispositions that, once received, cause a device to filter network traffic will now be discussed. FIGS. 10A-10F depict example flows where dispositions are determined and devices are caused to filter network traffic based on the dispositions. For these example flows, the common format and/or common notation will refer to the common format and/or common notation discussed throughout the computing environment 100 of FIG. 1, including Tables II and III. Additionally, for simplicity, the example flows should be understood as operating within the computing environment 100 of FIG. 1, or some similar computing environment. As such, the providers 1094, agents 1095-1098, and computing device 1099 may respectively be the same as, or similar to, the providers 101-1 to 101-X, agents 105, 130, 140, 150, and computing device 170 of FIG. 1. The example flows of FIGS. 10A-10F are only some examples of the ways in which dispositions can be determined and/or how devices can be caused to filter network traffic based on dispositions.

Figure 10A:
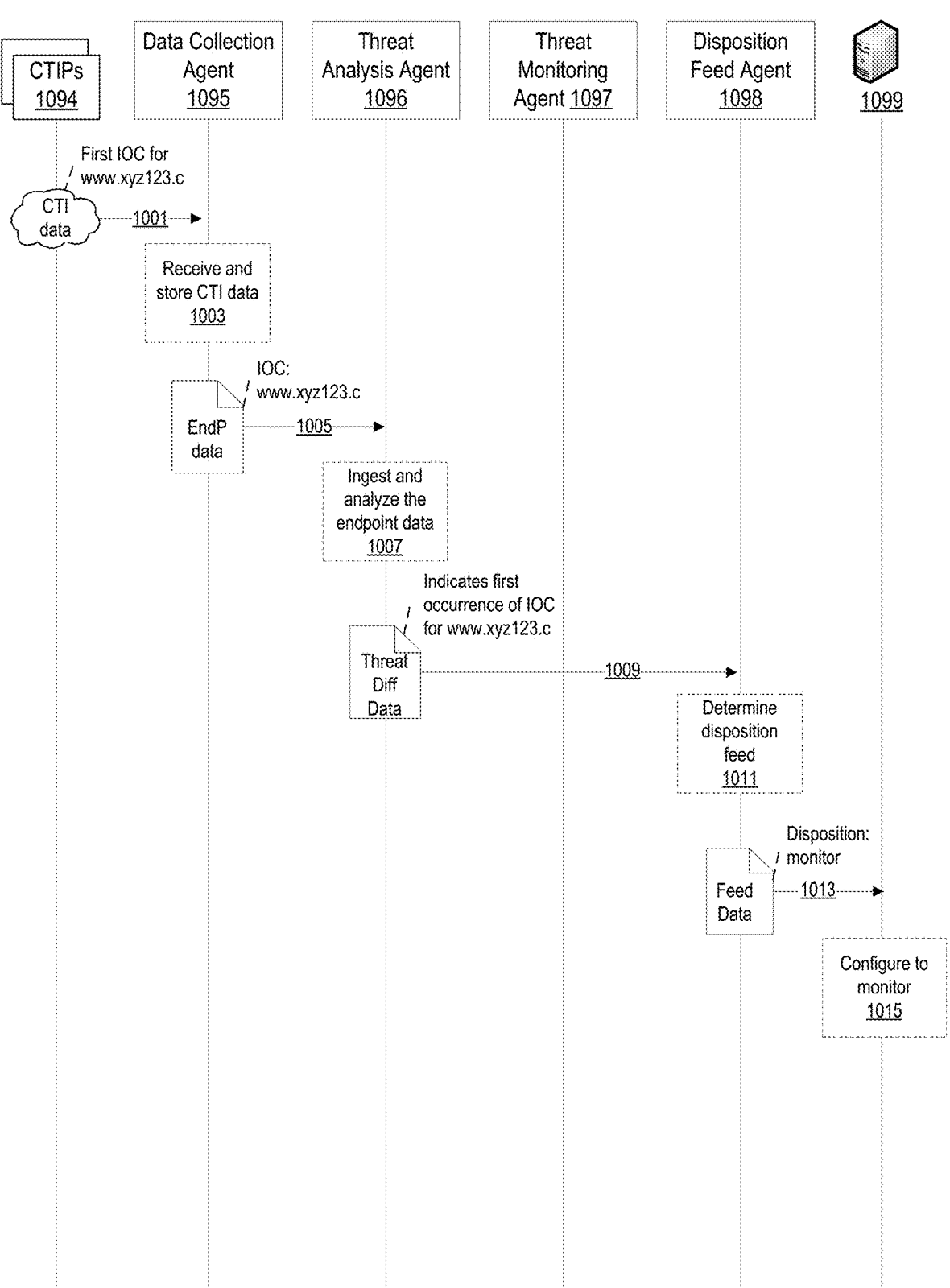
FIGS. 10A-10E depict example flows for determining example dispositions according to various aspects described herein.

Beginning with the example flow of FIG. 10A, at item 1004, the one or more providers 1094 may send CTI data (e.g., CTI data 103) that indicates a first IOC for the endpoint, www.xyz123.c. Based on the sending of the CTI data, the data collection agent 1095 may, at item 1003, classify, receive, and store the CTI data (e.g., as part of the one or more processes for receiving, storing, and/or processing CTI data as discussed in connection with FIG. 1).

Based on the CTI data, the data collection agent 1095 may determine endpoint data (e.g., based on performing a method similar to the example method 600 of FIG. 6A). At item 1005, the data collection agent 1095 may send the endpoint data to the threat analysis agent 1096. At item 1007, the threat analysis agent 1096 may ingest and analyze the endpoint data (e.g., as part of the one or more processes for ingesting and analyzing endpoint data, as discussed in connection with FIG. 1).

Based on the endpoint data and based on determining that a change for the endpoint, www.xyz123.c, has occurred, the threat analysis agent 1096 may determine threat differential data (e.g., based on performing a method similar to the example method 700 of FIG. 7). This threat differential data may indicate that the IOC is the first occurrence for the endpoint, www.xyz123.c. At item 1009, the threat analysis agent 1096 may send the threat differential data to a disposition feed agent 1098. At item 1011, the disposition feed agent 1098 may determine a disposition feed. This may result in the disposition feed agent 1098 determining feed data (e.g., based on performing a method similar to the example method 900 of FIG. 9). The feed data may indicate a disposition to monitor the endpoint, www.xyz123.c. The disposition may indicate to monitor because insufficient IOCs have been received and/or because confidence in the received IOC is below a threshold for blocking.

At item 1013, the disposition feed agent 1098 may send the feed data, via a disposition feed, to the computing device 1099. Based on the disposition to monitor the endpoint, www.xyz123.c, the computing device 1099 may, at item 1035, configure itself to monitor network traffic associated with the endpoint, www.xyz123.c.

Figure 10B:
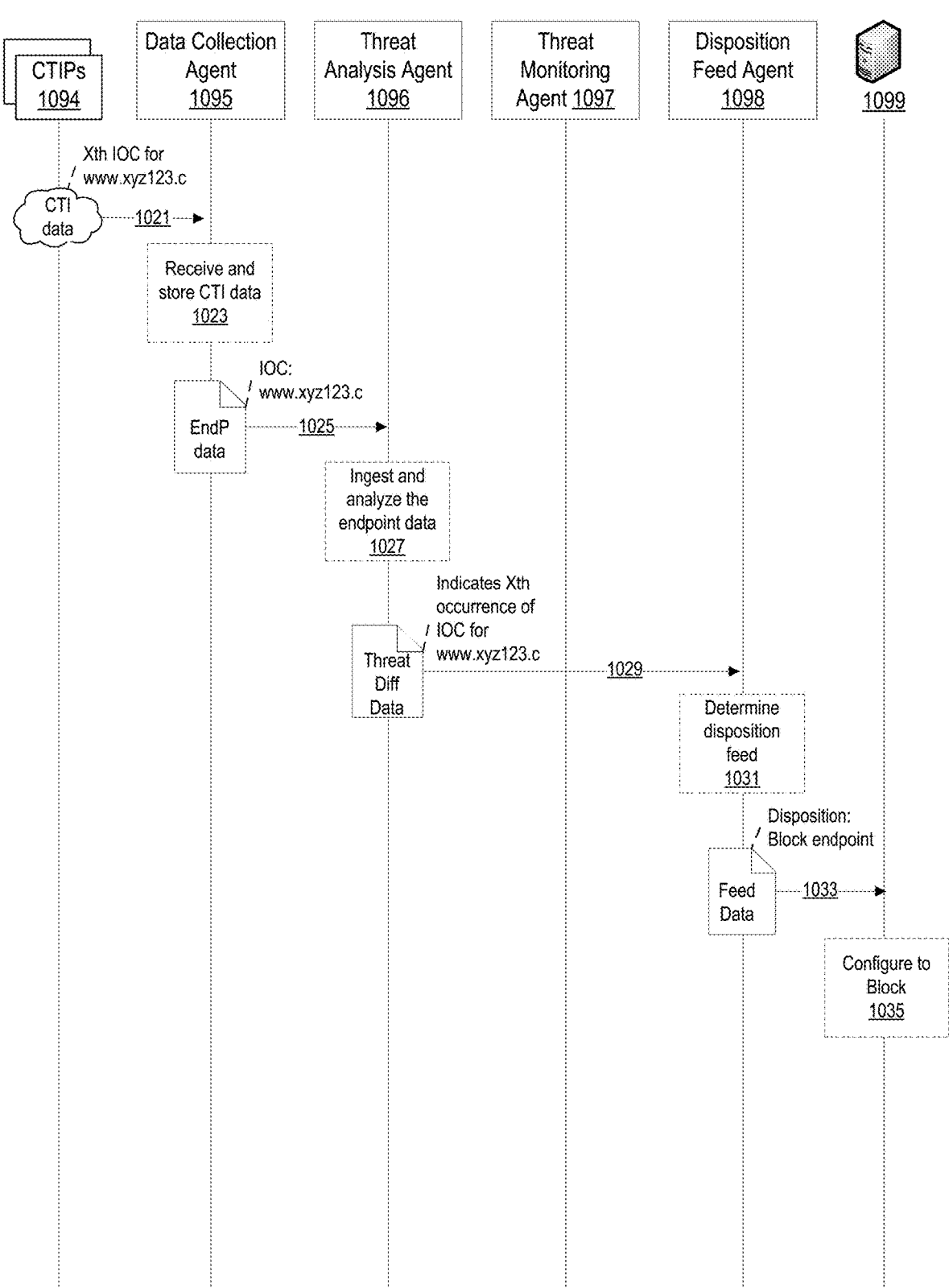

As will be seen in view of a comparison of the example flows of FIGS. 10A and 10B, a disposition for an endpoint can change from monitor to block based on additional IOCs for the endpoint.

Continuing with the example flow of FIG. 10B, at item 1021, the one or more providers 1094 may send CTI data that indicates a Xth IOC for the endpoint, www.xyz123.c. Based on the sending of the CTI data, the data collection agent 1095 may, at item 1023, classify, receive, and store the CTI data (e.g., as part of the one or more processes for receiving, storing, and/or processing CTI data as discussed in connection with FIG. 1).

Based on the CTI data, the data collection agent 1095 may determine endpoint data (e.g., based on performing a method similar to the example method 600 of FIG. 6A). At item 1025, the data collection agent 1095 may send the endpoint data to the threat analysis agent 1096. At item 1027, the threat analysis agent 1096 may ingest and analyze the endpoint data (e.g., as part of the one or more processes for ingesting and analyzing endpoint data, as discussed in connection with FIG. 1).

Based on the endpoint data and based on determining that a change for the endpoint, www.xyz123.c, has occurred, the threat analysis agent 1096 may determine threat differential data (based on performing a method similar to the example method 700 of FIG. 7). This threat differential data may indicate that the IOC is the Xth occurrence for the endpoint, www.xyz123.c. At item 1029, the threat analysis agent 1096 may send the threat differential data to a disposition feed agent 1098. At item 1031, the disposition feed agent 1098 may determine a disposition feed. This may result in the disposition feed agent 1098 determining feed data (e.g., based on performing a method similar to the example method 900 of FIG. 9). The feed data may indicate a disposition to block the endpoint, www.xyz123.c. The disposition may indicate to block because sufficient IOCs have been received and/or because confidence in the received IOC is above a threshold for blocking.

At item 1033, the disposition feed agent 1098 may send the feed data, via a disposition feed, to the computing device 1099. Based on the disposition to block the endpoint, www.xyz123.c, the computing device 1099 may, at item 1035, configure itself to block network traffic associated with the endpoint, www.xyz123.c.

Figure 10C:
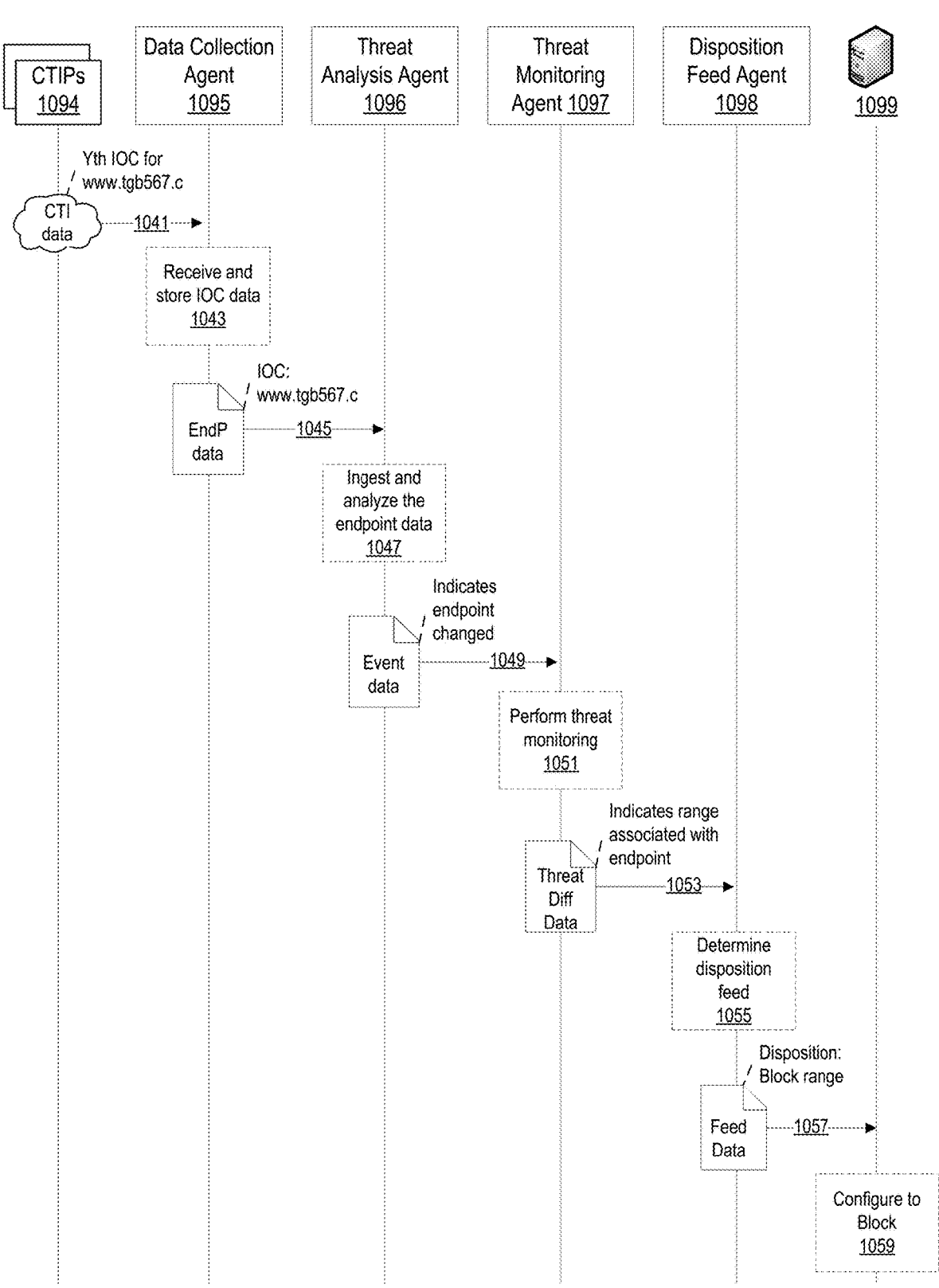

Continuing with the example flow of FIG. 10C, at item 1041, the one or more providers 1094 may send CTI data that indicates a Yth IOC for the endpoint, www.tgb567.c. Based on the sending of the CTI data, the data collection agent 1095 may, at item 1043, classify, receive, and store the CTI data (e.g., as part of the one or more processes for receiving, storing, and/or processing CTI data as discussed in connection with FIG. 1).

Based on the CTI data, the data collection agent 1095 may determine endpoint data (e.g., based on performing a method similar to the example method 600 of FIG. 6A). At item 1045, the data collection agent 1095 may send the endpoint data to the threat analysis agent 1096. At item 1047, the threat analysis agent 1096 may ingest and analyze the endpoint data (e.g., as part of the one or more processes for ingesting and analyzing endpoint data, as discussed in connection with FIG. 1).

Based on the endpoint data and based on determining that a change for the endpoint, www.xyz123.c, has occurred, the threat analysis agent 1096 may determine event data (based on performing a method similar to the example method 700 of FIG. 7). This event data may indicate that an IOC for the endpoint, www.tgb567.c, has changed (e.g., a new IOC may be added, a prior IOC may be modified, etc.). At item 1049, the threat analysis agent 1096 may store the event data (e.g., in the event data repository 121 of FIG. 1). At item 1051, based on the storing and the ongoing performance of threat monitoring by the threat monitoring agent 1097, the threat monitoring agent 1097 may notice the change and receive the event data.

Based on the event data, the threat monitoring agent 1097 may determine that monitoring criteria is satisfied and may determine threat differential data (e.g., by performing a method similar to the example method 800 of FIG. 8). The threat differential data may indicate a range of CIDR addresses associated with the endpoint, www.tgb567.c. At item 1053, the threat monitoring agent 1097 may send the threat differential data to a disposition feed agent 1098.

Based on the threat differential data, the disposition feed agent 1098 may, at item 1055, determine a disposition feed. This may result in the disposition feed agent 1098 determining feed data (e.g., based on performing a method similar to the example method 900 of FIG. 9). The feed data may indicate a disposition to block the range of CIDR addresses associated with the endpoint, www.tgb567.c. The disposition may indicate to block because sufficient IOCs have been received for the endpoint and/or because confidence in the received IOCs is above a threshold for blocking.

At item 1057, the disposition feed agent 1098 may send the feed data, via a disposition feed, to the computing device 1099. Based on the disposition to block the range of CIDR addresses associated with the endpoint, www.tgb567.c, the computing device 1099 may, at item 1059, configure itself to block network traffic associated with the range of CIDR addresses associated with the endpoint, www.tgb567.c.

Figure 10D:
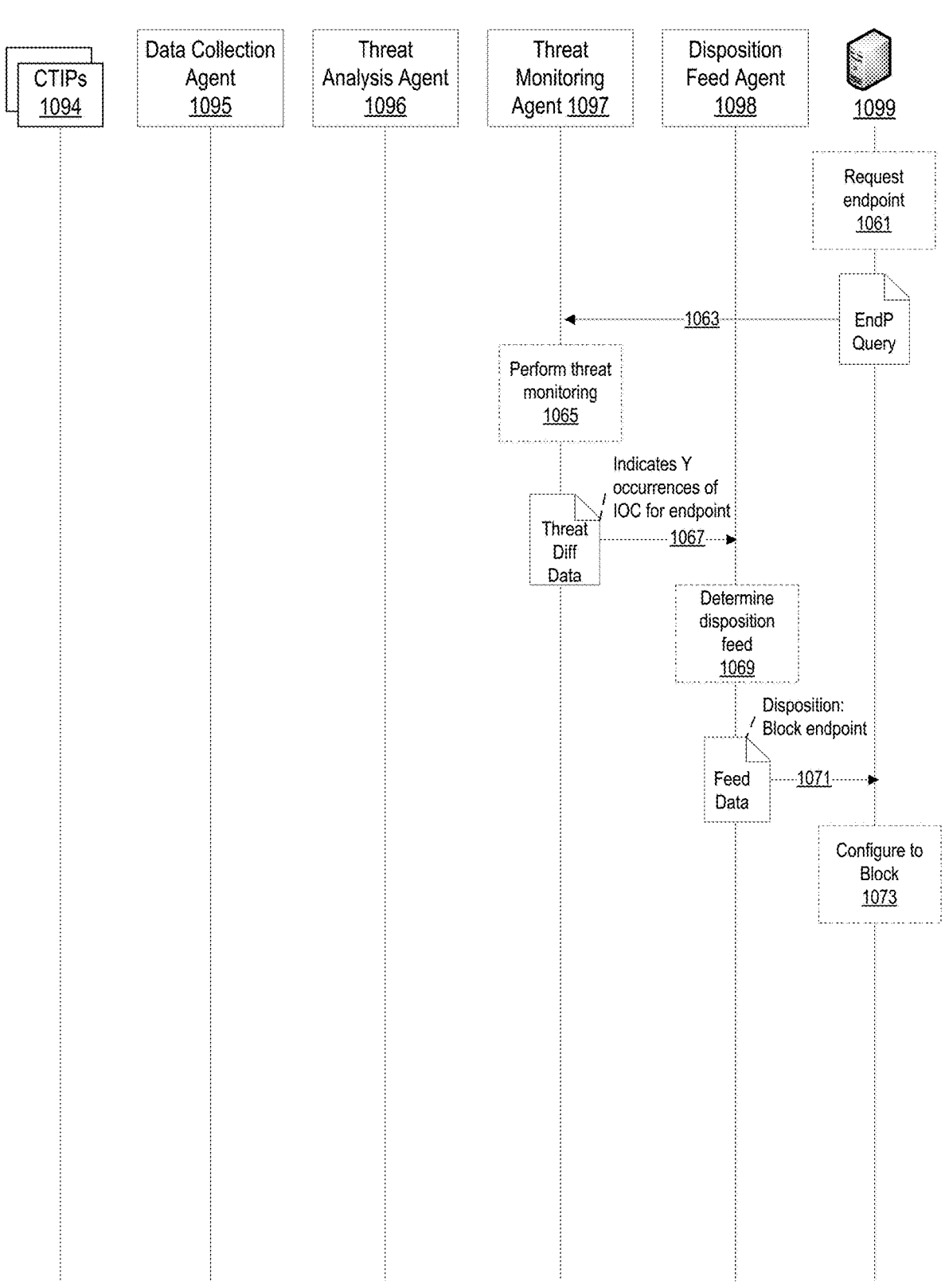

Continuing with the example flow of FIG. 10D, at item 1061, the computing device 1099 may receive a request for an endpoint (e.g., based on browser request to get a webpage associated with the endpoint). Based on this request, the computing device 1099 may determine an endpoint query (e.g., a DNS query identifying the endpoint). At item 1063, the computing device 1099 may send the endpoint query. The endpoint query may be sent based on an API call to a threat analysis agent 1096. This API call and/or the endpoint query, when received, may cause the threat analysis agent 1096 to respond to the endpoint query similar to if the endpoint query was receiving endpoint data that identifies the requested endpoint. The example of FIG. 10D provides one example response that may occur based on an endpoint query. As depicted in FIG. 10D, at item 1065, the threat analysis agent 1096 may ingest and analyze the endpoint query and, as a result, determine threat differential data that indicates Y occurrences of IOCs for the endpoint indicated by the endpoint query (e.g., based on performing a process similar to step 750 of FIG. 7). At item 1067, the threat monitoring agent 1097 may send the threat differential data to a disposition feed agent 1098.

Based on the threat differential data, the disposition feed agent 1098 may, at item 1069, determine a disposition feed. This may result in the disposition feed agent 1098 determining feed data (e.g., based on performing a method similar to the example method 900 of FIG. 9). The feed data may indicate a disposition to block the endpoint indicated by the endpoint query. The disposition may indicate to block because sufficient IOCs have been received for the endpoint and/or because confidence in the received IOCs is above a threshold for blocking.

At item 1071, the disposition feed agent 1098 may send the feed data, via a disposition feed, to the computing device 1099. Based on the disposition to block the endpoint, the computing device 1099 may, at item 1073, configure itself to block network traffic associated with the endpoint.

Figure 10E:
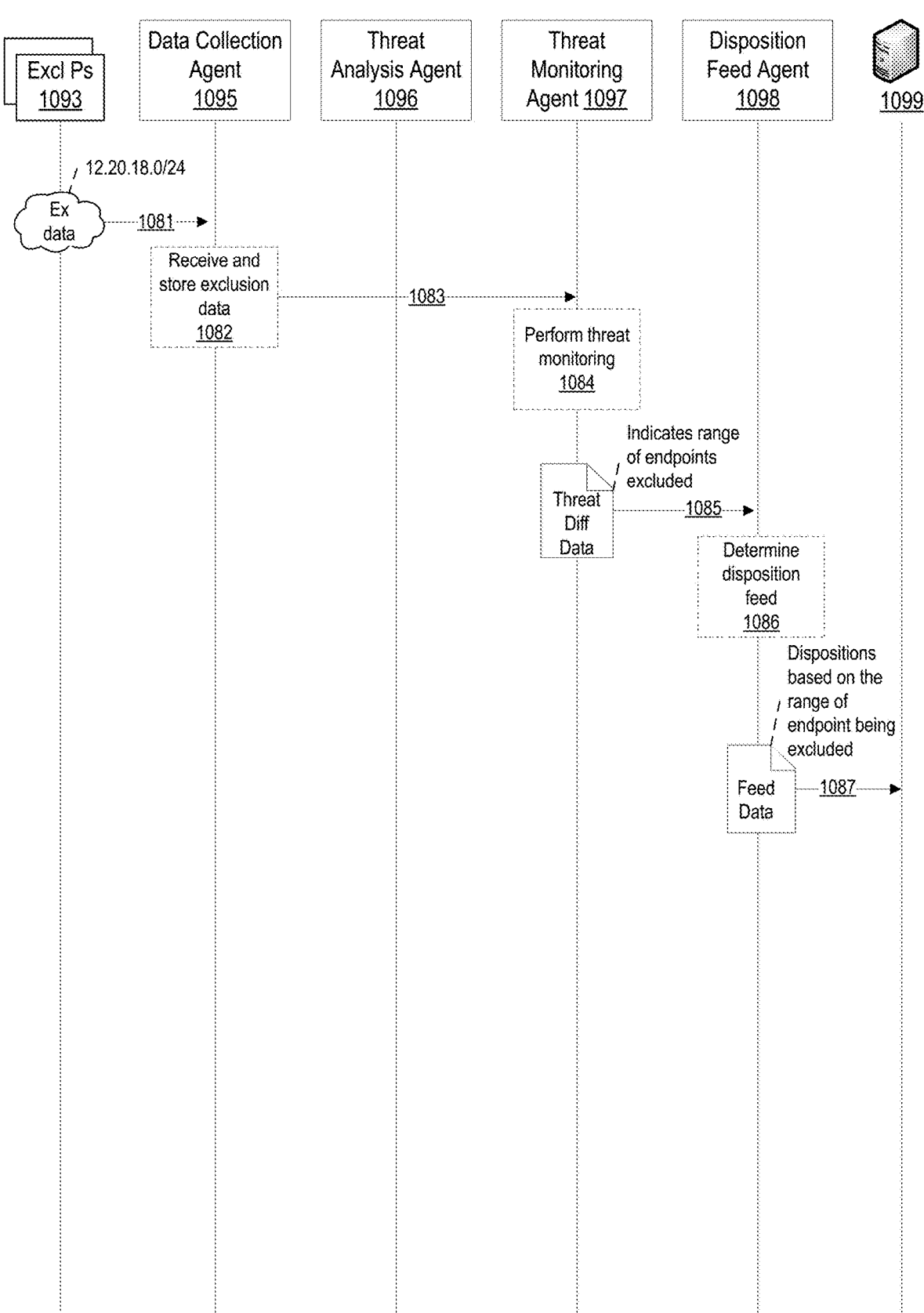

Continuing with the example flow of FIG. 10E, at item 1074, the one or more providers 1094 may send exclusion data that indicates an exclusion for one or more endpoints (e.g., 12.20.18.0/24, as depicted in FIG. 10E). Based on the sending of the exclusion data, the data collection agent 1095 may, at item 1075, classify, receive, and store the exclusion data (e.g., as part of the one or more processes for receiving, storing, and/or processing exclusion data as discussed in connection with FIG. 1).

Based on the exclusion data, the data collection agent 1095 may determine endpoint data (e.g., based on performing a method similar to the example method 600 of FIG. 6A) that indicates the one or more endpoints as an exclusion. This endpoint data may be sent, at item 1076, to one or more threat analysis agents 1096.

Based on the endpoint data indicating the one or more endpoints as an exclusion, the threat analysis agent 1096 may, at item 1077, ingest and analyze the endpoint data (e.g., by performing a method similar to the example method 700 of FIG. 7). Ingesting and analyzing the endpoint data may include querying one or more repositories (e.g., data repositories 110 of FIG. 1) for any events and/or information matching, or otherwise associated with, an endpoint indicated by the endpoint data. In this way, if the endpoint data indicates more than one endpoint as an exclusion, the threat analysis agent 1096 may query for each endpoint (e.g., query for each endpoint in the range indicated by 12.20.18.0/24). Based on results of any queries, the threat analysis agent 1096 may, for each endpoint of the one or more endpoints indicated by the exclusion data, determine threat differential data. Accordingly, as depicted in FIG. 10E, the threat analysis agent 1096 is shown as determining a plurality of threat differential data, one for each endpoint in the range indicated by 12.20.18.0/24. At item 1078, the threat analysis agent 1096 may send the plurality of threat differential data to at least disposition feed agent 1098.

Based on the plurality of threat differential data sent at 1078, the disposition feed agent 1098 may, at item 1079, determine a disposition feed. This may result in the disposition feed agent 1098 determining feed data (e.g., based on performing a method similar to the example method 900 of FIG. 9). The feed data may indicate dispositions based on the endpoints indicated by the plurality of threat differential data. In this way, the dispositions may not include a disposition to monitor or block any endpoint within the range of endpoints being excluded. At item 1080, the disposition feed agent 1098 may send the feed data, via a disposition feed, to the computing device 1099. In this way, the disposition feed may be enforcing the exclusion of the range of endpoints provided by the exclusion data.

Continuing with the example flow of FIG. 10F, a threat analysis agent 1096 is depicted as having determining threat differential data that indicates the first occurrence of an IOC for and endpoint, www.xyz123.c (based on performing a method similar to the example method 700 of FIG. 7). This threat differential data may have been determined based on the threat analysis agent 1096 having also determined that a change for the endpoint, www.xyz123.c, has occurred (e.g., similar to the process discussed above in connection with items 1001-1009 of FIG. 10A). The threat analysis agent 1096 may, at item 1081, send the threat differential data to a feed disposition agent 1098. At item 1082, the disposition feed agent 1098 may determine a disposition feed. This determination of a disposition feed may result in the disposition feed agent 1098 determining feed data (e.g., based on performing a method similar to the example method 900 of FIG. 9). The feed data may indicate a disposition to monitor the endpoint, www.xyz123.c. The disposition may indicate to monitor because insufficient IOCs have been received and/or because confidence in the received IOC is below a threshold for blocking. As also depicted in FIG. 10F, this determination of a disposition feed may result in the disposition feed agent 1098 determining request data (e.g., as discussed in connection with the one or more disposition agents 150 and the one or more threat monitoring agents 140 of FIG. 1). This request data may indicate the disposition feed agent is requesting more threat context on the endpoint, www.xyz123.c. The request data may be determined based on the disposition to monitor the endpoint (e.g., request data may be determined based on the disposition to monitor the endpoint being first sent via the disposition feed at item 1083) and/or based on a confidence in the received IOC being above a threshold for requesting additional threat context.

At item 1085, the disposition feed agent 1098 may send the request data such that it is eventually received by the threat monitoring agent 1097. For example, the request data may be sent by the disposition feed agent 1098 for storage into one of the data repositories being monitored by the threat monitoring agent 1097 (e.g., one of the data repositories 110 of FIG. 1, such as event data 121). The threat monitoring agent 1097 may, based on its processes for threat monitoring, receive the request data after being stored in the data repository. As another example, the threat monitoring agent 1097 and the disposition feed agent 1098 may be configured to communicate with each other. In this way, the disposition feed agent 1098 may send the request data directly to the threat monitoring agent 1097.

Based on the request data, the threat monitoring agent 1097 may, as part of performing its processes for threat monitoring at item 1086, determine that monitoring criteria is satisfied based on the request data and may determine threat differential data based on the request data (e.g., by performing a method similar to the example method 800 of FIG. 8). The threat differential data may indicate additional threat context associated with the endpoint (e.g., IOCs that have been newly received; additional intelligence data gathered for, or associated with, the endpoint, www.xyz123.c; a time stamp indicating when the last IOC for the endpoint was received; an indication of a time out value for raising the disposition from monitoring to block or for lowering the disposition from monitoring). At item 1087, the threat monitoring agent 1097 may send the threat differential data to the disposition feed agent 1098. In this way, the threat monitoring agent 1097 may be causing the disposition feed agent 1098 to redetermine the disposition for the endpoint based on the requested additional threat context.

Accordingly, based on the threat differential data that indicates the additional threat context, the disposition feed agent 1098 may, at item 1088, determine a disposition feed. This may result in the disposition feed agent 1098 determining feed data (e.g., based on performing a method similar to the example method 900 of FIG. 9). The feed data may indicate a disposition to block the endpoint, www.xyz123.c. The disposition may indicate to block because the additional threat context, as compared to the previous determination at item 1082, provided sufficient threat context to block the endpoint and/or increased confidence above the threshold to block.

As part of the determination of the disposition feed at item 1088, the disposition feed agent 1098 may or may not re-request further threat context on the endpoint. For example, if the additional threat context allows the disposition to change (e.g., from monitoring to block), the disposition feed agent 1098 may not re-request further threat context. As another example, if the additional threat context indicates there has been a change associated with the endpoint since the previous determination of the disposition feed at item 1082 (e.g., some new event occurred associated with the endpoint), the disposition feed agent 1098 may re-request further threat context by determining further request data for the endpoint. As yet another example, if the additional threat context indicates there has been no change associated with the endpoint since the previous determination of the disposition feed at item 1082 (e.g., no new events occurred associated with the endpoint), the disposition feed agent 1098 may not re-request further threat context.

At item 1089, the disposition feed agent 1098 may send the feed data, via the disposition feed, to the computing device 1099. Based on the disposition to block the endpoint, the computing device 1099 may, at item 1090, configure itself to block network traffic associated with the endpoint, www.xyz123.c.

Having discussed examples as to how the various agents may determine various dispositions that cause a device to filter network traffic, an example as to how a time-based exclusion may be implemented will now be discussed. FIGS. 11A-11B depict example flows where a time-based exclusion is implemented. For these example flows, the common format and/or common notation will refer to the common format and/or common notation discussed throughout the computing environment 100 of FIG. 1, including Tables II and III. Additionally, for simplicity, the example flows should be understood as operating within the computing environment 100 of FIG. 1, or some similar computing environment. As such, the exclusion providers 1193, CTI providers 1194, and agents 1195-1198 may respectively be the same as, or similar to, the exclusion providers 104-1 to 104-Y, CTI providers 101-1 to 101-X, and agents 105, 130, 140, 150 of FIG. 1. The example flows of FIGS. 11A-11B are only some examples of the ways in which a time-based exclusion may be implemented.

Beginning with the example flow of FIG. 11A, at item 1101, the one or more exclusion providers 1193 may send exclusion data that indicates a time-based exclusion for an endpoint, www.typ345.c. The time-based exclusion may also indicate a threshold window of time during which the dispositions for the endpoint, www.typ345.c, may be sent via a temporary disposition feed. Based on the sending of the exclusion data, the data collection agent 1195 may, at item 1103, receive and store the exclusion data (e.g., as part of the one or more processes for receiving, storing, and/or processing exclusion data as discussed in connection with FIG. 1).

Based on the exclusion data, the data collection agent 1095 may determine endpoint data (e.g., based on performing a method similar to the example method 600 of FIG. 6A) that indicates the endpoint, www.typ345.c, as a time-based exclusion. The endpoint data may also indicate the threshold window of time for the time-based exclusion. This endpoint data may eventually cause event data that indicates the endpoint as a time-based exclusion to be stored in an event data repository. This process is represented by item 1105. Based on the storing of the event data, at item 1107, the threat monitoring agent 1197 may perform threat monitoring and notice the change caused by storing the event data.

Based on the event data indicating the endpoint, www.typ345.c, as a time-based exclusion, the threat monitoring agent 1197 may determine that monitoring criteria is satisfied and may determine threat differential data (e.g., by performing a method similar to the example method 800 of FIG. 8). The threat differential data may indicate the endpoint, www.typ345.c, as a time-based exclusion. At item 1109, the threat monitoring agent 1197 may send the threat differential data to each disposition feed agent 1198 currently operating in the computing environment.

Based on the threat differential data, at least one of the disposition feed agents 1198 currently operating in the computing environment may, at item 1111, determine a disposition feed. This may result in the at least one disposition feed agent changing what dispositions are sent, or otherwise included, in its disposition feed. Indeed, as depicted in the example flow of FIG. 11A, the at least one disposition feed agent may, based on the time-based exclusion, prevent its disposition feed from including dispositions for the endpoint, www.typ345.c. In this way, the at least one disposition feed agent may be enforcing the time-based exclusion based on receiving the threat differential data.

Moreover, based on the time-based exclusion another disposition feed agent of those currently operating in the computing environment may, at 1113, determine, based on the threat differential data, new feed criteria based on the threat differential data. This new feed criteria may be for a temporary feed that will include dispositions during the threshold window of time for the time-based exclusion. Based on the new feed criteria, a new disposition feed agent may be configured to operate in the computing environment. In particular, the new disposition feed agent may be configured to, based on any received threat differential data, determine whether the new feed criteria is satisfied. The determinations of the new feed criteria and the configuration of the new disposition feed may be performed based one or more variation discussed in connection with FIG. 5B.

The example of the time-based exclusion continues in the example flow of FIG. 11B. At some time after the exclusion data that indicates the time-based exclusion is received by the data collection agent 1195, the one or more CTI providers 1194, at item 1141, may send CTI data that indicates a Yth IOC for the endpoint, www.typ345.c. Based on the sending of the CTI data, the data collection agent 1195 may, at item 1143, receive and store the CTI data (e.g., as part of the one or more processes for receiving, storing, and/or processing CTI data as discussed in connection with FIG. 1).

Based on the CTI data, the data collection agent 1195 may determine endpoint data (e.g., based on performing a method similar to the example method 600 of FIG. 6A). At item 1145, the data collection agent 1195 may send the endpoint data to the threat analysis agent 1196. At item 1147, the threat analysis agent 1196 may ingest and analyze the endpoint data (e.g., as part of the one or more processes for ingesting and analyzing endpoint data, as discussed in connection with FIG. 1).

Based on the endpoint data and based on determining that a change for the endpoint, www.typ345.c, has occurred, the threat analysis agent 1196 may determine threat differential data (e.g., based on performing a method similar to the example method 700 of FIG. 7). This threat differential data may indicate that the IOC is Yth occurrence for the endpoint, www.typ345.c. At item 1149, the threat analysis agent 1196 may send the threat differential data to each disposition feed agent 1198 currently operating in the computing environment.

Based on the threat differential data, at least one of the disposition feed agents 1198 currently operating in the computing environment may, at item 1155, determine a disposition feed. In particular, this disposition feed agent may be the new disposition feed agent configured for the new feed criteria of item 1113. This new disposition feed agent may determine whether the IOC indicated by the threat differential data is within the threshold window of time for the time-based exclusion and, based on that determination, may or may not include a disposition for the endpoint, www.typ345.c, in its temporary disposition feed.

Indeed, as depicted in the example flow of FIG. 11B, the new disposition feed agent may, based on the threshold time window and the threat differential data, include a disposition for the endpoint, www.typ345.c, in its temporary feed. In this way, the new disposition feed agent may be temporarily allowing dispositions to be sent based on the time-based exclusion. While the temporary feed is constructed, the disposition feed agent for the disposition feed may continue to prevent the disposition feed from including dispositions for the endpoint. Indeed, while the temporary feed is constructed, the temporary feed may be the only disposition feed able to include dispositions for the endpoint. In other words, while the temporary feed is constructed, all other dispositions feeds, except for the temporary feed, may be prevented from including dispositions for the endpoint. After the temporary feed is deconstructed (e.g., based on expiration of a threshold window of time), all disposition feeds may be prevented from including dispositions for the endpoint (e.g., until criteria for the threshold window of time are satisfied and, thus, causing the temporary feed to be constructed again).

In some instances, the temporary feed may include dispositions for a plurality of endpoints that are subject to time-based exclusions. The temporary feed may remain constructed while there remains at least one time-based exclusion that is not expired. Moreover, the time-based exclusions may have different expiration periods (e.g., the threshold window of time for two time-based exclusions may be different from each other). In this way, the temporary feed, over time, may include dispositions for different sets of endpoints (e.g., at time t1, the temporary feed may include dispositions for a set of endpoints denoted by the set {endpoint A, endpoint B, endpoint C}, but at time t2, the temporary feed may include dispositions for a second set of endpoints denoted by the {endpoint B, endpoint C} because the time-based exclusion for endpoint A has expired).

Referring now to FIGS. 12-14, addressing cyber threats based on the potential impact of blocking potentially legitimate network traffic is described. Network traffic may be potentially legitimate network traffic where, for example, one or more IOCs indicated in received CTI data are false positives. Taking into account the impact of blocking potentially legitimate network traffic represents a new way of thinking about cyber threats beyond the severity of a potential threat and a confidence in the cyber threat intelligence received. As described in further detail below, this new approach to addressing cyber threats introduces the concept of shieldability. Determining whether traffic is shieldable looks to evaluate the adverse effects on an entity's operations (e.g., business operations) arising from blocking network traffic that is not known to be malicious and in not known to be non-malicious but nevertheless might constitute legitimate network traffic for the customer. Such traffic may be determined to be shieldable, even if legitimate, when blocking that traffic would not be detrimental to an entity's operations. This concept of shieldability thus recognizes the relationship between exposure and risk. Allowing more traffic into an entity's network exposes that entity to more risk, and reducing the traffic allowed into the entity's network shrinks the entity's overall risk profile. Identifying what traffic may be blocked without detriment to an entity's operations may allow an entity to shrink its overall risk profile without the need for high-confidence cyber threat intelligence in all circumstances.

For many entities, network traffic may be categorized in three ways. A first (often larger) portion of an entity's network traffic may be identified as legitimate (e.g., non-malicious) network traffic. A second (often smaller) portion of the entity's network traffic may be identified as illegitimate (e.g., malicious) network traffic. A third (also often smaller) portion of the entity's traffic may not be able to be identified (with a preferred level of certainty) as either legitimate network traffic or illegitimate network traffic. As one hypothetical example, 98% of an entity's network traffic may be known or otherwise determined to be legitimate, 1% of the entity's network may be known or otherwise determined to be illegitimate, and the remaining 1% of the entity's network traffic may not be conclusively determined to be legitimate or illegitimate. The endpoints associated with such traffic similarly may be categorized as known malicious endpoints (e.g., known to be associated with illegitimate network traffic) or known non-malicious endpoints (e.g., known to be associated with legitimate network traffic). For case of reference, endpoints that are not known to be malicious endpoints and that are not known to be non-malicious endpoints may be referred to as ambiguous endpoints (or additionally or alternatively as inconclusive endpoints, uncertain endpoints, questionable endpoints, indeterminate endpoints, and the like). Legitimate network traffic sometimes may be referred to as "whitelist" traffic due to its associated endpoints being known non-malicious endpoints and thus added to an entity's "whitelist" (allowlist) of allowed network traffic. Similarly, illegitimate network traffic may be referred to as "blacklist" traffic due to its associated endpoints being known malicious endpoints and thus added to an entity's "blacklist" (blocklist) of blocked network traffic. The remaining traffic may be referred to as "graylist" or "gray zone" traffic due to its associated endpoints falling into the "gray zone" between the known non-malicious endpoints of "whitelist" traffic and the known malicious endpoints of "blacklist" traffic.

CTI data may be used as described herein to identify some endpoints as either known non-malicious endpoints or known non-malicious endpoints and determine an appropriate disposition for such endpoints as described herein (e.g., allow or allow/monitor traffic from known non-malicious endpoints, block traffic from known malicious endpoints). For "graylist" traffic, however, the CTI data received may be insufficient to render a definitive conclusion regarding the malicious or non-malicious nature of its associated endpoints falling into that "gray area" of ambiguous maliciousness. For example, the received CTI data may include no information about an endpoint associated with "graylist" traffic, the CTI data received for that endpoint may be low-confidence CTI data that does not rise to the level of actionable intelligence due to not satisfying some confidence threshold, and/or the CTI data may not include a threshold quantity of IOCs for the endpoint. An entity, therefore, may apply a default rule (e.g., a default block rule, or a default allow rule) to "graylist" traffic associated with ambiguous endpoints. A default allow rule may align with a philosophy of free communication across the Internet but may enlarge an entity's risk profile as noted above. A default block rule, on the other hand, may shrink an entity's risk profile at the expense of potential disruption to that entity's operations. Taking into account the shieldability of "graylist" traffic allows an entity to consider the potential impact of blocking such traffic on that entity's operations.

As described in further detail below, an impact status may be determined based on a potential impact of blocking legitimate network traffic between an ambiguous endpoint an entity's network. The impact status may be used to determine an alternative disposition for the ambiguous endpoint different than the default disposition that applies. The impact status may be considered in conjunction with the threat status to determine the alternative disposition. For example, a composite status based on both the impact status and the threat status may be determined for an ambiguous endpoint. For case of reference, the composite status may be referred to as a composite shieldability status or simply a shieldability status. The threat status for the endpoint may be determined by the threat analysis agents and/or threat monitoring agents as described herein. The threat status may also be based on the received CTI data including no information about the ambiguous endpoint or may be based on low-confidence CTI data received for the ambiguous endpoint. For example, the threat status may be indicative of the confidence of the CTI data received for an endpoint and/or the confidence of one or more IOCs indicated in the received CTI data. The confidence of an IOC may depend, for example, on a quantity of CTI providers identifying the same IOC, one or more confidences respectively assigned to the IOC by one or more CTI providers, and the like. For example, CTI data/IOCs may be relatively low confidence CTI data/IOCs if received from relatively few CTI providers (e.g., one or less than a threshold quantity). The concept of shieldability, therefore, can also promote or elevate low-confidence CTI data to actionable intelligence. Further, an entity's network may be or include one or more physical networks and/or one or more logical networks.

As also described in further detail below, machine-learning models may be used to assist in evaluating the potential impact of blocking legitimate network traffic associated with an ambiguous endpoint. An impact status may depend, and thus be determined, based on an entity's historical network traffic activities (e.g., network traffic patterns). Machine learning models may be trained to assist in processing entities' respective historical network traffic data. Once trained, the machine learning models may be used as part of a process that determines an impact status for an ambiguous endpoint. An impact status may be based on an evaluation of an entity's own historical network traffic activities and the entity's resources (e.g., human resources, organizational resources, computing resources) associated with such network traffic. The historical network activities and/or resources of one or more other entities also may be evaluated when determining an impact status for an ambiguous endpoint.

FIG. 12 depicts a block diagram of an example computing environment 1200 that may be configured to provide an impact status based on a potential impact of blocking legitimate network traffic between an entity's network and one or more ambiguous endpoints. Although not shown in FIG. 12, the computing environment 1200 may include one or more components of the computing environment 100 depicted in FIG. 1 that may be configured to detect cyber threats based on threat context and/or threat changes. For example, the computing environment 1200 may include, as depicted in FIG. 1, data repositories (e.g., data repositories 110) and various agents (e.g., agents 104, 130, 140, 150) that, together, detect cyber threats based on threat context and/or threat changes. As a brief overview, the computing environment 1200 is depicted as including data repositories 1205 and various agents 1210, 1215 that, together, determine an alternative disposition for an ambiguous endpoint based on a potential impact of blocking legitimate network traffic to and/or from that endpoint. The data repositories 1205 may be implemented on one or more storage devices and include impact analysis data repositories 1220. The data repositories 1205 may also include, as depicted in FIG. 1, provider feed repositories (e.g., provider feed repositories 112) and/or threat analysis data repositories (e.g., threat analysis data repositories 120). The various agents 1210, 1215 may be located locally or remotely from each other. Further, some or all of the data repositories 1205 and the various agents 1210, 1215 may be implemented using a cloud computing service (e.g., the data repositories 1205 may be implemented using a cloud computing service, and the various agents 1210, 1215 may be implemented on one or more computing devices that communicate with the cloud computing service via one or more networks). The computing environment 1200 may include additional components not depicted in FIG. 12 including, for example, additional data repositories, additional computing devices, and/or additional networks.

In connection with the determination of an alternative disposition for an ambiguous endpoint, the example computing environment 1200 depicts the impact analysis data repositories 1220 as including particular types of data repositories such as a network traffic data repository 1225 and a resource data repository 1230. The network traffic data repository 1225 may store historical network traffic data 1235 (e.g., network traffic logs) for one or more entities. The historical network traffic data 1235 may include network traffic information such as, for example, an endpoint identifier, a source IP address, a destination IP address, a source port, a destination port, a protocol, and/or other information characterizing or otherwise associated with network traffic between one or more networks and one or more endpoints. The historical network traffic data 1235 may include network traffic information for both inbound and outbound traffic at an entity's network. The resource data repository 1230 may store resource data 1240 that provides information about a resource associated with network traffic. A resource may include computing resources as well as other types of resources associated with an entity. Computing resources may include devices configured for communication via a network such as desktop computers, laptop computers, mobile computing devices (e.g., cellular telephones, tablet computers), rack-mounted computing devices (e.g., servers), internet-of-things (IoT) devices, monitoring devices (e.g., sensors, cameras), appliances (e.g., refrigerators, HVAC devices), and the like. Computing resources may also include executables such as software applications, computer programs, services, and the like. Other types of resources associated with an entity may include non-computing resources such as individuals associated with the entity (e.g., network users), user groups, departments (e.g., divisions) of the entity, offices of the entity (e.g., geographic offices of the entity), and the like. A resource may also be a network address (e.g., an IP address of a computing device connected to the network). The resource data 1240 may also include an indication of important (e.g., a priority) associated with a resource. As described further below, impact analysis agents 1210 use the network traffic data 1235 and the resource data 1240 to determine an impact status for an endpoint and provide impact data 1245 with the determined impact status to the disposition feed agents 1215, which use the received impact data 1245 to determine an alternative disposition for an ambiguous endpoint that would otherwise receive a default disposition.

Also in connection with the determination of alternative disposition for an ambiguous endpoint, the example computing environment 1200 depicts the various agents 1210, 1215 as performing various processes that may send and/or receive data to/for the data repositories 1210, receiving particular input data, and providing particular output data. Indeed, one or more impact analysis agents 1210 are depicted as receiving the network traffic data 1235, the resource data 1240, and endpoint data 1270; performing one or more processes for ingesting and analyzing the network traffic data, the resource data, and the endpoint data; and outputting impact data 1245. One or more disposition feed agents 1215 are depicted as receiving impact data (e.g., impact data 1245 from the one or more impact analysis agents 1210) and threat data (e.g., threat data 1275) received from the threat analysis agents (e.g., threat analysis agents 130); performing one or more processes for determining disposition feeds; and outputting feed notification 1250 and disposition feeds 1255 (e.g., disposition feed 1 to disposition feed Z), any of which may be received by the computing device 1260 via the network 1265. The depicted agents 1210, 1215 processes, input data, and output data are provided as examples that may be used when determining an impact status and an alternative disposition for an ambiguous endpoint. Some variations may include different, additional, or fewer agents; different, additional, or fewer processes; different, additional, or fewer types of input data; and different, additional, or fewer types of output data than those shown in the example computing environment of FIG. 12.

Also in connection with the determination of an alternative disposition for an ambiguous endpoint, the example computing environment 1200 depicts the various agents 1210, 1215 as including machine-learning models and/or rules/policies. For example and as depicted in FIG. 12, the one or more impact analysis agents 1210 may include one or more machine-learning models 1210-1 and rules/policies 1210-2. The one or more disposition feed agents 1215 may include machine-learning model 1215-1 and rules/policies 1215-2. The depicted machine-learning models and rules/policies are provided as examples that may be used by the various agents 1210, 1215 in connection with the determination of an impact status and/or an alternative disposition for an ambiguous endpoint. Some variations may include different, additional, or fewer machine-learning models and/or rules/policies than those shown in FIG. 12.

A more detailed discussion of the example computing environment 1200 and how it determines an alternative disposition for an ambiguous endpoint can begin with the impact analysis agents 1210 that receive endpoint data 1270. The endpoint data 1270 may include information about an ambiguous endpoint (e.g., an endpoint identifier). The impact analysis agents 1210 may receive the endpoint data 1270 from a threat analysis agent (e.g., threat analysis agent 130). A threat analysis agent may be configured to provide the endpoint data 1270 to the impact analysis agents 1210 based on, for example, determining that an endpoint is an ambiguous endpoint and/or determining that a default rule applies to an endpoint. A threat analysis agent may provide the endpoint data 1270 to the impact analysis agents 1210 in response to (as a result of) such determinations (e.g., immediately, in real-time), at regular or irregular intervals, and/or upon request/demand. The endpoint data 1270 may include information for only a single ambiguous endpoint or multiple ambiguous endpoints (e.g., for batch determination of respective impact statuses). The endpoint data 1270 may be provided by one or more threat analysis agents as described herein including the threat analysis agents 130, 1096, 1196 described in connection with FIG. 1, FIG. 10, and FIG. 11. The endpoint data 1270 may indicate any threat context determined for an endpoint (e.g., by the threat analysis agents 130, 1096, 1196) and/or include any threat data available or otherwise determined for the endpoint (e.g., by the threat analysis agents 130, 1096, 1196). The threat data may include, for example, any additional contextual information retrieved by the threat analysis agents (e.g., by expanding the degrees of separation between as described herein). The threat analyses described herein (e.g., by the threat analysis agents 130, 1096, 1196), therefore, may be employed as part of the process for determining the shieldability of network traffic.

In connection with determining an impact status for an ambiguous endpoint, different analyses may be performed. As noted above, shieldability seeks to evaluate whether blocking potentially legitimate traffic to and/or from an ambiguous endpoint would detrimentally affect an entity's operations (e.g., business operations). Whether blocking potentially legitimate traffic to and/or from an ambiguous endpoint would detrimentally affect any particular entity's network, therefore, may depend on the nature of an entity's network traffic (e.g., volume, frequency) for that ambiguous endpoint and/or the resources associated with that network traffic. Impact status, and thus shieldability, may depend on different criteria or different combinations of criteria for determining whether blocking potentially legitimate traffic would detrimentally impact an entity's network traffic, its resources, and its overall operations. Criteria for determining an impact status thus may include the volume of traffic to and/or from an ambiguous endpoint (e.g., quantity of network communications, size of data transfer, quantity and/or size over an identified time period, etc.), the frequency of network traffic to and/or from an ambiguous endpoint, and/or a quantity of potentially impacted resources associated with network traffic to/from an ambiguous endpoint. As noted above, resources may include both computing resources and non-computing resources (e.g., users, user groups, etc.). The impact analysis agents 1210, therefore, may determine an impact status based on, for example, a comparison between a traffic volume threshold and an historic volume of traffic to/from an ambiguous endpoint and whether the historic volume of traffic satisfies the traffic volume threshold; a comparison between a traffic frequency threshold and an historic frequency of traffic to/from an ambiguous endpoint and whether the historic volume of traffic satisfies the traffic frequency threshold; and/or a comparison between a resource threshold and a quantity of resources associated with network traffic to/from an ambiguous endpoint and whether the quantity of resources satisfies the resource threshold. Depending on the implementation the traffic volume, traffic frequency, and quantity of impacted resources may satisfy their respective thresholds when they meet and exceed the threshold or meet and fall below the threshold. Other criteria for determining an impact status may include the type of resource (e.g., the type of user associate with the network traffic, the type of computing device associated with the network traffic). The impact analysis agents 1210, therefore, may determine the type of user associated with network traffic to/from an ambiguous endpoint and determine an impact status based on the determined type of user; and/or determine the type of computing resource associated with network traffic to/from an ambiguous endpoint and determine an impact status based on the determined type of computing resource. The type of user may be based on a title, a job function, a set of permissions, inclusion in a user group, assignment to a department, assignment to an office, and the like. Criteria for determining an impact status may include the time of day associated with network traffic between an entity's network and an ambiguous endpoint. The impact analysis agents 1210, therefore, may determine an impact status based on the time of day an entity's network sent network traffic to an ambiguous endpoint and/or received network traffic from an ambiguous endpoint. Criteria for determining an impact status may include an importance (e.g., priority) of a potentially impacted resource. The impact analysis agents 1210, therefore, may determine an impact status based on a comparison between an importance threshold and an importance of a resource associated with network traffic to/from an ambiguous endpoint and whether the importance satisfies the importance threshold. An importance of a potentially impacted resource may be indicated using numerical values (e.g., 1-10) and/or textual values (e.g., "high" or "medium" or "low"). An importance threshold may thus be implemented as a numerical threshold (e.g., greater than (or equal to) 5, less than (or equal to) 5) or as a textual threshold (e.g., at (or above) "medium" or at (or below) "high").

An impact status may be implemented in different ways. For example, an impact status may indicate (e.g., include) an impact score. An impact score may be a numerical value or a textual value as described herein. An impact status may also include an indication of whether an impact score satisfies an impact score threshold. The impact analysis agents 1210, therefore, may determine an impact score (e.g., based on the criteria described herein), compare the impact score to an impact score threshold, and include in the impact status an indication of whether the impact score satisfies the impact score threshold. As another example, the impact status may only indicate the impact score, and the disposition feed agents 1215 may compare the impact score to an impact score threshold to determine whether the impact score satisfies the impact score threshold. The impact score threshold likewise may be implemented as a numerical threshold or as a textual threshold as described herein. An impact score threshold may also be a configurable setting or parameter for individual entities. For example, entities that are relatively more risk averse may configure the impact score threshold to be relatively lower, which may result in an alternative disposition that blocks relatively more potentially legitimate network traffic to/from ambiguous endpoints, while entities that are relatively more risk tolerant may configure the impact score to be relatively higher, which may result in an alternative disposition that blocks relatively less potentially legitimate network traffic to/from ambiguous endpoints. In this way, determining an impact status and corresponding alternative disposition can be customized and/or tailored for a particular entity (e.g., according to its preferences, risk tolerance, etc.). More generally, an alternative disposition may be determined specifically for a specific entity or may be a global alternative disposition determined for all or multiple entities.

The machine learning models (e.g., machine learning models 1210-1, 1215-1) and/or the rules/policies (e.g., rules/policies 1210-2, 1215-2) may be used to determine the impact status. Historical network traffic data (e.g., network traffic data 1235) and/or resource data (e.g., resource data 1240) may be used as training data and provided as input to one or more machine learning models 1210-1 of the impact analysis agents 1210. Once trained, the machine learning models may provide, as output, an impact status for an ambiguous endpoint. The historical network traffic data used to train the machine learning models 1210-1 may include historical network traffic data and/or resource data associated with a single entity or associated with multiple entities. In this way, the impact analysis agents 1210-1 may determine the impact of blocking potentially legitimate traffic based solely on the historical network traffic at a given entity's network and/or historical network traffic across multiple entities. In some scenarios, the historical network traffic across multiple entities may be used to determine an impact status for a given entity in the same or similar fashion as a single entity.

As an example, if the network traffic data for a given entity indicates that network traffic to/from an ambiguous endpoint is infrequent, constitutes a relatively low volume of that entity's overall network traffic, is associated with relatively few resources, is associated with a low-importance resource, and the like, then the impact analysis agents 1210 may determine an impact status indicating a relatively low impact on an entity's operations if potentially legitimate network traffic to/from that ambiguous endpoint were blocked. Such network traffic may be referred to for convenience as low-impact network traffic. To illustrate, network traffic to/from an ambiguous endpoint may include communications with the website of a new food establishment a curious employee is interested in, communications with news-focused websites, network-enabled devices beaconing out to their manufacturer's server to check for and receive updates, and the like (legitimate network traffic for that ambiguous endpoint) as well as an unrecognized host probing an entity's network (e.g., for potential weaknesses), communications with a geographic region the entity has no reason to communicate with (e.g., hostile nations), network communications that only occur outside of regular business hours, and the like (illegitimate network traffic for that ambiguous endpoint). As seen in this illustration, traffic to/from the ambiguous endpoint could be blocked without detriment to the entity's operations given the nature of the potentially legitimate network traffic while reducing the risk of exposure to the potentially illegitimate network traffic. Low-impact network traffic also may include network traffic that is relatively frequent, relatively high volume, and/or associated with relatively many resources. To illustrate, such low-impact network traffic may include communications with a sports-themed website (e.g., during playoffs, tournaments, etc.), communications with social media services, and the like.

Some network traffic to/from an ambiguous endpoint that is relatively infrequent, relatively low-volume, and/or associated with relatively few resources nevertheless may be high-impact network traffic that, if blocked, would detrimentally affect an entity's operations. The impact analysis agents 1210, therefore, may determine an impact status indicating a relatively high impact on an entity's operations if potentially legitimate network traffic to/from that ambiguous endpoint were blocked. An importance of a resource associated with network traffic to/from an ambiguous endpoint thus may be used to determine the impact status. To illustrate, such traffic may include network traffic associated with relatively high priority users (e.g., a CEO, a CTO, etc.), relatively high priority user groups (e.g., network administrators), relatively high priority computing resources (e.g., business critical machines, software applications, etc.), and other relatively high priority resources as described herein.

Some network traffic to/from an ambiguous endpoint that is relatively infrequent and/or relatively new nevertheless may be high-impact network traffic. To illustrate, such traffic may include network traffic associated with a new service (e.g., hosting service, messaging service, etc.) recently implemented at an entity (e.g., installed, deployed, subscribed). This example shows how the impact analysis agents 1210 may use historical network traffic data associated with different entities to determine an impact status for a given entity's communications with an ambiguous endpoint. Although the entity may have never (or infrequently) communicated with that ambiguous endpoint in the past, historical network traffic data from other entities that implemented the same service may indicate that network communications with the endpoint are common and frequent due to utilizing the service. The impact analysis agents 1210 thus may determine a relatively high impact status for that ambiguous endpoint.

The examples herein also illustrate that impact status may be based on whether traffic to/from an ambiguous endpoint is anomalous. Network traffic may be anomalous for a given entity, anomalous for one or more resources associated with that entity, or anomalous across entities. Network traffic may be characterized as anomalous, for example, when it deviates from a baseline network traffic pattern (e.g., as indicated by the historical network traffic data as described herein). Deviations in network traffic patterns may occur, for example, across multiple entities, for a single entity, for one or more populations (e.g., one or more users, user groups, one or more departments, one or more geographic locations, etc.), and/or for a particular computing resource (e.g., programs, applications, devices, machines, services, etc.). Anomalous network traffic may include illegitimate network traffic as well as legitimate network traffic. For example, widespread anomalous and illegitimate network traffic across multiple entities may be associated with an attack on multiple systems and/or networks from one or more malicious endpoints. Localized illegitimate and anomalous network traffic may be associated with, for example, an attack on a single system and/or network from one or more malicious endpoints. As a further example, widespread anomalous and legitimate network traffic also may be associated with a new or newly popular service (e.g., a social media service, content delivery service, etc.) that sees increased usage across multiple entities. Localized anomalous and legitimate network traffic may be associated with, for example, a new or newly utilized computing resource (e.g., a newly installed machine or device on the network; a new or newly utilized program, application, and/or service at the entity's network; a new or newly utilized website internal or external to the entity's network such as a new timekeeping website). Network traffic may be anomalous for some populations but not for other populations. For example, one user group at an entity may regularly use a particular computing resource (e.g., an accounting program, an instant messaging program) while another user group at that entity does not regularly use that computing resource (e.g., due to preferences, access restrictions, etc.). In this example, the threat context for network traffic associated with that computing resource may be minimal given only the possibility of a threat from the anomalous network traffic to and/or from the latter user group. Even so, if blocking such anomalous network traffic for that latter user group would not adversely affect that user group, then an entity may reduce its overall risk profile by accounting for the anomalous nature of such traffic when determining an impact status for such network traffic. In this way, an entity may block potential attack vectors that arise via legitimate computing resources that rely on exploits and vulnerabilities in those resources for malicious activity (i.e., using legitimate computing resources for illegitimate purposes).

The machine learning models 1210-1 at the impact analysis agents 1210 may include different types of models and perform different types of modeling. For example, the machine learning models 1210-1 may include single-entity models with each single-entity model being specific to a particular entity and/or multi-entity models that perform modeling for a collection of multiple entities. The machine learning models 1210-1 at the impact analysis agents 1210 also may include single-resource models with each single-resource model being specific to a particular resource (e.g., the resources described herein) and/or multi-resource models that perform modeling for a combination of resources (e.g., any combination of two or more resources). The machine learning models 1210-1 at the impact analysis agents 1210 also may include models that performing modeling based on a combination of network traffic data and resource data. The modeling thus may provide an indication of whether network traffic to/from an ambiguous endpoint is anomalous. In this way, determining the impact status and any corresponding alternative disposition may take into account, if desired, historical network traffic at other entities that might provide some indication of whether network traffic to/from an ambiguous endpoint is anomalous for just that entity or anomalous for multiple entities. Criteria for determining whether network traffic is anomalous may include the same or similar criteria for determining the impact status as described herein (e.g., frequency, regularity, volume, volume per unit time, etc.). The machine learning models 1210-1 and/or the machine learning models 1215-1 may include models that ingest the output of other models for further modeling.

Having determined an impact status for one or more ambiguous endpoints, the impact analysis agents 1210 may provide impact data 1235 to the disposition feed agents 1215. The impact data 1235 may include an impact status for a single ambiguous endpoint or multiple ambiguous endpoints. The impact data 1235 may include an indication of the determined impact status (e.g., an impact value, an impact score). The impact data 1235 also may include an indication of whether the determined impact status satisfies an impact threshold. The disposition feed agents 1210 may then determine a disposition for an ambiguous endpoint (e.g., using one or more of the machine learning models 1215-1 and/or rules/policies 1215-2). The disposition determined for an ambiguous endpoint may be an alternative disposition (e.g., block) that is different than a default disposition (e.g., default allow) that has been selected for or otherwise applies to the ambiguous endpoint. In some circumstances, the disposition feed agent may determine, based on the impact status, that the default disposition that applies to the ambiguous endpoint is the most suitable disposition and thus may not determine an alternative disposition for that endpoint that is different than the default disposition. Example scenarios are described in further detail below.

The disposition feed agents 1215 may also determined an alternative disposition for an ambiguous endpoint based on solely a determined impact status or based on both a determined impact status and a determined threat status. The disposition feed agents 1215 thus may receive threat data 1275 from threat analysis agents (e.g., threat analysis agents 130). As described herein, the threat data May 1275 may indicate, for example, that no CTI for the ambiguous endpoint has been received, that any CTI received for the ambiguous endpoint is low confidence CTI (e.g., due to being received from a single or relatively few providers), or that CTI received for the ambiguous endpoint includes relatively few IOCs for the endpoint (e.g., less than a threshold quantity of IOCs for the endpoint). The disposition feed agents 1215 may determine an alternative disposition, for example, by comparing the determined impact status and the determined threat status to an impact threshold and a threat threshold, respectively. As an example, the disposition feed agents 1215 may determine an alternative disposition for an ambiguous endpoint based on the impact status satisfying the impact threshold and the threat status satisfying the threat threshold. The disposition feed agents 1215 may not determine an alternative disposition for an ambiguous endpoint (and thus use the default disposition that applies to the endpoint) based on one or both of the impact status or the threat status satisfying their respective thresholds. As described herein, the impact status and/or the threat status may be implemented as numerical values (e.g., "impact: 50" and "threat: 25") and/or textual values (e.g., "impact: low" and "threat: medium").

The impact status and the threat status may be combined to obtain a composite status that indicates the shieldability of network traffic to/from an ambiguous endpoint. As noted above, the impact status may include an impact score. Similar to the impact status, a threat status may include a threat score, which may quantify or otherwise characterize a threat. The threat score may indicate, for example, one or more of a risk associated with the threat, potential damage to an entity (e.g., the entity's network, the entity's network operation, the entity's data, the entity's general operation, etc.). The composite status may be referred to, for convenience, as a composite shieldability status. As an example, an impact score of an impact status and a threat score of a threat status may be combined to obtain a composite shieldability score (or simply shieldability score). The impact score and/or the threat score may be weighted (e.g., based on a confidence of the impact score, a confidence of the threat score, or some other metric) when determining the composite shieldability score. The composite shieldability score may be a numerical value (e.g., a sum, average, weighted average, etc. of the impact score ("10") and threat score ("25"), etc.), a textual value (e.g., a concatenation ("low-medium") of the impact status ("low") and the threat status ("medium"), etc.), a combination of numerical and textual values (e.g., concatenation ("10-medium") of the impact status ("10") and the threat status ("medium"), etc.), a data structure that pairs the impact status with the threat status (e.g., a vector or array ("[10] [25]" or "[10] [medium]" or "[low] [medium]"), etc.) The disposition feed agents 1215 may determine an alternative disposition for an ambiguous endpoint based on the composite shieldability status satisfying a composite shieldability threshold (or simply shieldability threshold) and may not determine an alternative disposition for an ambiguous endpoint based on the composite shieldability status not satisfying a composite shieldability threshold. Like the impact threshold and the threat threshold, a composite shieldability status may be a configurable setting or parameter for individual entities based on their respective risk tolerance.

The disposition feed agents 1215 may provide feed data 1280 based on the alternative disposition determined for an endpoint. The feed data 1280 may be similar to the feed data 155. For example, the format of the feed data 1280 likewise may depend on the type of feed (e.g., DNS feed, ACT feed, RPZ feed, composite feed). The feed data 1280 may include an indication of one alternative disposition determined for one ambiguous endpoint or indications of multiple alternative dispositions respectively determined for multiple ambiguous endpoints. An alternative disposition may indicate to monitor the ambiguous endpoint (e.g., allow and log network traffic associated with the ambiguous endpoint), block the ambiguous endpoint (e.g., block network traffic associated with the endpoint, or allow the ambiguous endpoint (e.g., without monitoring network traffic associated with the ambiguous endpoint). The alternative disposition, once received, may cause a receiving device to filter traffic based on the level of threat. For example, if the alternative disposition indicates to monitor the ambiguous endpoint, a receiving device (e.g., device 1260) may log network traffic associated with the endpoint. This log may be sent back to the computing environment 1200 for storage, and/or to determine statistics, computations, and other data based on the log and for storage in a data detection repository (not shown) (e.g., similar to or the same as the detection data repository 123). If the disposition indicates to block the endpoint, a receiving device (e.g., device 1260) may block network traffic associated with the ambiguous endpoint. Indications of what network traffic is blocked may be sent back to the computing environment 1200 for storage, and/or to determine statistics, computations, and other data based on the log and for storage in a detection data repository.

The one or more disposition feed agents 1215 may be configured to provide the same or similar functionality as disposition feed agents 150 as described herein. For example, the one or more disposition feed agents 1215 may include any number, or combination of the above types of feeds. And the exact number, or combination, may change over time. As a way to notify devices of which feeds are currently constructed, the one or more disposition feed agents 1215 may identify the constructed feeds in feed notification 1250. The feed notification 1250 may include the names of disposition feeds currently constructed and/or an indication of what feed criteria is used for the constructed disposition feeds. In this way, receiving devices (e.g., device 1260) may determine which disposition feeds they want to receive and begin receiving the desire disposition feeds.

The machine learning models 1210-1 and 1215-1 and/or the rules/policies 1210-2 and 1215-2 of the impact analysis agents 1210 and the disposition feed agents 1215, respectively, may be similar to the machine learning models (e.g., machine learning models 130-1 and 150-1) and the rules/policies (e.g., rules/policies 130-2 and 150-2) as described herein with reference to FIGS. 1, 2, 3A-3D, 4, and 5A-D. For example, machine learning models 1210-1 and 1215-1 may include a machine-learning model that may be a neural network of various configuration (e.g., feed forward neural network, multilayer perceptron neural network, radial basis function neural network, recurrent neural network, modular neural network). These machine learning models may be trained using a supervised training process that uses human labeled training data. These examples should be understood as being variations that can operate within the example computing environment 1200 of FIG. 12, or a similar computing environment, in any combination. Additionally, and again for simplicity, the rules/policies depicted in these examples are discussed as receiving output, performing determinations, and/or performing analyses. This phrasing is used to simplify that an agent or a computing device configured with the rules/policies would apply the rules/policies based on received input and to perform the determinations and/or analyses. In other words, this phrasing is used as a simplified representation that the rules/policies are being used in connection with an agent or a computing device receiving input, performing determinations, and/or performing analyses.

As described herein, the impact analysis agents 1210 may use the machine learning models 1210-1 to determine an impact status for an ambiguous endpoint based on the data (e.g., network traffic data 1235, resource data 1240) from the impact analysis data repository 1220. For example, the machine learning models 1210-1 of the impact analysis agent 1210 may be trained using a corpus of data that includes historical network traffic data (e.g., network traffic data 1235) and/or resource data (e.g., resource data 1240). In this way, the trained machine learning models 1210-1 may be configured to receive, as input, network traffic data that is associated with network traffic between an entity's network and an ambiguous endpoint. The trained machine learning models 1210-1 also may be configured to receive, as input, resource data associated with the entity. The trained machine learning models 1210-1 further may be configured to provide, as output, an impact status based on the received network traffic data and, if provided, based on the received resource data. The machine learning models 1210-1 may determine the impact status based on a confidence value indicative of whether blocking potentially legitimate network traffic between the entity's network and the ambiguous endpoint would adversely affect the entity's operations (e.g., business operations). The corpus of network traffic data and/or resource data may include human labeled combinations of network traffic data and/or resource data where the labels indicate whether the entity's operations would be adversely affected if network traffic to and/or from an ambiguous endpoint were blocked. As also described herein, the impact analysis agents 1210 may use the rules/policies 1210-2 to determine an impact status for an ambiguous endpoint (or facilitate determination of an impact status) based on the data (e.g., network traffic data 1235, resource data 1240) from the impact analysis data repository 1220. In this way, the rules/policies 1210-2 may be authored to determine an impact status and/or provide additional data that is used to determine an impact status.

As also described herein, the disposition feed agents 1215 may use the machine learning models 1215-1 to determine an alternative disposition for an ambiguous endpoint based on the impact data (e.g., impact data 1245) from the impact analysis agents 1210. The disposition feed agents 1215 also may use threat data (e.g., threat data 1275) to determine an alternative disposition for an ambiguous endpoint. For example, the machine learning models 1215-1 of the disposition feed agents 1215 may be trained using a corpus of data that includes impact data and/or threat data. In this way, the trained machine learning models 1215-1 may be configured to receive, as input, impact data for one or more ambiguous endpoints. The trained machine learning models 1215-1 also may be configured to receive, as input, threat data for the one or more ambiguous endpoints. The trained machine learning models 1215-1 further may be configured to provide, as output, an alternative disposition for each of the one or more ambiguous endpoints based on the received impact data and, if provided, based on the received threat data. The machine learning models 1215-1 may determine the alternative disposition based on a confidence value associated with the impact status. The corpus of impact data and/or threat data may include human labeled combinations of impact data and/or threat data where the labels indicate alternative dispositions for impact data and/or combinations of impact data and threat data. As also described herein, the disposition feed agents 1215 may use the rules/policies 1215-2 to determine an alternative disposition for an ambiguous endpoint (or facilitate determination of an alternative disposition) based on the impact data (e.g., impact data 1245) and, if provided, the received threat data. In this way, the rules/policies 1215-2 may be authored to determine an alternative disposition and/or provide additional data that is used to determine an alternative disposition.

Having discussed the example computing environment 1200 of FIG. 12, as well as examples of machine learning models and/or the rules/policies of the various agents 1210 and 1215 of FIG. 12, example methods and flows that may be performed by those agents as to how they may determine alternative dispositions that, once received, cause a device to filter network traffic to and/or from ambiguous endpoints will now be discussed. FIG. 13 depicts an example method 1300 that may be performed by the impact analysis agents 1210 and disposition feed agents 1215 of FIG. 12 (e.g., as part of the one or more processes for determining alternative dispositions for ambiguous endpoints). FIG. 14 depicts an example flow where alternative dispositions are determined for ambiguous endpoints and devices are caused to filter network traffic based on the alternative dispositions. FIG. 15 depicts an example method 1500 that may be performed by the impact analysis agents 1210 and disposition feed agents 1215 of FIG. 12 (e.g., as part of the one or more processes for determining alternative dispositions for ambiguous endpoints). The example methods 1300 and 1500 are only examples of the processes that can be performed by the various agents 1210 and 1215 of FIG. 12. Other variations may include omitting steps from the example methods 1300 and/or 1500, adding new steps to the example methods 1300 and/or 1500, and/or changing the order of steps from the example methods 1300 and/or 1500. Additionally, for simplicity, the example methods 1300 and 1500 and the example flows will be discussed in terms of being performed by one or more computing devices (e.g., within the computing environment 1200 of FIG. 12 or a similar computing environment).

Beginning with the example method 1300 in FIG. 13, at step 1305, one or more computing devices may received endpoint data. The endpoint data may be indicative of one or more endpoints as described herein. The endpoint data may also include any CTI data received or otherwise determined for the endpoints. At step 1310, the endpoint data may be analyzed to determine if any of the identified endpoints are known malicious endpoints (i.e., blacklisted endpoints) or known non-malicious endpoints (e.g., whitelisted endpoints). As described herein, a known malicious endpoint or a known non-malicious endpoint may be referred to, for case of reference, as an unambiguous endpoint. For any unambiguous endpoints indicated in and determined from the endpoint data (step 1310: Y), at step 1312, a disposition may be determined for each unambiguous endpoint. For example, the disposition determined for a known malicious endpoint may be a block disposition, and the disposition determined for a known non-malicious endpoint may be an allow disposition or an allow/monitor disposition. Any endpoints identified in the endpoint data that are not (or cannot) be determined to be known malicious endpoints or known non-malicious endpoints (step 1310: N) may be determined to be ambiguous endpoints as described herein (e.g., gray-listed endpoints). At step 1314, a default disposition for any ambiguous endpoints may be determined. For example, more risk tolerant entities may determine a default allow/monitor disposition for ambiguous endpoints, and more risk averse entities may determine a default block disposition for ambiguous endpoints. At step 1316, an impact status for any ambiguous endpoints may be determined as described herein. At step 1318, a threat status for any ambiguous endpoints may be determined as described herein. The threat status may indicate, for example, that no CTI data has been received or otherwise determined for an ambiguous endpoint. The threat status may indicate, for example, that any CTI data received or otherwise determined for the ambiguous endpoint is low confidence CTI data. At step 1320, which may be optional, a shieldability status may be determined based on the threat status and the impact status determined for an ambiguous endpoint as described herein. At step 1325, an alternative disposition for an ambiguous endpoint may be determined based on the impact status and the threat status determined for that ambiguous endpoint. Determining the alternative disposition for the ambiguous endpoint may include determining the alternative disposition based on the shieldability status determined for the ambiguous endpoint. At step 1330, a disposition feed may be updated based on any alternative dispositions respectively determined for the ambiguous endpoints indicated in the endpoint data as described herein. Steps 1305-1330 may be repeated upon receipt of new (or additional) endpoint data.

Turning to the example flow in FIG. 14, the CTI providers 1402, data collection agent 1404, threat analysis agent 1406, impact analysis agent 1408, disposition feed agent 1410, and computing device 1412 may respectively be the same as, or similar to, FIG. 1's CTI providers 101-1 to 101-X, data collection agents 105, and threat analysis agents 130; FIG. 12's impact analysis agents 1210 and disposition feed agents 1215; and computing device 170 of FIG. 1 and/or computing device 1260 of FIG. 12. The example flow of FIG. 14 is only one example of the way in which alternative dispositions can be determined and/or how devices can be caused to filter network traffic based on alternative dispositions. At step 1420, the one or more CTI providers 1402 may send CTI data 1422 to a data collection agent 1404. Based on the sending of the CTI data 1422, at step 1424, the data collection agent 1404 may receive, classify, and store the CTI data 1422 as described herein. Based on the received CTI data 1422, the data collection agent 1404 may determine endpoint data 1426 as described herein. At step 1428*a*, the data collection agent 1404 may send the endpoint data 1426 to a threat analysis agent 1406. At step 1428*b*, the data collection agent 1404 may send the endpoint data 1426 (or a portion thereof) to an impact analysis agent 1408. At step 1430, the threat analysis agent 1406 may ingest and analyze, for one or more endpoints, the received endpoint data. For example, the endpoint data 1426 may indicate that no CTI data has been received for an endpoint (e.g., an ambiguous endpoint) or that the CTI data received for an endpoint is low confidence CTI data. The endpoint data 1426 may also indicate whether an endpoint is an ambiguous endpoint or an unambiguous endpoint. The endpoint data provided to the impact analysis agent 1408 may indicate only ambiguous endpoints. Based on the received endpoint data 1426, the threat analysis agent 1406 may determine threat data 1434. At step 1432, the threat analysis agent 1406 may provide the threat data 1434 to a disposition feed agent 1410 as described herein. At step 1436, a data repository 1438 may provide stored data 1440 to the impact analysis agent 1408 as described herein. For example, the stored data 1438 may include network traffic data and/or resource data. At step 1440, the impact analysis agent 1408 may ingest and analyze the received endpoint data 1426 and the received stored data 1438 in order to determine the impact of blocking potentially legitimate network traffic between an entity's network and one or more ambiguous endpoints as described herein. At step 1442, the impact analysis agent 1408 may provide an impact status 1444 to the disposition feed agent 1410. At step 1446, the disposition feed agent 1410 may ingest and analyze the received impact status 1444 and the received threat data 1434 in order to determine an alternative disposition for an ambiguous endpoint as described herein. This may result in the disposition feed agent 1410 determining feed data 1448 indicating one or more alternative dispositions respectively determined for one or more ambiguous endpoints as described herein. At step 1450, the disposition feed agent may send the feed data, via a disposition feed, to the computing device 1412. Based on the alternative disposition indicated in the feed data 1448, the computing device 1412 may, at step 1452, configure itself to filter network traffic to and/or from an ambiguous endpoint based on the alternative disposition determined for that endpoint.

Referring now to the example method 1500 in FIG. 15, at step 1502, one or more computing devices may receive CTI data for one or more endpoints as described herein. The CTI data may include one or more indicators of compromise for one or more of the endpoints. A confidence level for the CTI data may be determined, received, or otherwise obtained. At step 1504, the confidence of the CTI data may be analyzed to determine if it is sufficient to assign any of the identified endpoints to a list of known malicious endpoints (e.g., a blacklist) or to a list of known non-malicious endpoints (e.g., a whitelist). In this way, an endpoint may be identified as an unambiguous endpoint or an ambiguous endpoint based on the confidence of the CTI data. If the confidence of the CTI data is sufficient to assign an endpoint to a list of known malicious endpoints or to a list of known non-malicious endpoints (step 1504: Y), at step 1506, a disposition for that unambiguous endpoint may be determined. If the confidence of the CTI data is not sufficient to assign an endpoint to a list of known malicious endpoints or to a list of known non-malicious endpoints (step 1504: N), at step 1508, a default disposition for that ambiguous endpoint may be determined as described herein. At step 1510, an impact status for any ambiguous endpoints may be determined as described herein. The impact status may be used to adjust a confidence threshold for the CTI data. For example, if the impact status indicates a relatively high likelihood of adversely affecting an entity's operations by blocking potentially legitimate traffic between the entity's network and the ambiguous endpoint, the confidence threshold may be increased to require relatively high confidence CTI data before blocking such traffic. As another example, if the impact status indicated a relatively low likelihood of adversely affecting an entity's operations by blocking potentially legitimate traffic between the entity's network and the ambiguous endpoint, the confidence threshold may be lowered to allow relatively low confidence CTI data to result in blocking such traffic. In other words, the confidence of the CTI data needed to block network traffic to and/or from an ambiguous endpoint may depend on the impact of blocking potentially legitimate network traffic to and/or from that ambiguous endpoint. At step 1514, the confidence of the CTI data may be compared to the adjusted confidence threshold. If the confidence of the CTI data does not satisfy the adjusted confidence threshold (step 1514: N), at step 1516, a disposition feed may be updated based on the default disposition determined for the ambiguous endpoint. If the confidence of the CTI data does satisfy the adjusted confidence threshold (step 1514: Y), at step 1518, an alternative disposition for an ambiguous endpoint may be determined based on the impact status as described herein (e.g., in conjunction with a threat status determined for the ambiguous endpoint, using a composite shieldability status for the ambiguous endpoint). At step 1520, a disposition feed may be updated based on any alternative dispositions respectively determined for any ambiguous endpoints associated with the received CTI data. Steps 1502-1520 may be repeated upon receipt of new (or additional) CTI data.

Example use cases for filtering network traffic based on an impact status will now be described. For simplicity, the example use cases will be discussed in terms of being performed by one or more computing devices (e.g., within the computing environment 1200 of FIG. 12 or a similar computing environment). In a first use case, an endpoint may be identified as an ambiguous endpoint, and a default allow disposition may be determined for the ambiguous endpoint. Determining the impact status for the ambiguous endpoint may include determining that the potential impact of blocking network traffic between the endpoint and the network of the entity is a low potential impact that does not satisfy a high impact threshold. As such, the alternative disposition determined for the ambiguous endpoint may be a block disposition. In a second use case, an endpoint again may be identified as an ambiguous endpoint, and a default block disposition may be determined for the ambiguous endpoint. Determining the impact status for the ambiguous endpoint may include determining that the potential impact of blocking network traffic between the endpoint and the network of the entity is a high potential impact that does not satisfy a low impact threshold. As such, the alternative disposition determined for the ambiguous endpoint may be an allow disposition. It should also be appreciated that, in some circumstances, an alternative disposition may allow network traffic between an entity's network and an ambiguous endpoint even when the threat status is determined to be relatively high (e.g., a relatively severe threat). Such circumstances may include stress testing the entity's network, special projects by high-priority individuals associated with the entity (e.g., the entity's Chief Technology Officer, senior network administrators), and the like.

In addition (or as an alternative) to using impact status to update disposition feeds, the impact status may be used to filter live network traffic on a real-time basis. As such, as an entity's network receives network traffic, the corresponding endpoints may be identified as unambiguous endpoints or ambiguous endpoints as described herein. The network traffic associated with an unambiguous endpoint, therefore, may be described as either malicious network traffic (if associated with a known malicious endpoint) or non-malicious network traffic (if associated with a known non-malicious endpoint). The remaining network traffic that is neither malicious network traffic or non-malicious network traffic may be referred to as ambiguous network traffic. An impact status may be determined for the ambiguous network traffic as described herein. A disposition for the ambiguous network traffic may be determined based on the determined impact status as described herein (e.g., with or without using a determined threat status, using a composite shieldability status). A computing device may be configured to filter the ambiguous network traffic based on the determined disposition.

It should also be appreciated that the disclosures herein related to determining an impact status need not be provided by the same system or within the same computing environment that determines the dispositions for endpoints. For example, a separate and independent system and/or computing environment may be configured to receive and ingest data from the computing environment 100 in FIG. 1, determine an impact status, and provide the determined impact status as output to the computing environment 100 of FIG. 1. In this example, the disposition feed agents 150 may be configured to receive and ingest the impact status from this separate system and/or computing environment and determine an alternative disposition for an endpoint as described herein.

The disclosures herein thus also provide techniques for uncovering hidden (or buried) attacks that become visible by focusing on ambiguous network traffic that is not known to be malicious and not known to be non-malicious and providing additional context to make more deliberate decisions about ambiguous network traffic that has a relatively greater potential to be malicious. In this way, the disclosure herein also allow for the discovery of potential attacks in network traffic that can be more challenging to analyze in a timely and computationally efficient manner. As one example of ambiguous network traffic that can be more deliberately addressed based on impact status as described herein, alternative dispositions for ambiguous network traffic to certain geographic regions and/or countries may be determined if such network traffic is unexpected in the sense that an entity has no legitimate reason for such network traffic and it is determined that blocking such network traffic would have no meaningful adverse impact on the entity's operations. More particularly, certain TLDs may statistically include relatively more malicious endpoints. Such TLDs may be referred to as suspicious TLDs. Given that collecting an analyzing data for non-suspicious TLDs may result in an unmanageable amount of data, network traffic to/from suspicious TLDs may be collected and analyzed to determined the likelihood that such traffic is legitimate and addressed accordingly.

The disclosures herein also provide techniques for uncovering hidden (or buried) attacks that become visible by retroactively analyzing historic network traffic. The techniques described herein (e.g., in connection with the disclosures associated with FIGS. 1-2, 3A-D, 4, 5A-B, 6A-B, 7-9, 10A-E, and 11A-B and the threat monitoring agent(s) 130, 1096, 1196 and threat monitoring agent(s) 140, 1097, 1197 depicted therein) may be applied to historic network traffic. The historic network traffic and/or data about the historic network traffic may be received from one or more entities. The data about the network traffic may characterize or otherwise summarize the historic network traffic such as network traffic logs (e.g., firewall logs). As one example, network traffic blocked by an entity's firewall(s) may be an example of historic network traffic that may be retroactively analyzed using the techniques described herein. The entity's firewall logs thus may be a source of additional data that may help to discover past, present, or future network attacks when considered in conjunction with additional contextual information (e.g., newly received CTI data and/or during a forensic analysis that expands the degrees of separation when retrieving additional contextual information as described herein). The threat analysis techniques described herein thus may be employed retroactively in a forensic manner with respect to historic network traffic in order to discover previously undetected network attacks. As an example, historical network traffic, by itself, my not be sufficient to detect that a network attack occurred. Additional contextual information may be retrieved (e.g., by expanding the degrees of separation as described herein) subsequent to receipt of that historical network traffic data that recontextualizes the historical network traffic data in a manner that suggest that network historical network traffic was associated with an undetected network attack. The results of such retroactive analysis (e.g., the reassessment of the historical network traffic) also may be employed to determine one or more of a shieldability status for an endpoint and/or an alternative disposition for the endpoint that is different than a default disposition determined to apply to that endpoint.

FIG. 16 illustrates one example of a computing device 1601 that may be used to implement one or more aspects discussed herein. For example, computing device 1601 may, in some embodiments, implement one or more aspects of the disclosure by reading and/or executing instructions and performing one or more actions based on the instructions. Computing device 1601 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 1601 may, in some embodiments, operate in a standalone environment. In others, computing device 1601 may operate in a networked environment. As shown in FIG. 12, various network nodes 1601, 1605, 1607, and 1609 may be interconnected via a network 1603, such as the Internet. Other networks may also or alternatively be used, including private intranets, corporate networks, LANs, wireless networks, personal networks (PAN), and the like. Network 1603 is for illustration purposes and may be replaced with fewer or additional computer networks. A local area network (LAN) may have one or more of any known LAN topology and may use one or more of a variety of different protocols, such as Ethernet. Devices 1601, 1605, 1607, 1609 and other devices (not shown) may be connected to one or more of the networks via twisted pair wires, coaxial cable, fiber optics, radio waves or other communication media.

As seen in FIG. 16, computing device 1601 may include a processor 1611, RAM 1613, ROM 1615, network interface 1617, input/output interfaces 1619 (e.g., keyboard, mouse, display, printer, etc.), and memory 1621. Processor 1611 may include one or more computer processing units (CPUs), graphical processing units (GPUs), and/or other processing units such as a processor adapted to perform computations associated with cyber threat detection and/or forms of machine learning. I/O 1619 may include a variety of interface units and drives for reading, writing, displaying, and/or printing data or files. I/O 1619 may be coupled with a display such as display 1620. Memory 1621 may store software for configuring computing device 1601 into a special purpose computing device in order to perform one or more of the various functions discussed herein. Memory 1621 may store operating system software 1123 for controlling overall operation of computing device 1601, control logic 1625 for instructing computing device 1601 to perform aspects discussed herein, threat analysis software 1627 configured to perform any of the processes and/or methods described above, training data 1629 that is usable to train any or all of the machine-learning models discussed above, and other applications 1631. Control logic 1625 may be incorporated in and may be a part of dataset processing software 1627. In other embodiments, computing device 1601 may include two or more of any and/or all of these components (e.g., two or more processors, two or more memories, etc.) and/or other components and/or subsystems not illustrated here.

Devices 1605, 1607, 1609 may have similar or different architecture as described with respect to computing device 1601. Those of skill in the art will appreciate that the functionality of computing device 1601 (or device 1605, 1607, 1609) as described herein may be spread across multiple data processing devices, for example, to distribute processing load across multiple computers, to segregate transactions based on geographic location, user access level, quality of service (QOS), to use cloud-based computing services, etc. For example, devices 1601, 1605, 1607, 1609, and others may operate in concert to provide parallel computing features in support of the operation of control logic 1625, threat analysis software 1627, and/or other applications 1631.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer-executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Although the subject matter has been described in language specific to structural features and/or methodological acts, it is to be understood that the subject matter defined in any statement of the following example embodiments is not necessarily limited to the specific features or acts described above. Rather, the specific features and acts described above are disclosed as example forms of implementing any statement or any of the appended statements.

Below, various characteristics are described in a set of numbered statements or paragraphs. These characteristics are not to be interpreted as being limiting on the invention or inventive concept, but are provided merely as a identifying some characteristics as described herein, without suggesting a particular order of importance or relevancy of such characteristics.

In a first example, the statements may relate to refining threat data based on received CTI data, for example, determining threat differential data based on the received CTI data indicating changes to threats for one or more endpoints.

Statement 1. A method comprising receiving, from a first provider of a plurality of providers, cyber threat intelligence (CTI) data that includes a first indication of compromise (IOC) for an endpoint.

Statement 1A. The method of statement 1, further comprising determining, based on the first CTI data, first endpoint data that indicates the first IOC for the endpoint.

Statement 1B. The method of any one of statements 1 and 1A, further comprising, based on an analysis of the first endpoint data and stored event data associated with the endpoint, determining that a change for the endpoint has occurred, wherein the stored event data indicates one or more second IOCs for the endpoint that have been received from the plurality of providers.

Statement 1C. The method of any one of statements 1 and 1A-1B, further comprising, based on determining that the change for the endpoint has occurred, determining threat differential data for the endpoint, wherein the threat differential data indicates one or more attributes that changed for the endpoint between the stored event data and the first endpoint data.

Statement 1D. The method of any one of statements 1 and 1A-1C, further comprising determining, based on the threat differential data, a disposition for the endpoint.

Statement 1E. The method of any one of statements 1 and 1A-1D, further comprising sending, by a first computing device and to a second computing device, the disposition to cause the second computing device to filter network traffic based on the disposition.

Statement 2. The method of any one of statements 1 and 1A-E, wherein determining the disposition for the endpoint is based on how many of the plurality of providers have indicated an IOC for the endpoint.

Statement 3. The method of any one of statements 1, 1A-E, and 2, wherein determining the disposition for the endpoint is based on which of the plurality of providers have indicated an IOC for the endpoint.

Statement 4. The method of any one of statements 1, 1A-E, and 2-3, wherein determining the disposition for the endpoint is based on indications that one or more of the plurality of providers have repeatedly indicated the same IOC for the endpoint.

Statement 5. The method of any one of statements 1, 1A-E, and 2-4 wherein determining the disposition for the endpoint is based on how many of the plurality of providers have indicated the same IOC for the endpoint.

Statement 6. The method of any one of statements 1, 1A-E, and 2-5, wherein determining the disposition for the endpoint is based on one or more of a first confidence value associated with first IOC, a second confidence value associated with the one or more attributes, a third confidence value associated with the first provider.

Statement 7. The method of any one of statements 1, 1A-E, and 2-6, wherein the first endpoint data is in a second format, and wherein the method further comprises training a plurality of machine-learning models for the plurality of providers, wherein after training the plurality of machine-learning models, each of the plurality of machine-learning models is configured to receive input in a format that a provider sends CTI data and to provide output in the second format; and wherein determining the first endpoint data is performed based on using a first machine-learning model of the plurality of machine-learning models and providing the first CTI data as input to the first machine-learning model.

Statement 8. The method of any one of statements 1, 1A-E, and 2-7, further comprising training a machine-learning model, wherein after training the machine-learning model, the machine-learning model is configured to output indications as to whether endpoints have changed based on input data associated with the endpoints; and wherein determining that the change for the endpoint has occurred is performed based on using the machine-learning model and providing the first endpoint data and the stored event data as input to the machine-learning model.

Statement 9. The method of any one of statements 1, 1A-E, and 2-8, further comprising training a machine-learning model, wherein after training the machine-learning model, the machine-learning model is configured to output criteria for new feeds; based on providing the threat differential data as input to the machine-learning model, receiving first criteria for a feed; and constructing the feed; and wherein sending the disposition is performed via the feed.

Statement 10. One or more non-transitory computer-readable media storing computer-executable instructions that, when executed, cause one or more computing devices to receive, from a first provider of a plurality of providers, cyber threat intelligence (CTI) data that includes a first indication of compromise (IOC) for an endpoint; determine, based on the first CTI data, first endpoint data that indicates the first IOC for the endpoint; based on an analysis of the first endpoint data and stored event data associated with the endpoint, determine that a change for the endpoint has occurred, wherein the stored event data indicates one or more second IOCs for the endpoint that have been received from the plurality of providers; based on determining that the change for the endpoint has occurred, determine threat differential data for the endpoint, wherein the threat differential data indicates one or more attributes that changed for the endpoint between the stored event data and the first endpoint data; determine, based on the threat differential data, a disposition for the endpoint; and send, to a device, the disposition to cause the device to filter network traffic based on the disposition.

Statement 11. The non-transitory computer-readable media of statement 10, wherein the computer-executable instructions, when executed, cause the one or more computing devices to determine the disposition for the endpoint based on how many of the plurality of providers have indicated an IOC for the endpoint.

Statement 12. The non-transitory computer-readable media of any one of statements 10 and 11, wherein the computer-executable instructions, when executed, cause the one or more computing devices to determine the disposition for the endpoint based on which of the plurality of providers have indicated an IOC for the endpoint.

Statement 13. The non-transitory computer-readable media of any one of statements 10-12, wherein the computer-executable instructions, when executed, cause the one or more computing devices to determine the disposition for the endpoint based on indications that one or more of the plurality of providers have repeatedly indicated the same IOC for the endpoint.

Statement 14. The non-transitory computer-readable media of any one of statements 10-13, wherein the computer-executable instructions, when executed, cause the one or more computing devices to determine the disposition for the endpoint based on how many of the plurality of providers have indicated the same IOC for the endpoint.

Statement 15. The non-transitory computer-readable media of any one of statements 10-14, wherein the first endpoint data is in a second format, and wherein the computer-executable instructions, when executed, cause the one or more computing devices to: train a plurality of machine-learning models for the plurality of providers, wherein after training the plurality of machine-learning models, each of the plurality of machine-learning models is configured to receive input in a format that a provider sends CTI data and to provide output in the second format; wherein the computer-executable instructions, when executed, cause the one or more computing devices to determine the first endpoint data based on using a first machine-learning model of the plurality of machine-learning models and providing the first CTI data as input to the first machine-learning model.

Statement 16. The non-transitory computer-readable media of any one of statements 10-15, wherein the computer-executable instructions, when executed, cause the one or more computing devices to: train a machine-learning model, wherein after training the machine-learning model, the machine-learning model is configured to output indications as to whether endpoints have changed based on input data associated with the endpoints; wherein the computer-executable instructions, when executed, cause the one or more computing devices to determine that the change for the endpoint has occurred based on using the machine-learning model and providing the first endpoint data and the stored event data as input to the machine-learning model.

Statement 17. The non-transitory computer-readable media of any one of statements 10-16, wherein the computer-executable instructions, when executed, cause the one or more computing devices to: train a machine-learning model, wherein after training the machine-learning model, the machine-learning model is configured to output criteria for new feeds; based on providing the threat differential data as input to the machine-learning model, receive first criteria for a feed; and construct the feed; and wherein the computer-executable instructions, when executed, cause the one or more computing devices to send the disposition via the feed.

Statement 18. One or more computing devices comprising one or more processors; and memory storing computer-executable instructions that, when executed by the one or more processors, cause the one or more computing devices to: receive, from a first provider of a plurality of providers, cyber threat intelligence (CTI) data that includes a first indication of compromise (IOC) for an endpoint; determine, based on the first CTI data, first endpoint data that indicates the first IOC for the endpoint; based on an analysis of the first endpoint data and stored event data associated with the endpoint, determine that a change for the endpoint has occurred, wherein the stored event data indicates one or more second IOCs for the endpoint that have been received from the plurality of providers; based on determining that the change for the endpoint has occurred, determine threat differential data for the endpoint, wherein the threat differential data indicates one or more attributes that changed for the endpoint between the stored event data and the first endpoint data; determine, based on the threat differential data, a disposition for the endpoint; and send, to a device, the disposition to cause the device to filter network traffic based on the disposition.

Statement 19. The one or more computing devices of statement 18, wherein the computer-executable instructions, when executed by the one or more processors, cause the one or more computing devices to determine the disposition for the endpoint based on how many of the plurality of providers have indicated an IOC for the endpoint.

Statement 20. The one or more computing devices of any one of statements 18-19, wherein the computer-executable instructions, when executed by the one or more processors, cause the one or more computing devices to determine the disposition for the endpoint based on indications that one or more of the plurality of providers have repeatedly indicated the same IOC for the endpoint.

In a second example, the statements may relate to refining threat data based on received CTI data, for example, determining additional context for an endpoint based on received CTI data indicating additional occurrences of an IOC for an endpoint.

Statement 21. A method comprising receiving, from a first provider of a plurality of providers, first cyber threat intelligence (CTI) data that includes a first indication of compromise (IOC) for an endpoint.

Statement 21A. The method of statement 21, further comprising determining, based on the first CTI data, first endpoint data that indicates the first IOC for the endpoint.

Statement 21B. The method of any one of statements 21 and 21A, further comprising determining, based on the first endpoint data, first threat differential data that indicates the first IOC for the endpoint is the first occurrence of an IOC for the endpoint.

Statement 21C. The method of any one of statements 21 and 21A-21B, further comprising determining, based on the first threat differential data, a first disposition for the endpoint, wherein the first disposition indicates a first level of threat for the endpoint.

Statement 21D. The method of any one of statements 21 and 21A-21C, further comprising sending, by a first computing device and to a second computing device, the first disposition to cause the second computing device to filter first network traffic based on the first disposition.

Statement 21E. The method of any one of statements 21 and 21A-21D, further comprising receiving, from a second provider of the plurality of providers, second CTI data that includes a second IOC for the endpoint.

Statement 21F. The method of any one of statements 21 and 21A-21E, further comprising determining, based on the second CTI data, second endpoint data that indicates the second IOC for the endpoint.

Statement 21G. The method of any one of statements 21 and 21A-21F, further comprising determining, based on second endpoint data, second threat differential data that indicates the second IOC for the endpoint is at least the second occurrence of an IOC for the endpoint.

Statement 21G1. The method of any one of statements 21 and 21A-21G, further comprising determining, based on second threat differential data, a second disposition for the endpoint, wherein the second disposition indicates a second level of threat for the endpoint, wherein the second disposition indicates a second level of threat for the endpoint that is greater than the first level of threat.

Statement 21H. The method of any one of statements 21 and 21A-21G1, further comprising sending, by the first computing device and to the second computing device, the second disposition to cause the second computing device to filter second network traffic based on the second disposition.

Statement 22. The method of any one of statements 21 and 21A-H, wherein the first disposition indicates to monitor network traffic associated with the endpoint; wherein sending the first disposition causes the second computing device to monitor the first network traffic based on the first disposition; wherein the second disposition indicates to block network traffic associated with the endpoint; and wherein sending the second disposition causes the second computing device to block the second network traffic based on the second disposition.

Statement 23. The method of any one of statements 21, 21A-H and 22, wherein the first CTI data is in a first format; wherein the second CTI data is in a second format; wherein the first endpoint data and the second endpoint data are in a third format; wherein the method further comprises: training, using first training data in the first format, a first model, wherein after training the first model, the first model is configured to receive input in the first format and provide output in the second format, and training, using second training data in the second format, a second model, wherein after training the second model, the second model is configured to receive input in the first format and provide output in the second format; wherein determining the first endpoint data is performed based on using the first model and providing the first CTI data to the first model as input; and wherein determining the second endpoint data is performed based on using the second model and providing the second CTI data to the second model as input.

Statement 24. The method of any one of statements 21, 21A-H and 22-23 further comprising based on determining that a stored event does not exist for the first endpoint data, determining, based on the first endpoint data, first event data; and storing the first event data; determining a threat status by comparing the first event data and the second endpoint data; and based on determining that the threat status indicates a change for the endpoint, determining, based on the second endpoint data, second event data; and storing the second event data; wherein determining the first threat differential is performed based on the determining that a stored event does not exist for the first endpoint data; and wherein determining the second threat differential is performed based on the determining that the threat status indicates a change for the endpoint.

Statement 25. The method of any one of statements 21, 21A-H and 22-24 wherein sending the first disposition is performed via a feed; wherein sending the second disposition is performed via the feed; and wherein the method further comprises: determining, based on the first threat differential data, that feed criteria for the feed is satisfied; based on determining that the feed criteria for the feed is satisfied, constructing the feed; and determining, based on the second threat differential data, that the feed criteria for the feed is satisfied.

Statement 26. The method of any one of statements 21, 21A-H and 22-25 further comprising determining, based on one or more changes to one or more threat analysis data repositories, that monitoring criteria is satisfied; based on determining that monitoring criteria is satisfied, determining third threat differential data that indicates a range of addresses for a plurality of endpoints associated with the one or more changes; determining, based on the third threat differential, a third disposition for the plurality of endpoints, wherein the third disposition indicates to block network traffic associated with the plurality of endpoints; and sending, by the first computing device and to the second computing device, the third disposition to cause the second computing device to block third network traffic based on the third disposition.

Statement 27. The method of any one of statements 21, 21A-H and 22-26 wherein determining the first disposition is performed based on, at a time of determining the first disposition, a first number of IOCs, for the endpoint, that have been received being less than a threshold; and wherein determining the second disposition is performed based on, at a time of determining the second disposition, a second number of IOCs, for the endpoint, that have been received being less than the threshold.

Statement 28. The method of any one of statements 21, 21A-H and 22-27 wherein determining the first disposition is performed based on, at a time of determining the first disposition, a first number of providers that have sent CTI data indicating the endpoint being less than a threshold; and wherein determining the second disposition is performed based on, at a time of determining the second disposition, a second number of providers that have sent CTI data indicating the endpoint being less than the threshold.

Statement 29. One or more non-transitory computer-readable media storing computer-executable instructions that, when executed, cause one or more computing devices to: receive, from a first provider of a plurality of providers, first cyber threat intelligence (CTI) data that includes a first indication of compromise (IOC) for an endpoint; determine, based on the first CTI data, first endpoint data that indicates the first IOC for the endpoint; determine, based on the first endpoint data, first threat differential data that indicates the first IOC for the endpoint is the first occurrence of an IOC for the endpoint; determine, based on the first threat differential data, a first disposition for the endpoint, wherein the first disposition indicates a first level of threat for the endpoint; send, by a first computing device and to a device, the first disposition to cause the device to filter first network traffic based on the first disposition; receive, from a second provider of the plurality of providers, second CTI data that includes a second IOC for the endpoint;

determine, based on the second CTI data, second endpoint data that indicates the second IOC for the endpoint; determine, based on the second endpoint data, second threat differential data that indicates the second IOC for the endpoint is at least the second occurrence of an IOC for the endpoint; determine, based on the second threat differential data, a second disposition for the endpoint, wherein the second disposition indicates a second level of threat for the endpoint, wherein the second disposition indicates a second level of threat for the endpoint that is greater than the first level of threat; and send, to the device, the second disposition to cause the device to filter second network traffic based on the second disposition.

Statement 30. The one or more non-transitory computer-readable media of statement 29, wherein the first disposition indicates to monitor network traffic associated with the endpoint; wherein the computer-executable instructions, when executed, cause the one or more computing devices to send the first disposition to cause the device to monitor the first network traffic based on the first disposition; wherein the second disposition indicates to block network traffic associated with the endpoint; and wherein the computer-executable instructions, when executed, cause the one or more computing devices to send the second disposition to cause the device to block the second network traffic based on the second disposition.

Statement 31. The one or more non-transitory computer-readable media of any one of statements 29-30, wherein the first CTI data is in a first format; wherein the second CTI data is in a second format; wherein the first endpoint data and the second endpoint data are in a third format; wherein the computer-executable instructions, when executed, cause the one or more computing devices to: train, using first training data in the first format, a first model, wherein after training the first model, the first model is configured to receive input in the first format and provide output in the second format, and train, using second training data in the second format, a second model, wherein after training the second model, the second model is configured to receive input in the first format and provide output in the second format; wherein the computer-executable instructions, when executed, cause the one or more computing devices to determine the first endpoint data based on using the first model and providing the first CTI data to the first model as input; and wherein the computer-executable instructions, when executed, cause the one or more computing devices to determine the second endpoint data based on using the second model and providing the second CTI data to the second model as input.

Statement 32. The one or more non-transitory computer-readable media of any one of statements 29-31, wherein the computer-executable instructions, when executed, cause the one or more computing devices to: based on a determination that a stored event does not exist for the first endpoint data, determine, based on the first endpoint data, first event data; and store the first event data; determine a threat status by comparing the first event data and the second endpoint data; and based on a determination that the threat status indicates a change for the endpoint, determine, based on the second endpoint data, second event data; and store the second event data; wherein the computer-executable instructions, when executed, cause the one or more computing devices to determine the first threat differential based on the determining that a stored event does not exist for the first endpoint data; and wherein the computer-executable instructions, when executed, cause the one or more computing devices to determine the second threat differential based on the determining that the threat status indicates a change for the endpoint.

Statement 33. The one or more non-transitory computer-readable media of any one of statements 29-32, wherein the computer-readable instructions, when executed, cause the one or more computing devices to send the first disposition via a feed; wherein the computer-readable instructions, when executed, cause the one or more computing devices to send the second disposition is performed via the feed; and wherein the computer-readable instructions, when executed, cause the one or more computing devices to: determine, based on the first threat differential data, that feed criteria for the feed is satisfied; based on a determination that the feed criteria for the feed is satisfied, construct the feed; and determine, based on the second threat differential data, that the feed criteria for the feed is satisfied.

Statement 34. The one or more non-transitory computer-readable media of any one of statements 29-33, wherein the computer-readable instructions, when executed, cause the one or more computing devices to: determine, based on one or more changes to one or more threat analysis data repositories, that monitoring criteria is satisfied; based on a determination that monitoring criteria is satisfied, determine third threat differential data that indicates a range of addresses for a plurality of endpoints associated with the one or more changes; determine, based on the third threat differential, a third disposition for the plurality of endpoints, wherein the third disposition indicates to block network traffic associated with the plurality of endpoints; and send, to the device, the third disposition to cause the device to block third network traffic based on the third disposition.

Statement 35. One or more computing devices comprising one or more processors; and memory storing computer-executable instructions that, when executed by the ne or more processors, cause the one or more computing devices to: receive, from a first provider of a plurality of providers, first cyber threat intelligence (CTI) data that includes a first indication of compromise (IOC) for an endpoint; determine, based on the first CTI data, first endpoint data that indicates the first IOC for the endpoint; determine, based on the first endpoint data, first threat differential data that indicates the first IOC for the endpoint is the first occurrence of an IOC for the endpoint; determine, based on the first threat differential data, a first disposition for the endpoint, wherein the first disposition indicates a first level of threat for the endpoint; send, to a device, the first disposition to cause the device to filter first network traffic based on the first disposition; receive, from a second provider of the plurality of providers, second CTI data that includes a second IOC for the endpoint; determine, based on the second CTI data, second endpoint data that indicates the second IOC for the endpoint; determine, based on the second endpoint data, second threat differential data that indicates the second IOC for the endpoint is at least the second occurrence of an IOC for the endpoint; determine, based on the second threat differential data, a second disposition for the endpoint, wherein the second disposition indicates a second level of threat for the endpoint, wherein the second disposition indicates a second level of threat for the endpoint that is greater than the first level of threat; and send, to the device, the second disposition to cause the device to filter second network traffic based on the second disposition.

Statement 36. The one or more computing devices of statement 35, wherein the first disposition indicates to monitor network traffic associated with the endpoint; wherein the computer-executable instructions, when executed by the one or more processors, cause the one or more computing devices to send the first disposition to cause the device to monitor the first network traffic based on the first disposition; wherein the second disposition indicates to block network traffic associated with the endpoint; and wherein the computer-executable instructions, when executed by the one or more processors, cause the one or more computing devices to send the second disposition to cause the device to block the second network traffic based on the second disposition.

Statement 37. The one or more computing devices of any one of statements 35-36, wherein the first CTI data is in a first format; wherein the second CTI data is in a second format; wherein the first endpoint data and the second endpoint data are in a third format; wherein the computer-executable instructions, when executed by the one or more processors, cause the one or more computing devices to: train, using first training data in the first format, a first model, wherein after training the first model, the first model is configured to receive input in the first format and provide output in the second format, and train, using second training data in the second format, a second model, wherein after training the second model, the second model is configured to receive input in the first format and provide output in the second format; wherein the computer-executable instructions, when executed by the one or more processors, cause the one or more computing devices to determine the first endpoint data based on using the first model and providing the first CTI data to the first model as input; and wherein the computer-executable instructions, when executed by the one or more processors, cause the one or more computing devices to determine the second endpoint data based on using the second model and providing the second CTI data to the second model as input.

Statement 38. The one or more computing devices of any one of statements 35-37, wherein the computer-executable instructions, when executed by the one or more processors, cause the one or more computing devices to: based on a determination that a stored event does not exist for the first endpoint data, determine, based on the first endpoint data, first event data; and store the first event data; determine a threat status by comparing the first event data and the second endpoint data; and based on a determination that the threat status indicates a change for the endpoint, determine, based on the second endpoint data, second event data; and store the second event data; wherein the computer-executable instructions, when executed by the one or more processors, cause the one or more computing devices to determine the first threat differential based on the determining that a stored event does not exist for the first endpoint data; and wherein the computer-executable instructions, when executed by the one or more processors, cause the one or more computing devices to determine the second threat differential based on the determining that the threat status indicates a change for the endpoint.

Statement 39. The one or more computing devices of any one of statements 35-38, wherein the computer-readable instructions, when executed, cause the one or more computing devices to send the first disposition via a feed; wherein the computer-readable instructions, when executed, cause the one or more computing devices to send the second disposition is performed via the feed; and wherein the computer-readable instructions, when executed, cause the one or more computing devices to: determine, based on the first threat differential data, that feed criteria for the feed is satisfied; based on a determination that the feed criteria for the feed is satisfied, construct the feed; and determine, based on the second threat differential data, that the feed criteria for the feed is satisfied.

Statement 40. The one or more computing devices of any one of statements 35-39, wherein the computer-readable instructions, when executed by the one or more processors, cause the one or more computing devices to: determine, based on one or more changes to one or more threat analysis data repositories, that monitoring criteria is satisfied; based on a determination that monitoring criteria is satisfied, determine third threat differential data that indicates a range of addresses for a plurality of endpoints associated with the one or more changes; determine, based on the third threat differential, a third disposition for the plurality of endpoints, wherein the third disposition indicates to block network traffic associated with the plurality of endpoints; and send, to the device, the third disposition to cause the device to block third network traffic based on the third disposition.

In a third example, the statements may relate to constructing feeds on an endpoint-by-endpoint basis.

Statement 41. A method comprising receiving, from a first provider of a plurality of providers, cyber threat intelligence (CTI) data that includes a first indication of compromise (IOC) for an endpoint.

Statement 41A. The method of statement 41, further comprising determining, based on the first CTI data, first endpoint data that indicates the first IOC for the endpoint.

Statement 41B. The method of statement 41 and 41A, further comprising, based on an analysis of the first endpoint data and stored event data associated with the endpoint, determining that a change for the endpoint has occurred, wherein the stored event data indicates one or more second IOCs for the endpoint that have been received from the plurality of providers.

Statement 41C. The method of statement 41 and 41A-41B, further comprising determining that the change for the endpoint satisfies first feed criteria for a first feed that includes dispositions of first endpoints that satisfy the first feed criteria.

Statement 41D. The method of statement 41 and 41A-41C, further comprising constructing the first feed.

Statement 41D1. The method of statement 41 and 41A-41D, further comprising determining, based on the change for the endpoint, a first disposition for the endpoint, wherein the first disposition indicates to block network traffic associated with the endpoint.

Statement 41E. The method of statement 41 and 41A-41D1, further comprising sending, by a first computing device and to a second computing device, the first disposition via the first feed to cause the second computing device to block first network traffic based on the first disposition.

Statement 42. The method of any one of statements 41 and 41A-E, further comprising training a machine-learning model, wherein after training the machine-learning model, the machine-learning model is configured to output criteria for new feeds; and based on providing threat differential data as input to the machine-learning model, receiving the feed criteria.

Statement 43. The method of any one of statements 41, 41A-E, and 42 further comprising training a machine-learning model, wherein after training the machine-learning model, the machine-learning model is configured to output criteria for new feeds; based on providing the threat differential data as input to the machine-learning model, receiving second feed criteria for a second feed; and constructing the second feed.

Statement 44. The method of any one of statements 41, 41A-E, and 42-43 further comprising determining that the change for the endpoint satisfies second feed criteria for a second feed that includes dispositions of second endpoints that satisfy the second feed criteria; determining, based on the change for the endpoint, a second disposition for the endpoint, wherein the second disposition indicates to monitor network traffic associated with the endpoint; and sending, by the first computing device and to a third computing device, the second disposition via the second feed to cause the third computing device to monitor network traffic based on the second disposition.

Statement 45. The method of statement 44, further comprising determining that an additional change for the endpoint satisfied the second feed criteria; determining, based on the additional change for the endpoint, a third disposition for the endpoint, wherein the third disposition indicates to block network traffic associated with the endpoint; and sending, by the first computing device and to the third computing device, the third disposition via the second feed to cause the third computing device to block network traffic based on the third disposition.

Statement 46. The method of any one of statements 41, 41A-E, and 42-45, further comprising receiving, from a second provider of the plurality of providers, a time-based exclusion for the endpoint, wherein receiving the CTI data is performed after receiving the time-based exclusion, and wherein the feed is configured as a temporary feed for the time-based exclusion; deconstructing the first feed based on the time-based exclusion; and sending, to the second computing device, a notification that the feed is deconstructed to cause the second computing device to, based on the feed being configured as a temporary feed for the time-based exclusion, allow second network traffic for the endpoint.

Statement 47. The method of statement 46, wherein deconstructing the first feed is based on a threshold window of time for the time-based exclusion expiring.

Statement 48. One or more non-transitory computer-readable media storing computer-executable instructions that, when executed, cause one or more computing devices to: receive, from a first provider of a plurality of providers, cyber threat intelligence (CTI) data that includes a first indication of compromise (IOC) for an endpoint; determine, based on the first CTI data, first endpoint data that indicates the first IOC for the endpoint; based on an analysis of the first endpoint data and stored event data associated with the endpoint, determine that a change for the endpoint has occurred, wherein the stored event data indicates one or more second IOCs for the endpoint that have been received from the plurality of providers; determine that the change for the endpoint satisfies first feed criteria for a first feed that includes dispositions of first endpoints that satisfy the first feed criteria; construct the first feed; determine, based on the change for the endpoint, a first disposition for the endpoint, wherein the first disposition indicates to block network traffic associated with the endpoint; and send, to a first device, the first disposition via the first feed to cause the first device to block first network traffic based on the first disposition.

Statement 49. The one or more non-transitory computer-readable media of statement 48, wherein the computer-executable instructions, when executed, cause the one or more computing devices to: train a machine-learning model, wherein after training the machine-learning model, the machine-learning model is configured to output criteria for new feeds; and based on providing threat differential data as input to the machine-learning model, receive the feed criteria.

Statement 50. The one or more non-transitory computer-readable media of any one of statements 48-49, wherein the computer-executable instructions, when executed, cause the one or more computing devices to: train a machine-learning model, wherein after training the machine-learning model, the machine-learning model is configured to output criteria for new feeds; based on providing threat differential data as input to the machine-learning model, receive second feed criteria for a second feed; and construct the second feed.

Statement 51. The one or more non-transitory computer-readable media of any one of statements 48-50, wherein the computer-executable instructions, when executed, cause the one or more computing devices to: determine that the change for the endpoint satisfies second feed criteria for a second feed that includes dispositions of second endpoints that satisfy the second feed criteria; determine, based on the change for the endpoint, a second disposition for the endpoint, wherein the second disposition indicates to monitor network traffic associated with the endpoint; and send, to a second device, the second disposition via the second feed to cause the second device to monitor network traffic based on the second disposition.

Statement 52. The one or more non-transitory computer-readable media of statement 51, wherein the computer-executable instructions, when executed, cause the one or more computing devices to: determine that an additional change for the endpoint satisfied the second feed criteria; determine, based on the additional change for the endpoint, a second disposition for the endpoint, wherein the first disposition indicates to block network traffic associated with the endpoint; and send, to the second device, the third disposition via the second feed to cause the third computing device to block network traffic based on the third disposition.

Statement 53. The one or more non-transitory computer-readable media of any one of statements 48-52, wherein the computer-executable instructions, when executed, cause the one or more computing devices to: receive, from a second provider of the plurality of providers, a time-based exclusion for the endpoint, wherein the CTI data is received after receiving the time-based exclusion, and wherein the feed is configured as a temporary feed for the time-based exclusion; deconstruct the first feed based on the time-based exclusion; and send, to the first device, a notification that the feed is deconstructed to cause the second computing device to, based on the feed being configured as a temporary feed for the time-based exclusion, allow second network traffic for the endpoint.

Statement 54. The one or more non-transitory computer-readable media of statement 53, wherein the computer-executable instructions, when executed, cause the one or more computing devices to deconstruct the first feed based on a threshold window of time for the time-based exclusion expiring.

Statement 55. One or more computing devices comprising one or more processors; and memory storing computer-executable instructions that, when executed by the one or more processors, cause the one or more computing devices to: receive, from a first provider of a plurality of providers, cyber threat intelligence (CTI) data that includes a first indication of compromise (IOC) for an endpoint; determine, based on the first CTI data, first endpoint data that indicates the first IOC for the endpoint; based on an analysis of the first endpoint data and stored event data associated with the endpoint, determine that a change for the endpoint has occurred, wherein the stored event data indicates one or more second IOCs for the endpoint that have been received from the plurality of providers; determine that the change for the endpoint satisfies first feed criteria for a first feed that includes dispositions of first endpoints that satisfy the first feed criteria; construct the first feed; determine, based on the change for the endpoint, a first disposition for the endpoint, wherein the first disposition indicates to block network traffic associated with the endpoint; and send, to a first device, the first disposition via the first feed to cause the first device to block first network traffic based on the first disposition.

Statement 56. The one or more computing devices of statement 55, wherein the computer-executable instructions, when executed by the one or more processors, cause the one or more computing devices to: train a machine-learning model, wherein after training the machine-learning model, the machine-learning model is configured to output criteria for new feeds; based on providing threat differential data as input to the machine-learning model, receive second feed criteria for a second feed; and construct the second feed.

Statement 57. The one or more computing devices of any one of statements 55 and 56, wherein the computer-executable instructions, when executed by the one or more processors, cause the one or more computing devices to: determine that the change for the endpoint satisfies second feed criteria for a second feed that includes dispositions of second endpoints that satisfy the second feed criteria; determine, based on the change for the endpoint, a second disposition for the endpoint, wherein the second disposition indicates to monitor network traffic associated with the endpoint; and send, to a second device, the second disposition via the second feed to cause the second device to monitor network traffic based on the second disposition.

Statement 58. The one or more computing devices of any one of statements 55-57, wherein the computer-executable instructions, when executed by the one or more processors, cause the one or more computing devices to: determine that an additional change for the endpoint satisfied the second feed criteria; determine, based on the additional change for the endpoint, a second disposition for the endpoint, wherein the first disposition indicates to block network traffic associated with the endpoint; and send, to the second device, the third disposition via the second feed to cause the third computing device to block network traffic based on the third disposition.

Statement 59. The one or more computing devices of any one of statements 55-58, wherein the computer-executable instructions, when executed by the one or more processors, cause the one or more computing devices to: receive, from a second provider of the plurality of providers, a time-based exclusion for the endpoint, wherein the CTI data is received after receiving the time-based exclusion, and wherein the feed is configured as a temporary feed for the time-based exclusion; deconstruct the first feed based on the time-based exclusion; and send, to the first device, a notification that the feed is deconstructed to cause the second computing device to, based on the feed being configured as a temporary feed for the time-based exclusion, allow second network traffic for the endpoint.

Statement 60. The one or more computing devices of statement 59, wherein the computer-executable instructions, when executed by the one or more processors, cause the one or more computing devices to deconstruct the first feed based on a threshold window of time for the time-based exclusion expiring.

In a fourth example, the statements may relate to constructing feeds based on time-based exclusions for endpoints.

Statement 61. A method comprising receiving, from a provider, exclusion data that indicates a time-based exclusion for an endpoint.

Statement 61A. The method of statement 61, further comprising determining, based on the exclusion data, endpoint data that indicates the time-based exclusion for the endpoint.

Statement 61B. The method of statement 61 and 61A, further comprising, based on the endpoint data, determining first threat differential data that indicates the time-based exclusion for the endpoint.

Statement 61C. The method of statement 61 and 61A-61B, further comprising, based on the first threat differential data, preventing a feed from including first dispositions for the endpoint.

Statement 61D. The method of statement 61 and 61A-61C, further comprising constructing a temporary feed for the time-based exclusion.

Statement 61E. The method of statement 61 and 61A-61D, further comprising, based on second threat differential data that indicates an indicator of compromise (IOC) for the endpoint, determining a disposition for the endpoint.

Statement 61F. The method of statement 61 and 61A-61E, further comprising and sending, by a first computing device and to a second computing device via the temporary feed, the disposition to cause the second computing device to filter network traffic based on the disposition.

Statement 62. The method of any one of statements 61 and 61A-F, wherein the exclusion data indicates a threshold window of time for the time-based exclusion; and wherein sending the disposition is based on a determination that the threshold window of time is not expired.

Statement 63. The method of statement 62, further comprising deconstructing the temporary feed based on a determination that the threshold window of time is expired.

Statement 64. The method of any one of statements 62-63, further comprising after expiration of the temporary window of time, preventing both the feed and the temporary feed from including second dispositions for the endpoint.

Statement 65. The method of any one of statements 61, 61A-F, and 62-64, further comprising continuing to prevent the feed from including second dispositions for the endpoint while the temporary feed is constructed.

Statement 66. The method of any one of statements 61, 61 A-F, and 62-65, wherein the temporary feed is the only feed able to include dispositions for the endpoint while the temporary feed is constructed.

Statement 67. The method of any one of statements 61, 61 A-F, and 62-66, further comprising training a machine-learning model, wherein after training the machine-learning model, the machine-learning model is configured to output criteria for new feeds; and based on providing the first threat differential data as input to the machine-learning model, receiving feed criteria for the temporary feed.

Statement 68. The method of any one of statements 61, 61 A-F, and 62-67, wherein the time-based exclusion indicates the endpoint as being in trusted network infrastructure.

Statement 69. One or more non-transitory computer-readable media storing executable instructions that, when executed, cause one or more computing devices to: receive, from a provider, exclusion data that indicates a time-based exclusion for an endpoint; determine, based on the exclusion data, endpoint data that indicates the time-based exclusion for the endpoint; based on the endpoint data, determine first threat differential data that indicates the time-based exclusion for the endpoint; based on the first threat differential data, prevent a feed from including first dispositions for the endpoint; construct a temporary feed for the time-based exclusion; based on second threat differential data that indicates an indicator of compromise (IOC) for the endpoint, determine a disposition for the endpoint; and send, to a device via the temporary feed, the disposition to cause the device to filter network traffic based on the disposition.

Statement 70. The one or more non-transitory computer-readable media of statement 69, wherein the exclusion data indicates a threshold window of time for the time-based exclusion; and wherein the executable instructions, when executed, cause one or more computing devices to send the disposition based on a determination that the threshold window of time is not expired.

Statement 71. The one or more non-transitory computer-readable media of statement 70, wherein the executable instructions, when executed, cause one or more computing devices to deconstruct the temporary feed based on a determination that the threshold window of time is expired.

Statement 72. The one or more non-transitory computer-readable media of any one of statements 70-71, wherein the executable instructions, when executed, cause one or more computing devices to: after expiration of the temporary window of time, prevent both the feed and the temporary feed from including second dispositions for the endpoint.

Statement 73. The one or more non-transitory computer-readable media of any one of statements 69-72, wherein the executable instructions, when executed, cause one or more computing devices to continue to prevent the feed from including second dispositions for the endpoint while the temporary feed is constructed.

Statement 74. The one or more non-transitory computer-readable media of any one of statements 69-73, wherein the temporary feed is the only feed able to include dispositions for the endpoint while the temporary feed is constructed.

Statement 75. The one or more non-transitory computer-readable media of any one of statements 69-74, wherein the executable instructions, when executed, cause one or more computing devices to: train a machine-learning model, wherein after training the machine-learning model, the machine-learning model is configured to output criteria for new feeds; and based on providing the first threat differential data as input to the machine-learning model, receive feed criteria for the temporary feed.

Statement 76. The one or more non-transitory computer-readable media of any one of statements 69-75, wherein the time-based exclusion indicates the endpoint as being in trusted network infrastructure.

Statement 77. One or more computing devices comprising one or more processors; and memory storing computer-executable instructions that, when executed by the one or more processors, cause the one or more computing devices to: receive, from a provider, exclusion data that indicates a time-based exclusion for an endpoint; determine, based on the exclusion data, endpoint data that indicates the time-based exclusion for the endpoint; based on the endpoint data, determine first threat differential data that indicates the time-based exclusion for the endpoint; based on the first threat differential data, prevent a feed from including first dispositions for the endpoint; construct a temporary feed for the time-based exclusion; based on second threat differential data that indicates an indicator of compromise (IOC) for the endpoint, determine a disposition for the endpoint; and send, to a device via the temporary feed, the disposition to cause the device to filter network traffic based on the disposition.

Statement 78. The one or more computing devices of statement 77, wherein the exclusion data indicates a threshold window of time for the time-based exclusion; wherein the executable instructions, when executed by the one or more processors, cause one or more computing devices to send the disposition based on a determination that the threshold window of time is not expired; and wherein the executable instructions, when executed by the one or more processors, cause one or more computing devices to deconstruct the temporary feed based on a determination that the threshold window of time is expired.

Statement 79. The one or more computing devices of any one of statements 77-78, wherein the executable instructions, when executed by the one or more processors, cause one or more computing devices to continue to prevent the feed from including second dispositions for the endpoint while the temporary feed is constructed.

Statement 80. The one or more computing devices of any one of statements 77-79, wherein the executable instructions, when executed by the one or more processors, cause one or more computing devices to: train a machine-learning model, wherein after training the machine-learning model, the machine-learning model is configured to output criteria for new feeds; and based on providing the first threat differential data as input to the machine-learning model, receive feed criteria for the temporary feed.

In a fifth example, the statements may relate to determining alternative dispositions for endpoints based on an impact of blocking potentially legitimate traffic to and/or from those endpoints.

Statement 81. A method comprising (a) receiving cyber threat intelligence (CTI) data for an endpoint, wherein the CTI data comprises one or more indications of compromise (IOCs) associated with the endpoint, (b) receiving endpoint data associated with an endpoint, or (c) receiving network traffic data associated with the endpoint.

Statement 81A. The method of statement 81, further comprising determining that the endpoint is not included in a list of known malicious endpoints and that the endpoint is not included in a list of known non-malicious endpoints.

Statement 81B. The method of statement 81 and 81A, further comprising determining a threat status for the endpoint, optionally based on the one or more IOCs indicated by the CTI data, wherein a default disposition would apply to network traffic associated with the endpoint based on the threat status.

Statement 81C. The method of statement 81 and 81A-81B, further comprising determining, for an entity, an impact status based on an impact of blocking potentially legitimate network traffic between the endpoint and a network of the entity.

Statement 81D. The method of statement 81 and 81A-81C, further comprising determining an alternative disposition for the endpoint that is different from the default disposition based on the threat status and the impact status.

Statement 81E. The method of statement 81 and 81A-81D, further comprising and configuring a computing device to filter network traffic between the network and the endpoint based on the alternative disposition.

Statement 82. The method of any one of statements 81 and 81A-E, wherein the configuring the computing device to filter network traffic between the network and the endpoint based on the alternative disposition comprises sending the alternative disposition to the computing device via a feed.

Statement 83. The method of any one of statements 81, 81A-E, and 82, wherein the determining that the default disposition applies to the endpoint comprises determining that the CTI data includes no information associated with the endpoint.

Statement 84. The method of any one of statements 81, 81A-E, and 82-83, wherein the determining that the default disposition applies to the endpoint comprises determining that CTI data associated with the endpoint is low-confidence CTI data that does not satisfy a confidence threshold.

Statement 85. The method of any one of statements 81, 81A-E, and 82-84, wherein the determining that the default disposition applies to the endpoint comprises determining that CTI data does not include a threshold quantity of IOCs for the endpoint.

Statement 86. The method of any one of statements 81, 81A-E, and 82-85, further comprising adjusting, based on the impact status, a CTI confidence threshold, wherein the determining the alternative disposition for the endpoint based on the CTI data comprises comparing a confidence of CTI data associated with the endpoint to the adjusted CTI confidence threshold.

Statement 87. The method of any one of statements 81, 81A-E, and 82-86, wherein: the default disposition is a default allow disposition; the determining the impact status comprises determining that the impact of blocking potentially legitimate network traffic between the endpoint and the network of the entity is a low impact that does not satisfy a high impact threshold; and determining the alternative disposition for the endpoint comprises determining, based on the impact being a low impact, that the alternative disposition is a block disposition.

Statement 88. The method of any one of statements 81, 81A-E, and 82-87, wherein: the default disposition is a default block disposition; the determining the impact status comprises determining that the impact of blocking potentially legitimate network traffic between the endpoint and the network of the entity is a high impact that does not satisfy a low impact threshold; and determining the alternative disposition for the endpoint comprises determining, based on the impact being a high impact, that the alternative disposition is an allow disposition.

Statement 89. The method of any one of statements 81, 81A-E, and 82-88, wherein the determining the impact status based on the impact of blocking potentially legitimate network traffic between the endpoint and the network comprises one or more of: comparing an historic volume of traffic between the endpoint and the network to a traffic volume threshold; comparing an historic frequency of traffic between the endpoint and the network to a traffic frequency threshold; or comparing a quantity of resources associated with network traffic between the endpoint and the network to a resource threshold.

Statement 90. The method of statement 89, wherein an impacted resource comprises one or more of: an impacted network address; an impacted computing resource; an impacted user; an impacted user group; an impacted department; or an impacted office.

Statement 91. The method of statement 90, wherein an impacted computing resource comprises one or more of: a software application; a program; a service; or a device configured for communication via the network.

Statement 92. The method of any one of statements 81, 81A-E, and 82-91, wherein the determining the impact status based on the impact of blocking potentially legitimate network traffic between the endpoint and the network comprises one or more of: determining a type of user associated with network traffic between the endpoint and the network and determining the impact status based on the determined type of user; determining a type of computing resource associated with network traffic between the endpoint and the network and determining the impact status based on the determined type of computing resource; or determining a time of day associated with sending network traffic to the endpoint or receiving network traffic from the endpoint.

Statement 93. The method of any one of statements 81, 81A-E, and 82-92, wherein the determining the impact status based on the impact of blocking potentially legitimate network traffic between the endpoint and the network comprises comparing an importance of a resource associated with network traffic between the endpoint and the network to an importance threshold.

Statement 94. The method of any one of statements statement 81, 81A-E, and 82-93, further comprising training one or more machine-learning models on historical network traffic data; providing, as input to the one or more trained machine-learning models, network traffic data associated with network traffic at the network of the entity; and receiving, as output from the one or more trained machine learning models, the impact status.

Statement 95. The method of statement 94, wherein the historical network traffic data comprises: first historical network traffic data associated with network traffic at the network of the entity; and second historical network traffic data associated with network traffic at a different network of a different entity.

Statement 96. The method of any one of statements 81, 81A-E, and 82-95, wherein the impact status comprises one or more of: an impact score; or an indication of whether the impact score satisfies an impact score threshold.

Statement 97. The method of any one of statements 81, 81A-E, and 82-96, wherein determining the alternative disposition based on the threat status and the impact status comprises determining the alternative disposition based on: a comparison between an impact score, of the impact status, and an impact score threshold; and a comparison between a threat score, of the threat status, and a threat score threshold.

Statement 98. The method of statement 97, further comprising configuring, specific for the entity, the impact score threshold.

Statement 99. The method of any one of statements 81, 81A-E, and 82-98, further comprising combining a value of the impact status and a value of the threat status to obtain a composite shieldability status, wherein the determining the alternative disposition based on the threat status and the impact status comprises determining the alternative disposition based on the composite shieldability status.

Statement 100. The method of statement 99, wherein determining the alternative disposition based on the composite shieldability status comprises determining the alternative disposition based on a comparison between the composite shieldability status and a shieldability threshold.

Statement 101. The method of statement 100, further comprising configuring, specific for the entity, the shieldability threshold.

Statement 102. The method of any one of statements 81, 81A-E, and 82-101, wherein the network comprises one or more of one or more logical networks of the entity; or one or more physical networks of the entity.

Statement 103. One or more computing devices comprising one or more processors; and memory storing computer-executable instructions that, when executed by the one or more processors, cause the one or more computing devices to perform the method of any one of statements 81, 81A-E, 82-102, and 105-108.

Statement 104. One or more non-transitory computer-readable media storing computer-executable instructions that, when executed, cause one or more computing devices to perform the method of any one of statements 81, 81A-E, 82-102, and 105-108.

Statement 105. The method of any one of statements 81D and 82-102, further comprising analyzing historic network traffic data, wherein determining the alternative disposition for the endpoint based on an analysis of the historic network traffic data.

Statement 106. The method of any one of statements 81D, 82-102, and 105, further comprising retrieving additional contextual information associated with the endpoint, wherein determining the alternative disposition for the endpoint is based on at least a portion of the additional contextual information retrieved.

Statement 107. The method of any one of statements 81B, and 82-102, further comprising analyzing historic network traffic data and determining the threat status based on an analysis of the historic network traffic data.

Statement 108. The method of any one of statements 81B, 82-102, and 107, further comprising retrieving additional contextual information associated with the endpoint and determining the threat status based on the additional contextual information retrieved.

What is claimed is:

1. A method comprising:
   training one or more machine-learning models on historical network traffic data;
   receiving cyber threat intelligence (CTI) data for an endpoint, wherein the CTI data comprises one or more indications of compromise (IOCs) associated with the endpoint;
   determining that the endpoint is not included in a list of known malicious endpoints and that the endpoint is not included in a list of known non-malicious endpoints;
   determining a threat status for the endpoint based on the one or more IOCs indicated by the CTI data, wherein a default disposition would apply to network traffic associated with the endpoint based on the threat status;
   determining, for an entity, an impact status based on an impact of blocking potentially legitimate network traffic between the endpoint and a network of the entity, wherein determining the impact status comprises:
      providing, as input to the one or more trained machine-learning models, network traffic data associated with network traffic at the network of the entity; and
      receiving, as output from the one or more trained machine learning models, the impact status;
   determining an alternative disposition for the endpoint that is different from the default disposition based on the threat status and the impact status; and
   configuring a computing device to filter network traffic between the network and the endpoint based on the alternative disposition.

2. The method of claim 1, wherein the configuring the computing device to filter network traffic between the network and the endpoint based on the alternative disposition comprises sending the alternative disposition to the computing device via a feed.

3. The method of claim 1, further comprising adjusting a CTI confidence threshold based on the impact status, wherein the determining the alternative disposition for the endpoint based on the CTI data comprises comparing a confidence of CTI data associated with the endpoint to the adjusted CTI confidence threshold.

4. The method of claim 1, wherein:
   the default disposition is a default allow disposition;
   the determining the impact status comprises determining that the potential impact of blocking network traffic between the endpoint and the network of the entity is a low potential impact that does not satisfy a high impact threshold; and
   determining the alternative disposition for the endpoint comprises determining that the alternative disposition is a block disposition based on the potential impact being a low potential impact.

5. The method of claim 1, wherein:
   the default disposition is a default block disposition;
   the determining the impact status comprises determining that the potential impact of blocking network traffic between the endpoint and the network of the entity is a high potential impact that does not satisfy a low impact threshold; and
   the determining the alternative disposition for the endpoint comprises determining that the alternative disposition is an allow disposition based on the potential impact being a high potential impact.

6. The method of claim 1, wherein the determining the impact status based on the potential impact of blocking legitimate network traffic between the endpoint and the network comprises one or more of:
   comparing an historic volume of traffic between the endpoint and the network to a traffic volume threshold;
   comparing an historic frequency of traffic between the endpoint and the network to a traffic frequency threshold; or
   comparing a quantity of resources associated with network traffic between the endpoint and the network to a resource threshold.

7. The method of claim 1, wherein the determining the impact status based on the potential impact of blocking legitimate network traffic between the endpoint and the network comprises one or more of:
   determining a type of user associated with network traffic between the endpoint and the network and determining the impact status based on the determined type of user;
   determining a type of computing resource associated with network traffic between the endpoint and the network and determining the impact status based on the determined type of computing resource; or
   determining a time of day associated with sending network traffic to the endpoint or receiving network traffic from the endpoint.

8. The method of claim 1, wherein the historical network traffic data comprises:
   first historical network traffic data associated with network traffic at the network of the entity; and
   second historical network traffic data associated with network traffic at a different network of a different entity.

9. The method of claim 1, further comprising combining a value of the impact status and a value of the threat status to obtain a composite shieldability status, wherein the determining the alternative disposition based on the threat status and the impact status comprises determining the alternative disposition based on the composite shieldability status.

10. One or more computing devices comprising:

one or more processors; and memory storing computer-executable instructions that, when executed by the one or more processors, cause the one or more computing devices to:

train one or more machine-learning models on histori-cal network traffic data;

receive cyber threat intelligence (CTI) data for an endpoint, wherein the CTI data comprises one or more indications of compromise (IOCs) associated with the endpoint;

determine that the endpoint is not included in a list of known malicious endpoints and that the endpoint is not included in a list of known non-malicious end-points;

determine a threat status for the endpoint based on the one or more IOCs indicated by the CTI data, wherein a default disposition would apply to network traffic associated with the endpoint based on the threat status;

determine, for an entity, an impact status based on an impact of blocking potentially legitimate network traffic between the endpoint and a network of the entity, wherein determination of the impact status comprises:

providing, as input to the one or more trained machine-learning models, network traffic data associated with network traffic at the network of the entity; and receiving, as output from the one or more trained machine learning models, the impact status;

determine an alternative disposition for the endpoint that is different from the default disposition based on the threat status and the impact status; and configure a computing device to filter network traffic between the network and the endpoint based on the alternative disposition.

11. The one or more computing devices of claim 10, wherein the instructions, when executed by the one or more processors, cause the one or more computing devices to configure the computing device to filter network traffic between the network and the endpoint based on the alter-native disposition comprises sending the alternative dispo-sition to the computing device via a feed.

12. The one or more computing devices of claim 10, wherein the instructions, when executed by the one or more processors, further cause the one or more computing devices to adjust a CTI confidence threshold based on the impact status, wherein the determining the alternative disposition for the endpoint based on the CTI data comprises comparing a confidence of CTI data associated with the endpoint to the adjusted CTI confidence threshold.

13. The one or more computing devices of claim 10, wherein:

the default disposition is a default allow disposition; and the instructions, when executed by the one or more processors, cause the one or more computing devices to:

determine the impact status at least by determining that the potential impact of blocking network traffic between the endpoint and the network of the entity is a low potential impact that does not satisfy a high impact threshold; and determine the alternative disposition for the endpoint at least by determining that the alternative disposition is a block disposition based on the potential impact being a low potential impact.

14. The one or more computing devices of claim 10, wherein:

the default disposition is a default block disposition;

the instructions, when executed by the one or more processors, cause the one or more computing devices to:

determine the impact status at least by determining that the potential impact of blocking network traffic between the endpoint and the network of the entity is a high potential impact that does not satisfy a low impact threshold; and determine the alternative disposition for the endpoint at least by determining that the alternative disposition is an allow disposition based on the potential impact being a high potential impact.

15. The one or more computing devices of claim 10, wherein:

the instructions, when executed by the one or more processors, cause the computing device to determine the impact status based on the potential impact of blocking legitimate network traffic between the end-point and the network by at least one of:

comparing an historic volume of traffic between the endpoint and the network to a traffic volume threshold;

comparing an historic frequency of traffic between the endpoint and the network to a traffic frequency thresh-old; or comparing a quantity of resources associated with net-work traffic between the endpoint and the network to a resource threshold.

16. The one or more computing devices of claim 10, wherein:

the instructions, when executed by the one or more processors, cause the computing device to determine the impact status based on the potential impact of blocking legitimate network traffic between the end-point and the network by at least one of:

determining a type of user associated with network traffic between the endpoint and the network and determining the impact status based on the deter-mined type of user;

determining a type of computing resource associated with network traffic between the endpoint and the network and determining the impact status based on the determined type of computing resource; or determining a time of day associated with sending network traffic to the endpoint or receiving network traffic from the endpoint.

17. The one or more computing devices of claim 10, wherein the historical network traffic data comprises:

first historical network traffic data associated with net-work traffic at the network of the entity; and second historical network traffic data associated with network traffic at a different network of a different entity.

18. The one or more computing devices of claim 10, wherein the instructions, when executed by the one or more processors, further cause the one or more computing devices to combine a value of the impact status and a value of the threat status to obtain a composite shieldability status and determine the alternative disposition based on the threat status and the impact status at least by determining the alternative disposition based on the composite shieldability status.

19. One or more non-transitory computer-readable media storing computer-executable instructions that, when executed, cause one or more computing devices to:

training one or more machine-learning models on histori-
cal network traffic data;

receive cyber threat intelligence (CTI) data for an end-
point, wherein the CTI data comprises one or more
indications of compromise (IOCs) associated with the
endpoint;

determine that the endpoint is not included in a list of
known malicious endpoints and that the endpoint is not
included in a list of known non-malicious endpoints;

determine a threat status for the endpoint based on the one
or more IOCs indicated by the CTI data, wherein a
default disposition would apply to network traffic asso-
ciated with the endpoint based on the threat status;

determine, for an entity, an impact status based on an
impact of blocking potentially legitimate network traf-
fic between the endpoint and a network of the entity,
wherein determination of the impact status comprises:
  providing, as input to the one or more trained machine-
  learning models, network traffic data associated with
  network traffic at the network of the entity; and
  receiving, as output from the one or more trained
  machine learning models, the impact status;

determine an alternative disposition for the endpoint that
is different from the default disposition based on the
threat status and the impact status; and configure a computing device to filter network traffic
between the network and the endpoint based on the
alternative disposition.

20. The one or more non-transitory computer-readable
media of claim 19, wherein the instructions, when executed,
cause the one or more computing devices to configure the
computing device to filter network traffic between the net-
work and the endpoint based on the alternative disposition
comprises sending the alternative disposition to the com-
puting device via a feed.

21. The one or more non-transitory computer-readable
media of claim 19, wherein the instructions, when executed,
further cause the one or more computing devices to adjust a
CTI confidence threshold based on the impact status,
wherein the determining the alternative disposition for the
endpoint based on the CTI data comprises comparing a
confidence of CTI data associated with the endpoint to the
adjusted CTI confidence threshold.

22. The one or more non-transitory computer-readable
media of claim 19, wherein:

the default disposition is a default allow disposition; and
the instructions, when executed, cause the computing
device to:
  determine the impact status at least by determining that
  the potential impact of blocking network traffic
  between the endpoint and the network of the entity is
  a low potential impact that does not satisfy a high
  impact threshold; and
  determine the alternative disposition for the endpoint at
  least by determining that the alternative disposition
  is a block disposition based on the potential impact
  being a low potential impact.

23. The one or more non-transitory computer-readable
media of claim 19, wherein:

the default disposition is a default block disposition;
the instructions, when executed, cause the one or more
computing devices to:
  determine the impact status at least by determining that
  the potential impact of blocking network traffic
  between the endpoint and the network of the entity is
  a high potential impact that does not satisfy a low
  impact threshold; and
  determine the alternative disposition for the endpoint at
  least by determining that the alternative disposition
  is an allow disposition based on the potential impact
  being a high potential impact.

24. The one or more non-transitory computer-readable
media of claim 19, wherein:

the instructions, when executed, cause the computing
device to determine the impact status based on the
potential impact of blocking legitimate network traffic
between the endpoint and the network by at least one
of:

comparing an historic volume of traffic between the
endpoint and the network to a traffic volume threshold;

comparing an historic frequency of traffic between the
endpoint and the network to a traffic frequency thresh-
old; or comparing a quantity of resources associated with net-
work traffic between the endpoint and the network to a
resource threshold.

25. The one or more non-transitory computer-readable
media of claim 19, wherein:

the instructions, when executed, cause the computing
device to determine the impact status based on the
potential impact of blocking legitimate network traffic
between the endpoint and the network by at least one
of:

determining a type of user associated with network
  traffic between the endpoint and the network and
  determining the impact status based on the deter-
  mined type of user;

determining a type of computing resource associated
  with network traffic between the endpoint and the
  network and determining the impact status based on
  the determined type of computing resource; or determining a time of day associated with sending
  network traffic to the endpoint or receiving network
  traffic from the endpoint.

26. The one or more non-transitory computer-readable
media of claim 19, wherein the historical network traffic data
comprises:

first historical network traffic data associated with net-
work traffic at the network of the entity; and second historical network traffic data associated with
network traffic at a different network of a different
entity.

27. The one or more non-transitory computer-readable
media of claim 19, wherein the instructions, when executed,
further cause the one or more computing devices to combine
a value of the impact status and a value of the threat status
to obtain a composite shieldability status and determine the
alternative disposition based on the threat status and the
impact status at least by determining the alternative dispo-
sition based on the composite shieldability status.

* * * * *